US010807230B2

(12) United States Patent
Szatmary et al.

(10) Patent No.: US 10,807,230 B2
(45) Date of Patent: Oct. 20, 2020

(54) BISTATIC OBJECT DETECTION APPARATUS AND METHODS

(71) Applicant: Brain Corporation, San Diego, CA (US)

(72) Inventors: Botond Szatmary, San Diego, CA (US); Micah Richert, San Diego, CA (US)

(73) Assignee: Brain Corporation, San Diego, CA (US)

( * ) Notice: Subject to any disclaimer, the term of this patent is extended or adjusted under 35 U.S.C. 154(b) by 307 days.

(21) Appl. No.: 15/877,243

(22) Filed: Jan. 22, 2018

(65) Prior Publication Data

US 2018/0207791 A1   Jul. 26, 2018

Related U.S. Application Data

(60) Continuation of application No. 14/752,688, filed on Jun. 26, 2015, now Pat. No. 9,873,196, which is a
(Continued)

(51) Int. Cl.
*B25J 5/00* (2006.01)
*G06K 9/00* (2006.01)
(Continued)

(52) U.S. Cl.
CPC ............. *B25J 5/00* (2013.01); *B25J 9/1674* (2013.01); *B25J 9/1676* (2013.01);
(Continued)

(58) Field of Classification Search
CPC . B25J 5/00; B25J 9/1674; B25J 9/1676; B25J 11/0085; B25J 19/06;
(Continued)

(56) References Cited

U.S. PATENT DOCUMENTS 4,600,355 A   7/1986  Johnson
4,687,457 A   8/1987  Milner
(Continued)

FOREIGN PATENT DOCUMENTS

CN   102226740 A   10/2011
JP   H0487423 A    3/1992
(Continued)

OTHER PUBLICATIONS

Asensio et al., "Robot Learning Control Based on Neural Network Prediction" ASME 8th Annual Dynamic Systems and Control Conference joint with the JSME 11th Motion and Vibration Conference 2012 [Retrieved on: Jun. 24, 2014]. Retrieved fro internet:http://msc.berkeley.edu/wjchen/publications/DSC12.sub.--8726.sub.--FI-.pdf<http: />.
(Continued)

*Primary Examiner* — Jason Holloway
(74) *Attorney, Agent, or Firm* — Reed Smith LLP; Sidharth Kapoor

(57) ABSTRACT

Apparatus and methods for navigation of a robotic device configured to operate in an environment comprising objects and/or persons. Location of objects and/or persons may change prior and/or during operation of the robot. In one embodiment, a bistatic sensor comprises a transmitter and a receiver. The receiver may be spatially displaced from the transmitter. The transmitter may project a pattern on a surface in the direction of robot movement. In one variant, the pattern comprises an encoded portion and an information portion. The information portion may be used to communicate information related to robot movement to one or more persons. The encoded portion may be used to determine presence of one or more object in the path of the robot. The receiver may sample a reflected pattern and compare it with the transmitted pattern. Based on a similarity measure
(Continued)

breaching a threshold, indication of object present may be produced.

19 Claims, 17 Drawing Sheets

Related U.S. Application Data division of application No. 14/749,423, filed on Jun. 24, 2015, now Pat. No. 9,840,003.

(51) Int. Cl.

| | | |
|---|---|---|
| G06K 9/62 | (2006.01) | |
| G06K 9/20 | (2006.01) | |
| G05D 1/02 | (2020.01) | |
| G01S 17/00 | (2020.01) | |
| G01S 17/46 | (2006.01) | |
| G01S 17/89 | (2020.01) | |
| G01S 7/51 | (2006.01) | |
| G01S 17/04 | (2020.01) | |
| G01S 17/931 | (2020.01) | |
| B25J 9/16 | (2006.01) | |
| B25J 11/00 | (2006.01) | |
| B25J 19/06 | (2006.01) | |
| B60Q 1/54 | (2006.01) | |
| B60Q 9/00 | (2006.01) | |
| G01S 15/931 | (2020.01) | |
| G01S 13/931 | (2020.01) | |

(52) U.S. Cl.
CPC ........... *B25J 11/0085* (2013.01); *B25J 19/06* (2013.01); *B60Q 1/54* (2013.01); *B60Q 9/008* (2013.01); *G01S 7/51* (2013.01); *G01S 17/003* (2013.01); *G01S 17/04* (2020.01); *G01S 17/46* (2013.01); *G01S 17/89* (2013.01); *G01S 17/931* (2020.01); *G05D 1/0214* (2013.01); *G05D 1/0238* (2013.01); *G06K 9/00664* (2013.01); *G06K 9/00771* (2013.01); *G06K 9/00805* (2013.01); *G06K 9/209* (2013.01); *G06K 9/2036* (2013.01); *G06K 9/6212* (2013.01); *G06K 9/6215* (2013.01); *G01S 13/931* (2013.01); *G01S 15/931* (2013.01); *G05D 1/0242* (2013.01); *Y10S 901/01* (2013.01)

(58) Field of Classification Search
CPC ........... G06K 9/00771; G06K 9/00805; G06K 9/00664; G06K 9/6215; G06K 9/6212; G06K 9/2036; G06K 9/209; B60Q 1/54; B60Q 9/008; G01S 15/931; G01S 13/931; G01S 17/04; G01S 17/931; G01S 17/003; G01S 17/46; G01S 17/89; G01S 7/51; Y10S 901/01; G05D 1/0242; G05D 1/0214; G05D 1/0238
See application file for complete search history.

(56) References Cited

U.S. PATENT DOCUMENTS

| | | | |
|---|---|---|---|
| 4,762,455 | A | 8/1988 | Coughlan et al. |
| 4,820,233 | A | 4/1989 | Weiner |
| 4,853,771 | A | 8/1989 | Witriol et al. |
| 4,889,027 | A | 12/1989 | Yokoi |
| 5,042,807 | A | 8/1991 | Sasakawa et al. |
| 5,063,603 | A | 11/1991 | Burt |
| 5,083,803 | A | 1/1992 | Blake et al. |
| 5,355,435 | A | 10/1994 | DeYong et al. |
| 5,369,497 | A | 11/1994 | Allen et al. |
| 5,378,188 | A | 1/1995 | Clark |
| 5,638,359 | A | 6/1997 | Peltola et al. |
| 5,652,594 | A | 7/1997 | Costas |
| 5,673,367 | A | 9/1997 | Buckley |
| 5,673,387 | A | 9/1997 | Chen et al. |
| 5,875,108 | A | 2/1999 | Hoffberg et al. |
| 6,009,418 | A | 12/1999 | Cooper |
| 6,014,653 | A | 1/2000 | Thaler |
| 6,061,088 | A | 5/2000 | Khosravi et al. |
| 6,084,373 | A | 7/2000 | Goldenberg et al. |
| 6,124,541 | A | 9/2000 | Lu |
| 6,253,058 | B1 | 6/2001 | Murasaki et al. |
| 6,259,988 | B1 | 7/2001 | Galkowski et al. |
| 6,338,013 | B1* | 1/2002 | Ruffner ............... A01D 34/008 701/23 |
| 6,411,055 | B1 | 6/2002 | Fujita et al. |
| 6,429,291 | B1 | 8/2002 | Turley et al. |
| 6,435,936 | B1 | 8/2002 | Rehkemper et al. |
| 6,458,157 | B1 | 10/2002 | Suaning |
| 6,504,610 | B1* | 1/2003 | Bauer ................. G01B 11/272 356/399 |
| 6,545,705 | B1 | 4/2003 | Sigel et al. |
| 6,545,708 | B1 | 4/2003 | Tamayama et al. |
| 6,546,291 | B2 | 4/2003 | Merfeld et al. |
| 6,547,631 | B1 | 4/2003 | Randall |
| 6,560,511 | B1 | 5/2003 | Yokoo et al. |
| 6,565,407 | B1 | 5/2003 | Woolington et al. |
| 6,570,608 | B1 | 5/2003 | Tserng |
| 6,581,046 | B1 | 6/2003 | Ahissar |
| 6,615,108 | B1 | 9/2003 | Peless et al. |
| 6,633,232 | B2 | 10/2003 | Trajkovic et al. |
| 6,682,392 | B2 | 1/2004 | Chan |
| 6,697,711 | B2 | 2/2004 | Yokono et al. |
| 6,760,645 | B2 | 7/2004 | Kaplan et al. |
| 6,774,908 | B2 | 8/2004 | Bates et al. |
| 6,780,042 | B1 | 8/2004 | Badescu et al. |
| 7,023,833 | B1 | 4/2006 | Aiello et al. |
| 7,054,850 | B2 | 5/2006 | Matsugu |
| 7,235,013 | B2 | 6/2007 | Kobayashi |
| 7,418,320 | B1 | 8/2008 | Bodin et al. |
| 7,565,203 | B2 | 7/2009 | Greenberg et al. |
| 7,742,625 | B2 | 6/2010 | Pilu |
| 7,765,029 | B2 | 7/2010 | Fleischer et al. |
| 7,849,030 | B2 | 12/2010 | Ellingsworth |
| 8,015,130 | B2 | 9/2011 | Matsugu et al. |
| 8,015,785 | B2 | 9/2011 | Walker et al. |
| 8,145,355 | B2 | 3/2012 | Danko |
| 8,145,492 | B2 | 3/2012 | Fujita |
| 8,154,436 | B2 | 4/2012 | Szajnowski |
| 8,157,612 | B2 | 4/2012 | Rehkemper et al. |
| 8,281,997 | B2 | 10/2012 | Moran et al. |
| 8,295,955 | B2 | 10/2012 | Dibernardo et al. |
| 8,315,305 | B2 | 11/2012 | Petre et al. |
| 8,346,692 | B2 | 1/2013 | Rouat et al. |
| 8,401,242 | B2 | 3/2013 | Newcombe et al. |
| 8,467,623 | B2 | 6/2013 | Izhikevich et al. |
| 8,467,823 | B2 | 6/2013 | Seki et al. |
| 8,515,160 | B1 | 8/2013 | Khosla et al. |
| 8,527,094 | B2 | 9/2013 | Kumar et al. |
| 8,542,872 | B2 | 9/2013 | Gornick et al. |
| 8,571,261 | B2 | 10/2013 | Gagvani et al. |
| 8,578,810 | B2 | 11/2013 | Donhowe |
| 8,583,286 | B2 | 11/2013 | Fleischer et al. |
| 8,712,939 | B2 | 4/2014 | Szatmary et al. |
| 8,712,941 | B2 | 4/2014 | Izhikevich et al. |
| 8,719,199 | B2 | 5/2014 | Izhikevich et al. |
| 8,725,658 | B2 | 5/2014 | Izhikevich et al. |
| 8,725,662 | B2 | 5/2014 | Izhikevich et al. |
| 8,731,295 | B2 | 5/2014 | Schepelmann et al. |
| 8,756,183 | B1 | 6/2014 | Daily et al. |
| 8,775,341 | B1 | 7/2014 | Commons |
| 8,793,205 | B1 | 7/2014 | Fisher et al. |
| 8,880,222 | B2 | 11/2014 | Kawamoto et al. |
| 8,943,008 | B2 | 1/2015 | Ponulak et al. |
| 8,954,193 | B2 | 2/2015 | Sandin et al. |
| 8,972,315 | B2 | 3/2015 | Szatmary et al. |
| 8,977,582 | B2 | 3/2015 | Richert |
| 8,983,216 | B2 | 3/2015 | Izhikevich et al. |
| 8,990,133 | B1 | 3/2015 | Ponulak et al. |

(56) References Cited

U.S. PATENT DOCUMENTS

| | | | |
|---|---|---|---|
| 8,996,177 B2 | 3/2015 | Coenen | |
| 9,002,511 B1* | 4/2015 | Hickerson | G01S 17/026 700/245 |
| 9,043,952 B2 | 6/2015 | Sandin et al. | |
| 9,508,235 B2 | 11/2016 | Suessemilch et al. | |
| 2001/0020944 A1 | 9/2001 | Brown et al. | |
| 2001/0045809 A1 | 11/2001 | Mukai | |
| 2002/0038294 A1 | 3/2002 | Matsugu | |
| 2002/0072293 A1 | 6/2002 | Beyo et al. | |
| 2002/0081937 A1 | 6/2002 | Yamada et al. | |
| 2002/0156556 A1 | 10/2002 | Ruffner | |
| 2002/0158599 A1 | 10/2002 | Fujita et al. | |
| 2002/0183895 A1 | 12/2002 | Kaplan et al. | |
| 2002/0198854 A1 | 12/2002 | Berenji et al. | |
| 2003/0050903 A1 | 3/2003 | Liaw et al. | |
| 2003/0222987 A1 | 12/2003 | Karazuba | |
| 2003/0232568 A1 | 12/2003 | Engel et al. | |
| 2004/0016638 A1 | 1/2004 | LaConti et al. | |
| 2004/0100563 A1 | 5/2004 | Sablak et al. | |
| 2004/0153211 A1 | 8/2004 | Kamoto et al. | |
| 2004/0158358 A1 | 8/2004 | Anezaki et al. | |
| 2004/0162638 A1 | 8/2004 | Solomon | |
| 2004/0193670 A1 | 9/2004 | Langan et al. | |
| 2004/0204792 A1* | 10/2004 | Taylor | A47L 9/2805 700/245 |
| 2004/0212148 A1 | 10/2004 | Losey et al. | |
| 2004/0220082 A1 | 11/2004 | Surmeier et al. | |
| 2004/0244138 A1* | 12/2004 | Taylor | A47L 9/2805 15/319 |
| 2005/0010331 A1 | 1/2005 | Taylor et al. | |
| 2005/0012830 A1 | 1/2005 | Pilu | |
| 2005/0015351 A1 | 1/2005 | Nugent | |
| 2005/0022751 A1 | 2/2005 | Nelson | |
| 2005/0036649 A1 | 2/2005 | Yokono et al. | |
| 2005/0049749 A1 | 3/2005 | Watanabe et al. | |
| 2005/0065651 A1 | 3/2005 | Ayers et al. | |
| 2005/0209749 A1 | 9/2005 | Ito et al. | |
| 2005/0240412 A1 | 10/2005 | Fujita | |
| 2005/0283450 A1 | 12/2005 | Matsugu et al. | |
| 2006/0069448 A1 | 3/2006 | Yasui | |
| 2006/0161218 A1 | 7/2006 | Danilov | |
| 2007/0008405 A1 | 1/2007 | Benosman et al. | |
| 2007/0037475 A1 | 2/2007 | Spear | |
| 2007/0176643 A1 | 8/2007 | Nugent | |
| 2007/0208678 A1 | 9/2007 | Matsugu | |
| 2007/0239315 A1* | 10/2007 | Sato | B25J 9/1612 700/245 |
| 2007/0244610 A1 | 10/2007 | Ozick et al. | |
| 2007/0258329 A1 | 11/2007 | Winey | |
| 2008/0039974 A1* | 2/2008 | Sandin | G05D 1/0225 700/258 |
| 2008/0170130 A1 | 7/2008 | Ollila et al. | |
| 2008/0201282 A1 | 8/2008 | Garcia et al. | |
| 2008/0294074 A1 | 11/2008 | Tong et al. | |
| 2009/0014402 A1 | 1/2009 | Wolf et al. | |
| 2009/0043722 A1 | 2/2009 | Nugent | |
| 2009/0066790 A1 | 3/2009 | Hammadou | |
| 2009/0118890 A1* | 5/2009 | Lin | G05D 1/0246 701/28 |
| 2009/0141939 A1 | 6/2009 | Chambers et al. | |
| 2009/0153499 A1 | 6/2009 | Kim et al. | |
| 2009/0161981 A1 | 6/2009 | Allen | |
| 2009/0287624 A1 | 11/2009 | Rouat et al. | |
| 2009/0310862 A1 | 12/2009 | Tu et al. | |
| 2010/0036780 A1 | 2/2010 | Angelov | |
| 2010/0086171 A1 | 4/2010 | Lapstun | |
| 2010/0091286 A1 | 4/2010 | Dahlgren | |
| 2010/0152894 A1 | 6/2010 | Ha | |
| 2010/0166320 A1 | 7/2010 | Paquier | |
| 2010/0228418 A1 | 9/2010 | Whitlow et al. | |
| 2010/0250022 A1 | 9/2010 | Hines et al. | |
| 2010/0283853 A1 | 11/2010 | Acree | |
| 2010/0286824 A1 | 11/2010 | Solomon | |
| 2010/0290710 A1 | 11/2010 | Gagvani et al. | |
| 2010/0292835 A1 | 11/2010 | Sugiura et al. | |
| 2010/0316257 A1 | 12/2010 | Xu et al. | |
| 2011/0016071 A1 | 1/2011 | Guillen et al. | |
| 2011/0078717 A1 | 3/2011 | Drummond et al. | |
| 2011/0119214 A1 | 5/2011 | Breitwisch et al. | |
| 2011/0119215 A1 | 5/2011 | Elmegreen et al. | |
| 2011/0134245 A1 | 6/2011 | Khizhnichenko | |
| 2011/0178658 A1 | 7/2011 | Kotaba et al. | |
| 2011/0184556 A1 | 7/2011 | Seth et al. | |
| 2011/0222832 A1 | 9/2011 | Aizawa | |
| 2011/0228742 A1 | 9/2011 | Honkasalo et al. | |
| 2011/0235698 A1 | 9/2011 | Petre et al. | |
| 2011/0245974 A1 | 10/2011 | Kawamoto et al. | |
| 2012/0011090 A1 | 1/2012 | Tang et al. | |
| 2012/0063736 A1 | 3/2012 | Simmons et al. | |
| 2012/0081552 A1 | 4/2012 | Sablak et al. | |
| 2012/0083982 A1* | 4/2012 | Bonefas | G05D 1/0223 701/70 |
| 2012/0098933 A1 | 4/2012 | Robinson et al. | |
| 2012/0109866 A1 | 5/2012 | Modha | |
| 2012/0109886 A1 | 5/2012 | Ko | |
| 2012/0117012 A1 | 5/2012 | Szatmary et al. | |
| 2012/0143495 A1 | 6/2012 | Dantu | |
| 2012/0173021 A1 | 7/2012 | Tsusaka | |
| 2012/0185092 A1 | 7/2012 | Ku | |
| 2012/0196679 A1 | 8/2012 | Newcombe et al. | |
| 2012/0209428 A1 | 8/2012 | Mizutani | |
| 2012/0209432 A1 | 8/2012 | Fleischer et al. | |
| 2012/0211923 A1 | 8/2012 | Garner et al. | |
| 2012/0215348 A1 | 8/2012 | Skrinde | |
| 2012/0303091 A1 | 11/2012 | Izhikevich | |
| 2012/0308076 A1 | 12/2012 | Piekniewski et al. | |
| 2012/0308136 A1 | 12/2012 | Izhikevich et al. | |
| 2012/0330872 A1 | 12/2012 | Esser et al. | |
| 2013/0046716 A1 | 2/2013 | Chan et al. | |
| 2013/0073491 A1 | 3/2013 | Izhikevich et al. | |
| 2013/0073496 A1 | 3/2013 | Szatmary et al. | |
| 2013/0073500 A1 | 3/2013 | Szatmary et al. | |
| 2013/0077597 A1 | 3/2013 | Nukala et al. | |
| 2013/0103626 A1 | 4/2013 | Hunzinger | |
| 2013/0116827 A1 | 5/2013 | Inazumi | |
| 2013/0117212 A1 | 5/2013 | Hunzinger et al. | |
| 2013/0151450 A1 | 6/2013 | Ponulak | |
| 2013/0176423 A1 | 7/2013 | Rischmuller et al. | |
| 2013/0204814 A1 | 8/2013 | Hunzinger et al. | |
| 2013/0204820 A1 | 8/2013 | Hunzinger et al. | |
| 2013/0216144 A1 | 8/2013 | Robinson et al. | |
| 2013/0218821 A1 | 8/2013 | Szatmary et al. | |
| 2013/0226342 A1 | 8/2013 | Green et al. | |
| 2013/0245937 A1* | 9/2013 | DiBernardo | G01S 5/163 701/514 |
| 2013/0251278 A1 | 9/2013 | Izhikevich et al. | |
| 2013/0314502 A1 | 11/2013 | Urbach et al. | |
| 2013/0325768 A1 | 12/2013 | Sinyavskiy et al. | |
| 2013/0325773 A1 | 12/2013 | Sinyavskiy et al. | |
| 2013/0325774 A1 | 12/2013 | Sinyavskiy et al. | |
| 2013/0325775 A1 | 12/2013 | Sinyavskiy et al. | |
| 2014/0008496 A1 | 1/2014 | Ye et al. | |
| 2014/0016858 A1 | 1/2014 | Richert | |
| 2014/0032021 A1 | 1/2014 | Metzler et al. | |
| 2014/0078343 A1 | 3/2014 | Dai et al. | |
| 2014/0085545 A1 | 3/2014 | Tu et al. | |
| 2014/0089232 A1 | 3/2014 | Buibas et al. | |
| 2014/0175267 A1 | 6/2014 | Thiel et al. | |
| 2014/0198838 A1 | 7/2014 | Andrysco et al. | |
| 2014/0240492 A1* | 8/2014 | Lee | H04N 5/2256 348/136 |
| 2014/0247325 A1 | 9/2014 | Wu et al. | |
| 2014/0276951 A1 | 9/2014 | Hourtash et al. | |
| 2014/0277718 A1 | 9/2014 | Izhikevich et al. | |
| 2014/0313032 A1 | 10/2014 | Sager et al. | |
| 2014/0320668 A1 | 10/2014 | Kalevo et al. | |
| 2014/0350722 A1 | 11/2014 | Skrinde | |
| 2015/0042485 A1* | 2/2015 | Suessemilch | G03B 21/2093 340/815.4 |
| 2015/0157182 A1* | 6/2015 | Noh | A47L 11/4061 701/28 |
| 2015/0168954 A1* | 6/2015 | Hickerson | G01S 17/026 700/259 |

(56) References Cited

U.S. PATENT DOCUMENTS

| | | | |
|---|---|---|---|
| 2015/0234385 A1 | 8/2015 | Sandin et al. | |
| 2015/0362919 A1* | 12/2015 | Bernstein | A63H 30/04 |
| | | | 701/2 |
| 2016/0104044 A1* | 4/2016 | Noh | G06K 9/00664 |
| 2016/0179096 A1 | 6/2016 | Bradlow et al. | |

FOREIGN PATENT DOCUMENTS

| | | |
|---|---|---|
| RU | 2108612 C1 | 4/1998 |
| WO | WO-2008083335 A2 | 7/2008 |
| WO | WO-2010136961 A1 | 12/2010 |

OTHER PUBLICATIONS

Baluja S., et al., "Expectation-based Selective Attention for Visual Monitoring and Control of a Robot Vehicle," Robotics and Autonomous Systems, 1997, pp. 329-344.

Bohte, 'Spiking Nueral Networks' Doctorate at the University of Leiden, Holland, Mar. 5, 2003, pp. 1-133 [retrieved on Nov. 14, 2012]. Retrieved from the interne http://homepages.cwi.nl/~sbohte/publication/phdthesis.pdf<url: />.

Bouganis, Alexandros, et al.,"Training a Spiking Neural Network to Control a 4-DoF Robotic Arm based on Spike Timing-Dependent Plasticity", Proceedings of WCCI 2010 IEEE World Congress on Computational Intelligence, COB, Barcelona, Spain, Jul. 18-23, 2010, pp. 4104-4111.

Brette et al., Brian: a simple and flexible simulator for spiking neural networks, the Neuromorphic Engineer, Jul. 1, 2009, pp. 1-4, doi: 10.2417/1200906.1659.

Brette, et al., "Simulation ofNetworks of Spiking Neurons: A Review of Tools and Strategies", Received Nov. 29, 2006, Revised Apr. 2, 2007, Accepted Apr. 12, 2007, Springer Science, 50 pages.

Chistiakova, Marina, et al., "Heterosynaptic plasticity in the neocortex." Experimental brain research 199.3-4 (2009): 377-390.

Coupard, Pierre-Philippe, An Availabot-like computer-controlled push puppet for Linux, https://web.archive.org/web/20081106161941/http://myspace.voo.be/pcoupard/push_puppet_to_y/, 2008.

Cuntz et al., 'One Rule to Grow Them All: A General Theory of Neuronal Branching and Its Paractical Application' PLOS Computational Biology, 6 (8), Published Aug. 5, 2010.

Daniel Bush, "STDP, Rate-coded Hebbian Learning and Auto-Associative Network Models of the Hippocampus", Sep. 2008, University of Sussex, pp. 1-109.

Davison et al., PyNN: a common interface for neuronal network simulators, Frontiers in Neuroinformatics, Jan. 2009, pp. 1-10, vol. 2, Article 11.

Djurfeldt, Mikael, The Connection-set Algebra: a formalism for the representation of connectivity structure in neuronal network models, implementations in Python and C++, and their use in simulators BMC Neuroscience Jul. 18, 2011 p. 1 12(Suppl 1):P80.

Fidjeland et al., Accelerated Simulation of Spiking Neural Networks Using GPUs [online], 2010 [retrieved on Jun. 15, 2013], Retrieved from the Internet: URL:http://ieeexplore.ieee.org/xpls/abs_all.jsp?ammber=5596678&tag=1.

Fidjeland, et al., "Accelerated Simulation of Spiking Neural Networks Using GPUs," WCCI 2010 IEEE World Congress on Computational Intelligience, Jul. 18-23, 2010—CCIB, Barcelona, Spain, pp. 536-543, [retrieved on Nov. 14, 2012]. Retrieved from the Internet: URL:http://www.doc.ic.ac.ukl-mpsha/IJCNN10b.pdf.

Fletcher, L., et al., "Correlating Driver Gaze with the Road Scene for Driver Assistance Systems," Robotics and Autonomous Systems, 2005, pp. 71-84.

Floreano et al., 'Neuroevolution: from architectures to learning' Evol. Intel. Jan. 2008 1:47-62, [retrieved Dec. 30, 2013] [retrieved online from URL:http://inforscienee.eptl.cb/record/112676/files/FloreanoDuerrMattiussi2008.pdf<http: />.

Gewaltig et al.. 'NEST (Neural Simulation Tool)', Scholarpedia, 2007. pp. I-I15. 2(4): 1430, doi: 1 0.4249/scholarpedia.1430.

Glackin, C. et al., Feature Extraction from Spectra-temporal Signals using Dynamic Synapses, recurrency, and lateral inhibition, Neural Networks (IJCNN), The 2010 International Joint Conference on DOI: 10.1109/IJCNN.2010.5596818 Publication Year: 2010, pp. 1-6.

Gleeson et al., NeuroML: A Language for Describing Data Driven Models of Neurons and Networks with a High Degree of Biological Detail, PLoS Computational Biology, Jun. 2010, pp. 1-19 vol. 6 Issue 6.

Goodman et al., Brian: a simulator for spiking neural networks in Python, Frontiers in Neuroinformatics, Nov. 2008, pp. 1-10, vol. 2, Article 5.

Gorchetchnikov et al., NineML: declarative, mathematically-explicit descriptions of spiking neuronal networks, Frontiers in Neuroinformatics, Conference Abstract: 4th INCF Congress of Neuroinformatics, doi: 1 0.3389/conffninf.2011.08.00098.

Graham, Lyle J., The Surf-Hippo Reference Manual Version 3.0 B, Mar. 2002, URL: http://www.neurophys.biomedicale.univparis5. fr/graham/surf-hippo-files/Surf-Hippo%20Reference%20Manual.pdf, pp. 1-128.

Hardware and Software Platform for Mobile Manipulation R&D, 2012, https://web.archive.org/web/20120128031010/http://www.willowgarage.com/pages/pr2/design.

Huh et al., "Generalized Power Law for Curve Movements" 2011.

Huh et al., "Real-Time Motor Control Using Recurrent Neural Networks" IEEEE Apr. 2009.

Huh, "Rethinking Optimal Control of Human Movements" Thesis 2012.

Ishii K., et al., Designing Laser Gesture Interface for Robot Control, Springer Berlin Heidelberg, Proceedings, Part II 12th IFIP TC 13 International Conference, Uppsala, Sweden, Aug. 24-28, 2009, Proceedings, pp. 479-492.

Itti, Laurent, et al., "Computational Modelling of Visual Attention", Nature Reviews—Neuroscience 2.3 (2001): 194-203.

Izhikevich E.M. (2006) Polychronization: Computation With Spikes. Neural Computation, 18:245-282.

Izhikevich, E,M. (2007) Dynamical Systems in Neuroscience: The Geometry of Excitability and Bursting, The MIT Press, 2007.

Izhikevich E.M., "Neural Excitability, Spiking and Bursting", Neurosciences Institute, Received Jun. 9, 1999, Revised Oct. 25, 1999, 1171-1266, 96 pages.

Izhikevich et al., 'Relating STDP to BCM', Neural Computation (2003) 15, 1511-1523.

Izhikevich, 'Simple Model of Spiking Neurons', IEEE Transactions on Neural Networks, vol. 14, No. 6, Nov. 2003, pp. 1569-1572.

Jain, Learning Trajectory Preferences for Manipulators via Iterative Improvement, 2013, Advances in Neural Information Processing Systems 26 (NIPS 2013).

Judd, T., et al., "Learning to Predict where Humans look," 12th International Conference on Computer Vision, 2009, 8 pages.

Karbowski et al., 'Multispikes and Synchronization in a Large Neural Network with Temporal Delays', Neural Computation 12. 1573-1606 (2000).

Kasabov, "Evolving Spiking Neural Networks for Spatio-and Spectro-Temporal Pattern Recognition", IEEE 6th International Conference Intelligent Systems 2012 [Retrieved on Jun. 24, 2014], Retrieved from the Internet: http://ncs.ethz.ch/projects/evospike/publications/evolving-spiking-neural-networks-for-spatio-and-spectro-temporal-pattern-recognition-plenary-talk-ieee-is/view.

Kazantsev, et al., "Active Spike Transmission in the Neuron Model With a Winding Threshold Maniford", 01/03112,205-211,7 pages.

Khotanzad. 'Classification of invariant image representations using a neural network' IEEE. Transactions on Acoustics, Speech, and Signal Processing, vol. 38, No. 6, Jun. 1990, pp. 1028-1038 [online], [retrieved on Dec. 10, 2013]. Retrieved from the Internet< URL: http://www-ee.uta.edu/eeweb/IP/Courses/SPR/Reference/ Khotanzad.pdf.

Kienzle, W. et al., "How to find interesting locations in video: a spatiotemporal point detector learned from human eye movements." Joint Pattern Recognition Symposium. Springer Berlin Heidelberg (2007) 10 pp.

Kling-Petersen, PhD, "Sun and HPC: From Systems to PetaScale" Sun Microsystems, no date, 31 pages.

(56) References Cited

OTHER PUBLICATIONS

Knoblauch A., et al., "Memory Capacities for Synaptic and Structural Plasticity," Neural Computation, 2010, vol. 22 (2), pp. 289-341.
Laurent, 'Issue 1—nnql Refactor Nucleus into its own file—Neural Network Query Language' [retrieved on Nov. 12, 2013]. Retrieved from the Internet: URL:https://code.google.com/p/nnql/issues/detail?id=1.
Laurent, 'The Neural Network Query Language (NNQL) Reference' [retrieved on Nov. 12, 2013]. Retrieved from the Internet: URL: https://code.google.com/p/ nnql/issues/detail?id=1.
Leydesdorff L., et al., "Classification and Powerlaws: The Logarithmic Transformation, Journal of the American Society for Information Science and Technology (forthcoming)", 2006.
Markram, Henry, et al. "Regulation of synaptic efficacy by coincidence of postsynaptic APs and EPSPs." Science 275.5297 (1997): 213-215.
Martinez-Perez, et al., "Automatic Activity Estimation Based on Object Behavior Signature", 2010, 10 pages.
Matsugu, et al., "Convolutional Spiking Neural Network for Robust Object Detection with Population Code Using Structured Pulse Packets", 2004, 39-55, 17 pages.
Medin I.C., et al., Modeling Cerebellar Granular layer Excitability and Combinatorial Computation with Spikes, Bio-Inspired Computing: Theories and Applications (BIC-TA), 2010 IEEE Fifth International Conference on DOI: 10.1 109/BICTA.201 0.5645274, Publication Year: 2010, pp. 1495-1503.
Meinhardt, et al., "Pattern formation by local self-activation and lateral inhibition." Bioessays 22.8 (2000): 753-760.
Mircea Badescu and Constantinos Mavroidis, Novel Smart Connector for Modular Robotics, Aug. 7, 2002, Advanced Intelligent Mechatronics, 2001. Proceedings. 2001 IEEE/ASME International Conference on.
Mordatch et al., "Discovery of Complex Behaviors through Contract-Invariant Optimization" ACM Transactions on Graphics (TOG)—SIGGRAPH 2012 Conference.
Munn, S., et al., "Fixation-identification in Dynamic Scenes: Comparing an Automated Algorithm to Manual Coding," Proceedings of the 5th symposium on Applied Perception in Graphics and Visualization, 2008, pp. 33-42.
Nichols, A Reconfigurable Computing Architecture for Implementing Artificial Neural Networks on FPGA, Master's Thesis, The University of Guelph, 2003, pp. 1-235.
Niv, et al., Evolution of Reinforcement Learning in Uncertain Environments: A Simple Explanation for Complex Foraging Behaviors, International Society for Adaptive Behavior, 2002, vol. 10(1), pp. 5-24.
Ostojic, Srdjan, Nicolas Brunel, From Spiking Neuron Models to Linear-Nonlinear Models, Jan. 2011, vol. 7 (1), e1001056.
Paugam-Moisy et al., "Computing with spiking neuron networks," G. Rozenberg T. Back, J. Kok (Eds.), Handbook of Natural Computing, Springer-Verlag (2010) [retrieved Dec. 30, 2013], [retrieved online from link.springer.com].
Paugam-Moisy, et al., "Computing with Spiking Neuron Networks" Handbook of Natural Computing, 40 pages Springer, Heidelberg (2009).
Pavlidis et al. Spiking neural network training using evolutionary algorithms. In: Proceedings 2005 IEEE International Joint Conference on Neural Networkds, 2005. IJCNN'05, vol. 4, pp. 2190-2194 Publication Date Jul. 31, 2005 [online] [Retrieved on Dec. 10, 2013] Retrieved from the Internet< URL: http://citeseerx.ist.psu.edu! viewdoc/download?doi=0.1.1.5.4346&rep—repl&type-pdf.
Pham et al., "Affine Invariance of Human Hand Movements: a direct test" 2012.
PR2 User Manual, Oct. 5, 2012.
Ramachandran, et al., "The Perception of Phantom Limbs", The D.O. Hebb Lecture, Center for Brain and Cognition, University of California, 1998, 121, 1603-1630,28 pages.
Ruan, Chengmei, et al., Competitive behaviors of a spiking neural network with spike timing dependent plasticity, Biomedical Engineering and Informatics (BMEI), 2012 5th International Conference on DOI: 10.1109/BMEI.2012.6513088 Publication Year: 2012 , pp. 1015-1019.
Schaal et al., An Example Application of Policy Improvement with Path Integrals (PI.sup.2), Jun. 9, 2010.
Schemmel, J., et al., Implementing synaptic plasticity in a VLSI spiking neural network model. In: Proceedings of the 2006 Intenational Joint Conference on Neural Networks (IJCNN'06), IEEE Press (2006) Jul. 16-21, 2006, pp. 1-6 [online], [retrieved on Aug. 24, 2012]. Retrieved from the Internet URL: http://www.kip.uniheidelberg.deNeroeffentlichungen/download.cgi/4620/ps/1774.pdf.
Simulink.RTM. model [online], [Retrieved on Dec. 10, 2013] Retrieved from &It:URL: http://www.mathworks.com/ products/simulink/index.html>.
Sinyavskiy et al. 'Reinforcement learning of a spiking neural network in the task of control of an agent in a virtual discrete environment' Rus, J. Nonlin. Dyn., 2011, vol. 7, No. 4 (Mobile Robots), pp. 859-875, chapters 1-8 (Russian Article with English Abstract).
Sjostrom et al., 'Spike-Timing Dependent Plasticity' Scholarpedia, 5(2):1362 (2010), pp. 1-18.
Steele, The Human Touch Makes Robots Defter, Nov. 6, 2013, Cornell Chronicle. http://www.news.cornell.edu/stories/2013/11/human-touch-makes-robots-defter.
Stringer, et al., "Invariant Object Recognition in the Visual System with Novel Views of 3D Objects", 2002, 2585-2596, 12 pages.
Suzuki et al.,Operation Direction to a Mobile Robot by Projection Lights, 2005 IEEE Workshop on Advanced Robotics and its Social Impacts, Jun. 12-15, 2005, pp. 160-165.
Swiercz, Waldemar, et al. "A new synaptic plasticity rule for networks of spiking neurons." Neural Networks, IEEE Transactions on 17.1 (2006): 94-105.
Szatmary et al,, "Spike-timing Theory of Working Memory" PLoS Computational Biology, vol. 6, Issue 8, Aug. 19, 2010 [retrieved on Dec. 30, 2013]. Retrieved from the Internet: URL: http://www.ploscompbioI.org/article/info%3Adoi% 2F10.1371%2Fjournal,pcbi.1000879<url:></url:>.
Tank D.W., et al., "Neural Computation by Concentrating Information in Time," Proceedings of the National Academy of Sciences of the United States of America, 1987, vol. 84 (7), pp. 1896-1900.
Thorpe, S.J., et al. (2001), Spike-based strategies for rapid processing. Neural Networks 14, pp. 715-725.
Thorpe, S.J., et al. (2004), SpikeNet: real-time visual processing with one spike per neuron, Neurocomputing, 58-60, pp. 857-864.
Todorov E., "Direct Cortical Control of Muscle Activation in Voluntary Arm Movements: a Model.," Nature Neuroscience, 2000, vol. 3 (4), pp. 391-398.
Victor, T., et al., "Sensitivity of Eye-movement Measurements to in-vehicle Task Difficulty," Transportation Research Part F: Traffic Psychology and Behavior, 2005, pp. 167-190.
Voutsas K., et al., A Biologically Inspired Spiking Neural Network for Sound Source Lateralization Neural Networks, IEEE Transactions on vol. 18, Issue: 6 DOI: 10.1109/TNN.2007.899623, Publication Year: 2007, pp. 1785-1799.
Wade, J.J. , et al., SWAT: A Spiking Neural Network Training Algorithm for Classification Problems, Neural Networks, IEEE Transactions on vol. 21 , Issue: 11 DOI:10.1109/TNN.2010.2074212 Publication Year: 2010 , pp. 1817-1830.
Wennekers, T., Analysis of Spatia-temporal Patterns in Associative Networks of Spiking Neurons Artificial Neural Networks, 1999. 1CANN 99. Ninth International Conference on (Conf. Publ. No. 470) vol. 1 DOI:10.1049/cp:19991116 Publication Year: 1999, vol. 1, pp. 245-250.
Won, W.J., et al., "Implementation of Road Traffic Signs Detection based on Saliency Map Model," IEEE Intelligent Vehicles Symposium, 2008, pp. 542-547.
Wu, QingXiang, et al., Edge Detection Based on Spiking Neural Network Model, ICIC 2007, LNAI 4682, pp. 26-34,2007, Springer-Verlag, Berlin Heidelberg.
Wu, QingXiang, et al. "Remembering Key Features of Visual Images based on Spike Timing Dependent Plasticity of Spiking Neurons." Image and Signal Processing, 2009. CISP'09. 2nd International Congress on. IEEE, 2009.

(56) References Cited

OTHER PUBLICATIONS

Schemmel et al., Implementing synaptic plasticity in a VLSI spiking neural network model in Proceedings of the 2006 International Joint Conference on Neural Networks (IJCNN'06), IEEE Press (2006) Jul. 16-21, 2006, pp. 1-6 [online], [retrieved on Dec. 10, 2013]. Retrieved from the Internet (URL: http://www.kip.uniheidelberg.de/veroeffentlichungen/download.cgi/4620/ps/1774.pdf).

* cited by examiner

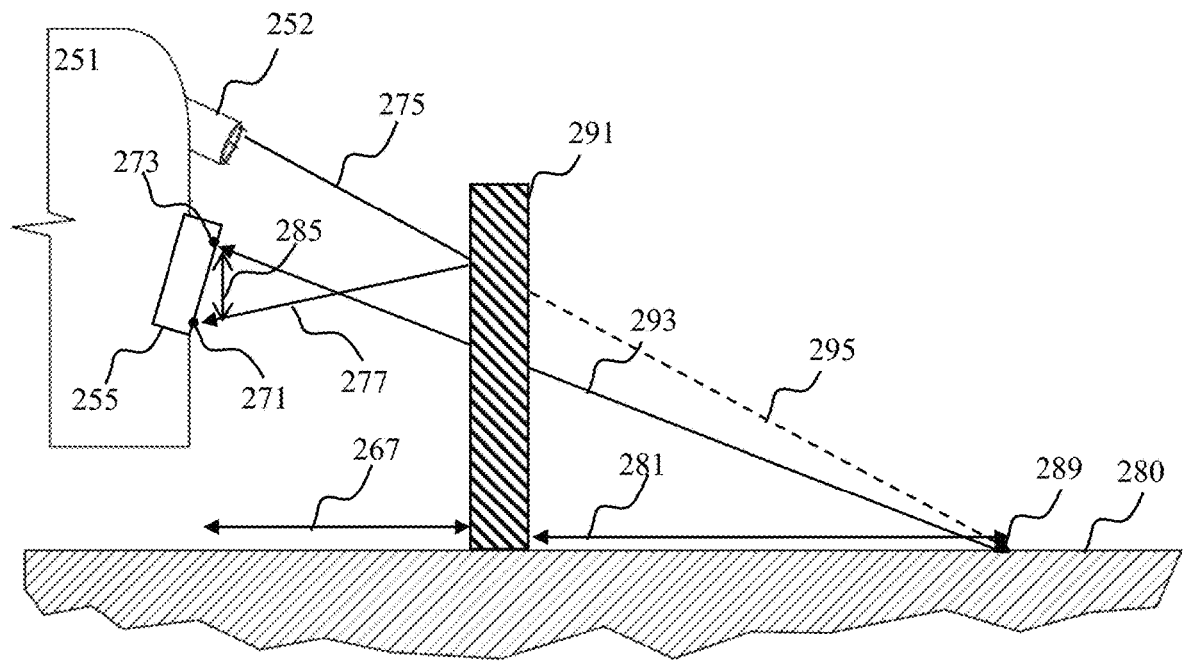
FIG. 2C
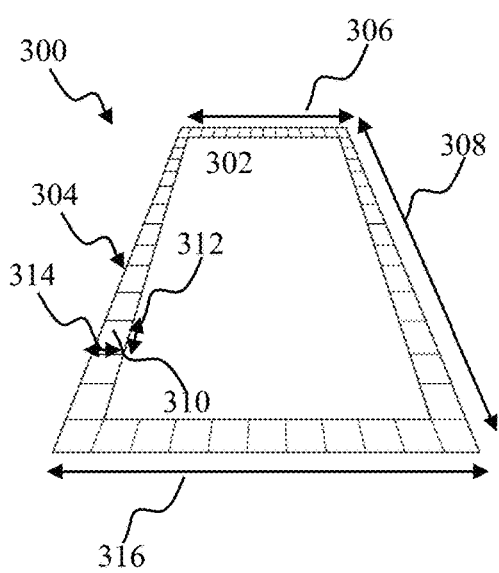 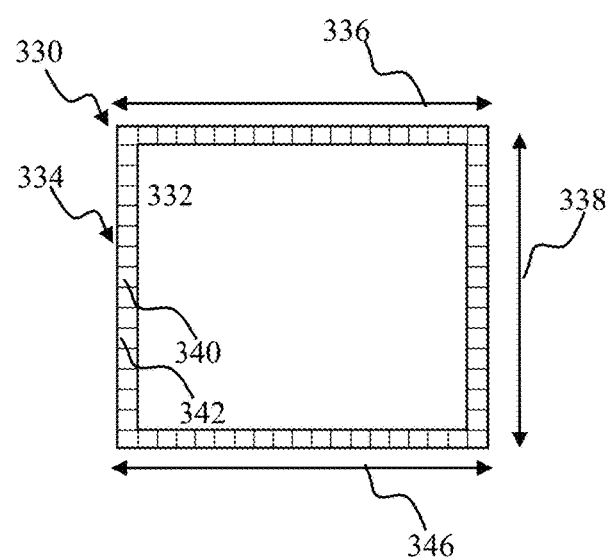
FIG. 3A FIG. 3B

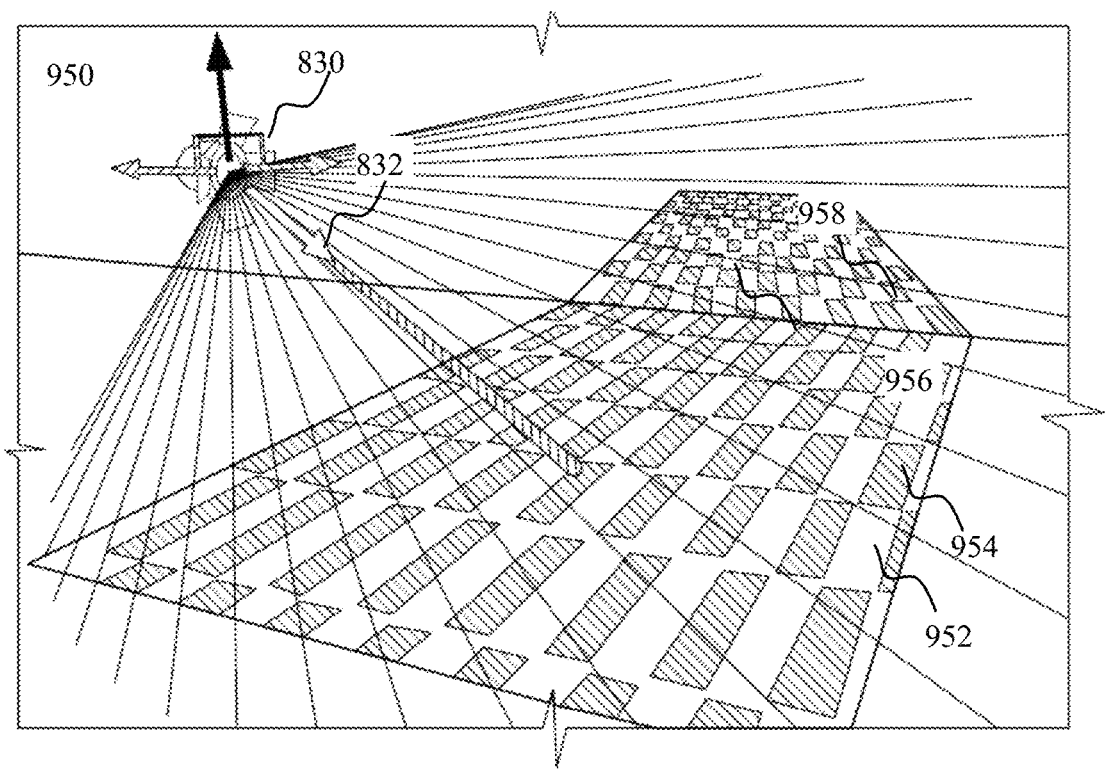
FIG. 9B
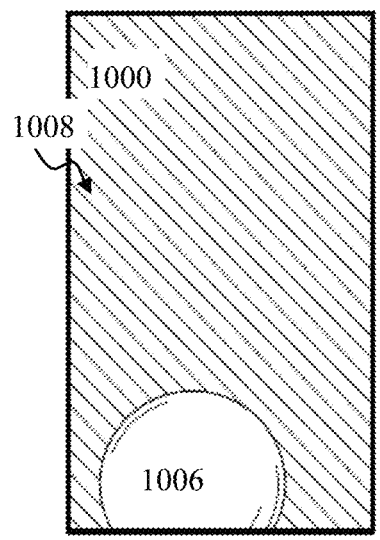 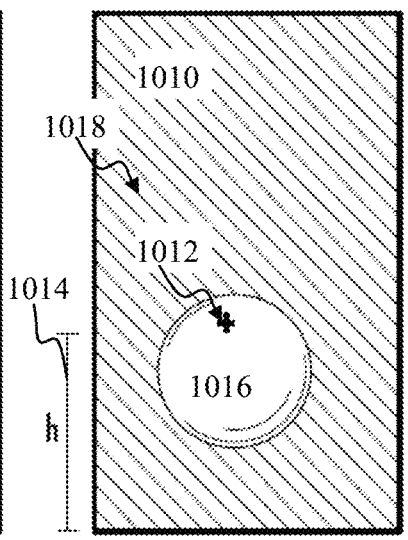 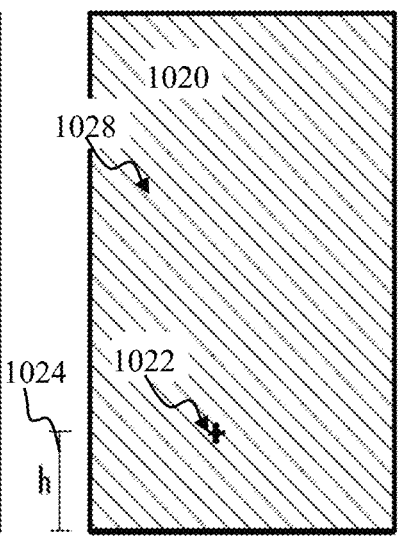
FIG. 10A        FIG. 10B        FIG. 11

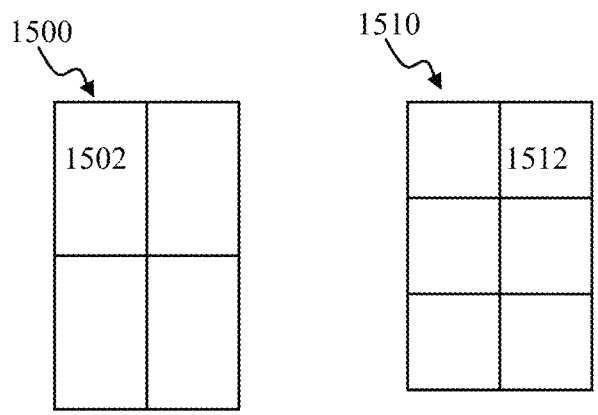
FIG. 15A
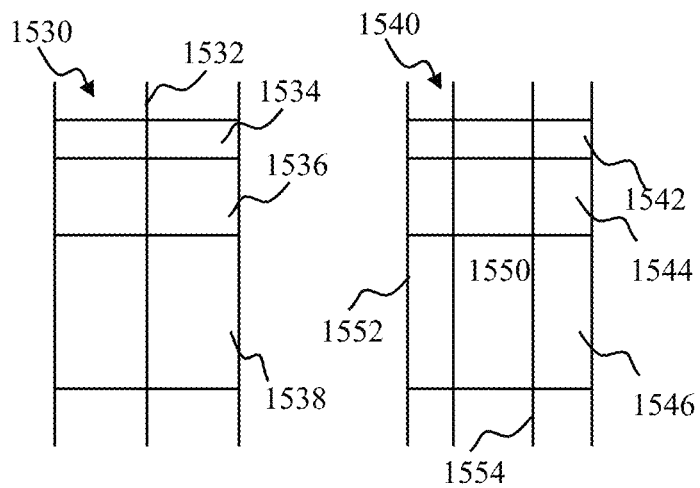 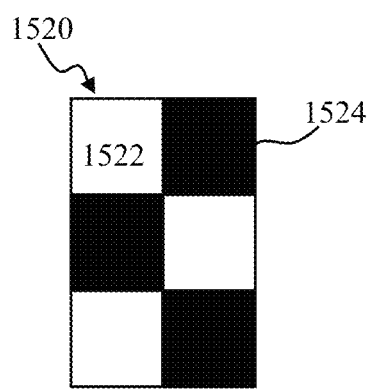
FIG. 15B          FIG. 15C
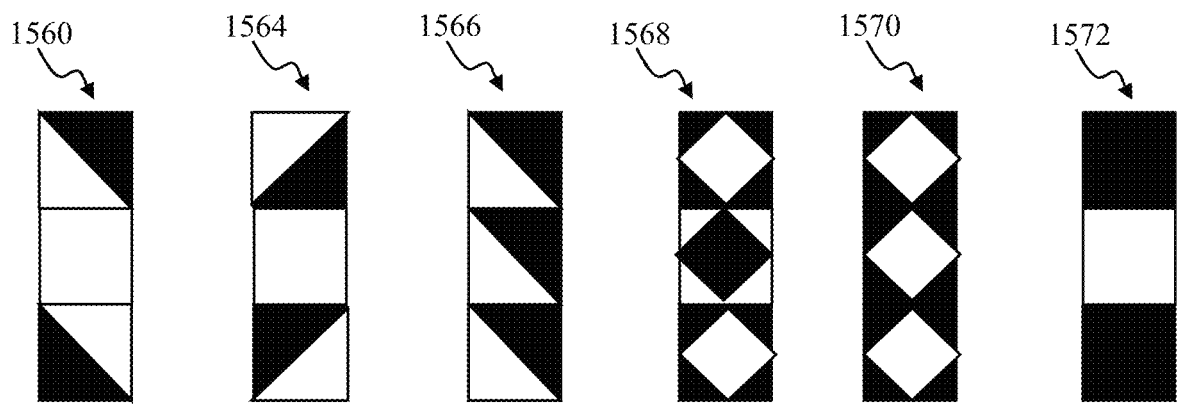
FIG. 15D

BISTATIC OBJECT DETECTION APPARATUS AND METHODS

PRIORITY AND RELATED APPLICATIONS

This application is a continuation of, and claims the benefit of priority to, co-pending and co-owned U.S. patent application Ser. No. 14/752,688 of the same title, filed Jun. 26, 2015, which is a divisional of, and claims the benefit of priority to co-owned U.S. patent application Ser. No. 14/749,423 entitled "APPARATUS AND METHODS FOR SAFE NAVIGATION OF ROBOTIC DEVICES", filed Jun. 24, 2015, now U.S. Pat. No. 9,840,003, each of the foregoing being incorporated herein by reference in its entirety.

This application is related to co-owned U.S. Provisional Patent Application Ser. No. 62/059,039 entitled "APPARATUS AND METHODS FOR TRAINING OF ROBOTS", filed Oct. 2, 2014, co-pending and co-owned U.S. patent application Ser. No. 14/070,239 entitled "REDUCED DEGREE OF FREEDOM ROBOTIC CONTROLLER APPARATUS AND METHODS", filed Nov. 1, 2013, co-owned U.S. patent application Ser. No. 14/070,269, entitled "APPARATUS AND METHODS FOR OPERATING ROBOTIC DEVICES USING SELECTIVE STATE SPACE TRAINING", filed Nov. 1, 2013, now U.S. Pat. No. 9,566,710, co-pending and co-owned U.S. patent application Ser. No. 14/613,237, entitled "APPARATUS AND METHODS FOR PROGRAMMING AND TRAINING OF ROBOTIC DEVICES", filed Feb. 3, 2015, co-owned U.S. patent application Ser. No. 14/632,842, entitled "APPARATUS AND METHODS FOR PROGRAMMING AND TRAINING OF ROBOTIC HOUSEHOLD APPLIANCES", filed Feb. 26, 2015, now U.S. Pat. No. 9,717,387, co-owned U.S. patent application Ser. No. 14/542,391 entitled "FEATURE DETECTION APPARATUS AND METHODS FOR TRAINING OF ROBOTIC NAVIGATION", filed Nov. 14, 2014, now U.S. Pat. No. 9,630,318, co-pending and co-owned U.S. patent application Ser. No. 14/244,890 entitled "APPARATUS AND METHODS FOR REMOTELY CONTROLLING ROBOTIC DEVICES", filed Apr. 3, 2014, co-pending and co-owned U.S. patent application Ser. No. 13/918,338 entitled "ROBOTIC TRAINING APPARATUS AND METHODS", filed Jun. 14, 2013, co-owned U.S. patent application Ser. No. 13/918,298 entitled "ROBOTIC TRAINING APPARATUS AND METHODS", filed Jun. 14, 2013, now U.S. Pat. No. 9,384,443, co-owned U.S. patent application Ser. No. 13/907,734 entitled "ADAPTIVE ROBOTIC INTERFACE APPARATUS AND METHODS", filed May 31, 2013, now U.S. Pat. No. 9,242,372, co-owned U.S. patent application Ser. No. 13/842,530 entitled "ADAPTIVE PREDICTOR APPARATUS AND METHODS", filed Mar. 15, 2013, now U.S. Pat. No. 9,764,468, co-owned U.S. patent application Ser. No. 13/842,562 entitled "ADAPTIVE PREDICTOR APPARATUS AND METHODS FOR ROBOTIC CONTROL", filed Mar. 15, 2013, co-owned U.S. patent application Ser. No. 13/842,616 entitled "ROBOTIC APPARATUS AND METHODS FOR DEVELOPING A HIERARCHY OF MOTOR PRIMITIVES", filed Mar. 15, 2013, co-owned U.S. patent application Ser. No. 13/842,647 entitled "MULTICHANNEL ROBOTIC CONTROLLER APPARATUS AND METHODS", filed Mar. 15, 2013, and co-owned U.S. patent application Ser. No. 13/842,583 entitled "APPARATUS AND METHODS FOR TRAINING OF ROBOTIC DEVICES", filed Mar. 15, 2013, each of the foregoing being incorporated herein by reference in its entirety.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Technological Field

The present disclosure relates to, inter alia, adaptive control, training and operation of robotic devices.

Background

Robotic devices may be used in a variety of applications, such as manufacturing, medical, safety, military, exploration, maintenance, and/or other applications. Some applications (e.g., robotic cleaning of premises) may cause operation of robotic devices in presence of obstacles (e.g., stock items) and/or people (e.g., shoppers, store personnel).

SUMMARY

In a first aspect of the invention, an object detection sensor apparatus is disclosed. In one embodiment, the object detection sensor apparatus comprises: a transmitter component configured to project a pattern by irradiating a portion of an environment using a carrier wave; a detector component configured to detect a reflected pattern of the carrier wave; and a processing component. In one exemplary embodiment, the processing component is configured to: evaluate a parameter of the detected reflected pattern; and based on the parameter breaching a threshold, produce an indication of an object being present within the portion of the environment.

In one variant, the carrier wave is selected from the group consisting of: a sound wave, a visible light wave, and an infrared wave.

In a second variant, the object detection sensor apparatus is configured to be disposed on a robotic device configured to traverse along a surface; and the portion of the environment comprises a portion of the surface in front of the robotic device. In one case, the object detection sensor apparatus is disposed at a height above the surface; the transmitter component is characterized by a first angle of view; the detector component is characterized by a second angle of view; and the portion of the surface in front of the robotic device is spaced from the robotic device by a blanking distance. In one exemplary case, the detector component is spaced from the transmitter component by a separation distance; the indication of the object being present within the portion of the environment is configured to be produced by an object detection process, the object detection process being characterized by a lower bound of object resolvable size; and an increase in the separation distance is configured to cause a reduction of the lower bound of object resolvable size. In a particular such implementation, the carrier wave comprises a visible light wave; the detector component comprises a camera configured to produce an image comprising a plurality of pixels; and for a given size of the image, an increase of a number of the plurality of pixels is configured to cause the reduction of the lower bound of object size. In another exemplary case, the reflected pattern detected by the detector component is characterized by a perspective distortion relative to the projected pattern; and dimensions of the projected pattern are configured in accordance with a counter-distortion process configured to compensate for the perspective distortion. In a third exemplary case, the transmitter component comprises a visible light emitter and a mask component, the mask component configured to shape emitted light into the projected pattern characterized by a longitudinal dimension and a transverse dimension; and the transverse dimension is selected to match a width of the robotic device. In a fourth exemplary case, the transmitter component comprises a digital light projector operably coupled to the processing component, the digital light projector being configured to produce the projected pattern characterized by a longitudinal dimension and a transverse dimension; and the transmitter component is configured to dynamically adjust the transverse dimension based on a signal from the processing component, the signal being indicative of a width of the robotic device. In one such implementation, the transmitter component is configured to dynamically adjust the longitudinal dimension based on another signal from the processing component, the another signal being indicative of a speed of the robotic device.

In a second aspect of the invention, a method for detecting an object by a computerized robotic apparatus configured to clean a surface. In one such embodiment, the method includes: configuring a reference pattern; projecting the reference pattern onto a surface in front of the robotic apparatus using a light emitter component; detecting a reflected pattern by a camera component, the camera component being configured to produce a digital image; analyzing the digital image to determine a parameter of the reflected pattern; and based on the parameter of the reflected pattern breaching a threshold, producing an indication of the object being present in front of the robotic apparatus.

In one variant, the projected reference pattern comprises an encoded portion, the encoded portion comprising a plurality of elements and a background portion; and the encoded portion is configured to produce the reflected pattern characterized by a first area of increased contrast compared to a second area associated with the background portion. In one such case, the act of configuring the reference pattern comprises: selecting a pattern width in accordance with a width of the robotic apparatus; and selecting a pattern length in accordance with a speed of the robotic apparatus. In another such case, the encoded portion comprises a plurality of lines arranged in a grid configuration; and the act of configuring the reference pattern comprises selecting one or more of a line width and the grid configuration. In one specific implementation, the plurality of elements of the grid configuration comprises one or more elements of varying width or height. In a third such case, the encoded portion comprises a plurality of rectangles arranged in a grid configuration; and the act of configuring the reference pattern comprises selecting one or more of: rectangle dimensions, a checkerboard-like pattern, and/or the grid configuration. In one such implementation, the reference pattern comprises a checkerboard-like pattern comprising elements of alternating black and white elements.

In a second variant, the projected reference pattern comprises an encoded portion and a target portion; the encoded portion comprises at least one element characterized by a first light characteristic configured to differ from a second light characteristic of the target portion; the parameter of the reflected pattern comprises a height above a surface comprising the at least one element; and the threshold is based on an expected reference width or an expected reference length of the projected reference pattern comprising the at least one element when the object is not present in front of the robotic apparatus. In one such variant, the reference width or length corresponds to another reflected pattern projected onto a surface in an absence of the object. In another such variant, the at least one element is further characterized by one or both of a light wavelength and a light intensity.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

FIG. 2C is a graphical illustration depicting signal reflection from an object for use with the bistatic sensor apparatus of the disclosure disposed on a robotic device, in accordance with one or more implementations.

FIG. 3A illustrates projected spatial pattern for use with the bistatic sensor apparatus of the present disclosure in accordance with one implementation.

FIG. 3B illustrates a pattern received by the bistatic sensor apparatus and corresponding to the projected pattern of FIG. 3A in accordance with one implementation.

FIG. 9B virtual world simulation of a wall-induced pattern distortion as sensed by the sensor apparatus of the present disclosure.

FIGS. 10A-11 illustrate use of a sub-component within a projected pattern for detecting presence of an object in accordance with one or more implementations.

FIGS. 15A-15D illustrate exemplary patterns for use with the bistatic sensor apparatus of the present disclosure in accordance with some implementations.

Figure 1:
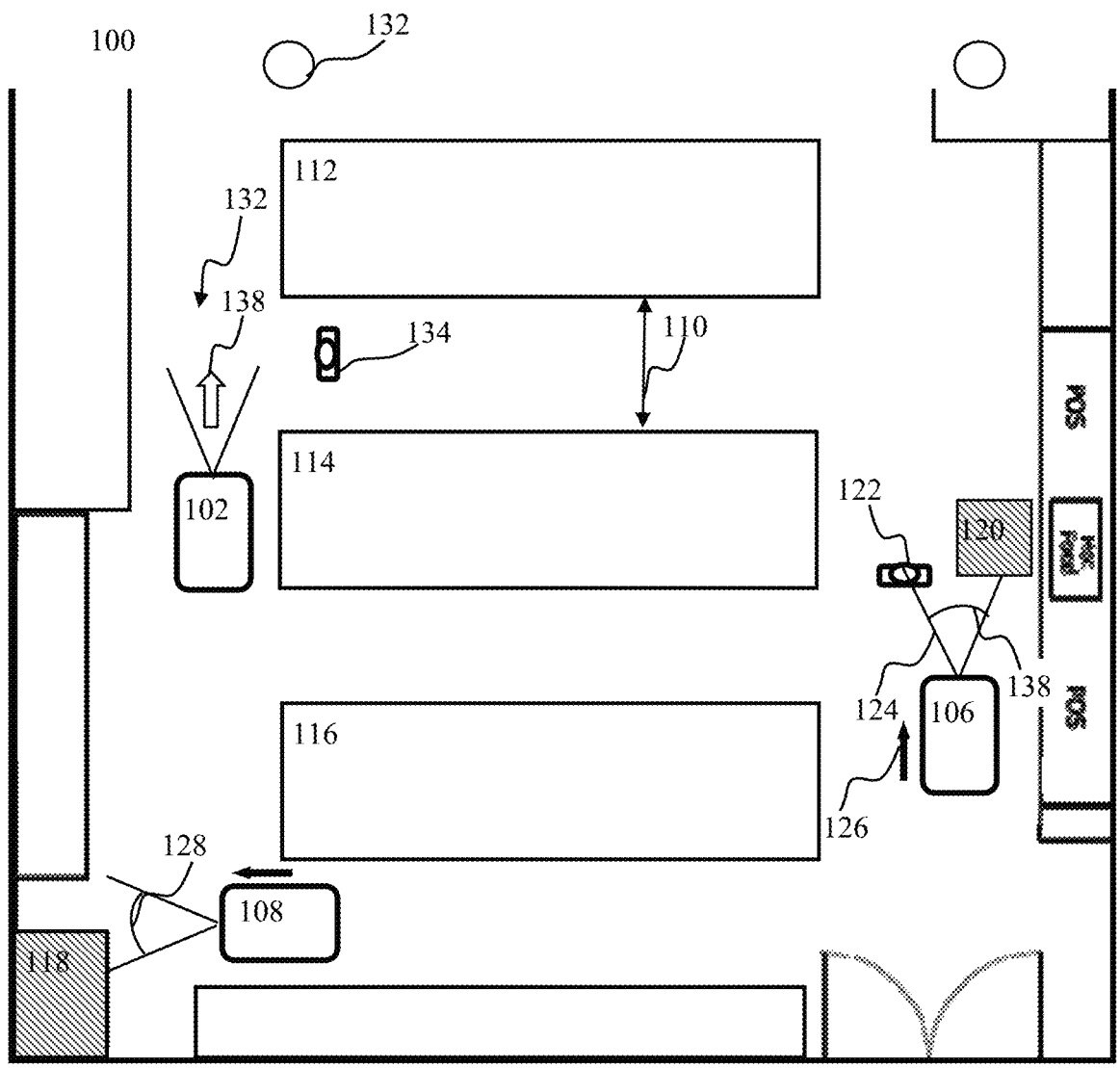
FIG. 1 is block diagram illustrating operation of a robotic apparatus of the present disclosure on premises of a retail store in accordance with one implementation of the present disclosure.

All Figures disclosed herein are © Copyright 2015 Brain Corporation. All rights reserved.

DETAILED DESCRIPTION

Implementations of the present technology will now be described in detail with reference to the drawings, which are provided as illustrative examples so as to enable those skilled in the art to practice the technology. Notably, the figures and examples below are not meant to limit the scope of the present disclosure to a single implementation, but other implementations are possible by way of interchange of, or combination with some or all of the described or illustrated elements. Wherever convenient, the same reference numbers will be used throughout the drawings to refer to same or like parts.

Where certain elements of these implementations can be partially or fully implemented using known components, only those portions of such known components that are necessary for an understanding of the present technology will be described, and detailed descriptions of other portions of such known components will be omitted so as not to obscure the disclosure.

In the present specification, an implementation showing a singular component should not be considered limiting; rather, the disclosure is intended to encompass other implementations including a plurality of the same components, and vice-versa, unless explicitly stated otherwise herein.

Further, the present disclosure encompasses present and future known equivalents to the components referred to herein by way of illustration.

As used herein, the term "bus" is meant generally to denote all types of interconnection or communication architecture that is used to access the synaptic and neuron memory. The "bus" may be optical, wireless, infrared, and/or another type of communication medium. The exact topology of the bus could be for example, a standard "bus", hierarchical bus, network-on-chip, address-event-representation (AER) connection, and/or other type of communication topology used for accessing, e.g., different memories in a pulse-based system.

As used herein, the terms "computer", "computing device", and "computerized device" may include one or more of personal computers (PCs) and/or minicomputers (e.g., desktop, laptop, and/or other PCs), mainframe computers, workstations, servers, personal digital assistants (PDAs), handheld computers, embedded computers, programmable logic devices, personal communicators, tablet computers, portable navigation aids, J2ME equipped devices, cellular telephones, smart phones, personal integrated communication and/or entertainment devices, and/or any other device capable of executing a set of instructions and processing an incoming data signal.

As used herein, the term "computer program" or "software" may include any sequence of human and/or machine cognizable steps which perform a function. Such program may be rendered in a programming language and/or environment including one or more of C/C++, C #, Fortran, COBOL, MATLAB™, PASCAL, Python, assembly language, markup languages (e.g., HTML, SGML, XML, VoXML), object-oriented environments (e.g., Common Object Request Broker Architecture (CORBA)), Java™ (e.g., J2ME, Java Beans), Binary Runtime Environment (e.g., BREW), and/or other programming languages and/or environments.

As used herein, the terms "connection", "link", "transmission channel", "delay line", and "wireless" may include a causal link between any two or more entities (whether physical or logical/virtual), which may enable information exchange between the entities.

As used herein, the term "memory" may include an integrated circuit and/or other storage device adapted for storing digital data. By way of non-limiting example, memory may include one or more of ROM, PROM, EEPROM, DRAM, Mobile DRAM, SDRAM, DDR/2 SDRAM, EDO/FPMS, RLDRAM, SRAM, "flash" memory (e.g., NAND/NOR), memristor memory, PSRAM, and/or other types of memory.

As used herein, the terms "integrated circuit", "chip", and "IC" are meant to refer to an electronic circuit manufactured by the patterned diffusion of trace elements into the surface of a thin substrate of semiconductor material. By way of non-limiting example, integrated circuits may include field programmable gate arrays (FPGAs), programmable logic devices (PLD), reconfigurable computer fabrics (RCFs), application-specific integrated circuits (ASICs), and/or other types of integrated circuits.

As used herein, the terms "microprocessor" and "digital processor" are meant generally to include digital processing devices. By way of non-limiting example, digital processing devices may include one or more of digital signal processors (DSPs), reduced instruction set computers (RISC), complex instruction set computers (CISC) processors, microprocessors, gate arrays (e.g., field programmable gate arrays (FPGAs)), PLDs, reconfigurable computer fabrics (RCFs), array processors, secure microprocessors, application-specific integrated circuits (ASICs), and/or other digital processing devices. Such digital processors may be contained on a single unitary IC die, or distributed across multiple components.

As used herein, the term "network interface" refers to any signal, data, and/or software interface with a component, network, and/or process. By way of non-limiting example, a network interface may include one or more of FireWire (e.g., FW400, FW800, etc.), USB (e.g., USB2.0, USB3.0, USB3.1), Ethernet (e.g., 10/100, 10/100/1000 (Gigabit Ethernet), 10-Gig-E, etc.), MoCA, Coaxsys (e.g., TVnet™), radio frequency tuner (e.g., in-band or out-of-band (OOB) cable modem, etc.), Wi-Fi (802.11), WiMAX (802.16), PAN (e.g., 802.15), cellular (e.g., 3G, LTE/LTE-A/TD-LTE, GSM, etc.), IrDA families, and/or other network interfaces.

As used herein, the terms "node", "neuron", and "neuronal node" are meant to refer, without limitation, to a network unit (e.g., a spiking neuron and a set of synapses configured to provide input signals to the neuron) having parameters that are subject to adaptation in accordance with a model.

As used herein, the term "Wi-Fi" includes one or more of IEEE-Std. 802.11, variants of IEEE-Std. 802.11, standards related to IEEE-Std. 802.11 (e.g., 802.11 a/b/g/n/s/v), and/or other wireless standards.

As used herein, the term "wireless" means any wireless signal, data, communication, and/or other wireless interface. By way of non-limiting example, a wireless interface may include one or more of Wi-Fi, Bluetooth, 3G (3GPP/3GPP2), HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, LTE/LTE-A/TD-LTE, analog cellular, CDPD, satellite systems, millimeter wave or microwave systems, acoustic, infrared (i.e., IrDA), and/or other wireless interfaces.

Robotic devices may be used for performing maintenance of residential and/or commercial premises (e.g., retail stores, warehouses, meeting halls, stadiums) and/or other applications. By way of an illustration, an autonomous robotic cleaning apparatus may be employed for cleaning floors in a retail store. Environment in the store premises may be modified on a daily/weekly basis, e.g., during restocking operations and/or by placement of promotional items for a given period of time at a given location. Presence of humans (e.g., customers and/or store personnel) may alter the environment. The autonomous robotic device may comprise an object detection sensor apparatus configured to detect presence of objects in the environment. The sensor apparatus may comprise a transmitter component and a receiver component spaced from the transmitter component. Such configuration wherein the transmitter and the receiver sensor are not-collocated (e.g., displaced from one another) may be referred to as the bistatic sensor configuration. The transmitter may transmit a two dimensional pattern comprised of a given pattern (e.g., grid, checkered, and/or similar others) via a carrier signal (e.g., light). The transmitted radiation may reflect from objects within the environment (e.g., floor, wall, pallet of goods, and/or other objects). The received pattern may be analyzed. Discrepancies between an expected pattern (e.g., corresponding to reflections of the carrier in absence of obstacles) and the received pattern may be used to determine presence of an object within the sensing volume of the bistatic sensor. In some implementations, the analysis of the received pattern may be used to determine deviations of one or more pattern elements relative to a reference (e.g., vertical deviations with respect to the floor).

In some implementations, the received pattern may be compared to the transmitted pattern in order to determine one or more areas in the environment that have not been irradiated by the transmitted carrier. Such areas (also referred to as "shadows" and/or "holes") may correspond to obstructions due to an object being present within the sensor apparatus transmitter and/or receiver field of view. In some implementations, the sensor apparatus of the disclosure may be used to communicate (advertise) information related to present action being executed by the robotic device. By way of an illustration, the robotic device moving forward in a straight line may utilize the transmitter component of the bistatic sensor apparatus in order to project a forward arrow in the floor in front of the robotic device. Such action advertisement may inform humans within the premises of robot actions and/or to enable the humans to avoid the robot.

In some such variants, the information is transmitted based on one or more trigger events. For example, the robot may conditionally determine when to enable or disable the transmitted carrier based on one or more environmental considerations, learned/training considerations, historic considerations, received instructions, etc. For example, a robot that determines that other entities (such as persons within the vicinity) may be unaware of its presence or trajectory (an absence of direct visibility or line-of-sight to the robot), may trigger a precautionary warning signal to prevent collisions. In other examples, a robot may enable information transmission when it is in unfamiliar environments so as to assist in training exercises, etc. Those of ordinary skill in the related arts will readily appreciate the wide array of circumstances under which the foregoing triggered operation may find application.

In some cases, the robot may infer the success/failure of communication based on a measurable metric and responsively adjust its behavior. For example, a robot may infer a reduction of a probability of collision based on an increasing distance between a person and the robot as compared to the rate of change of the distance immediately prior the action (thereby signifying that the person has changed course and is moving away from the robot's trajectory, etc.) In some cases, the failure of communication may result in adjustment of the robot's own action; e.g., the robot may change a projected image (from a yellow to red, from static to dynamic images, etc.), add an audio signal (or change an audio volume), and/or change its own trajectory to avoid collision, and/or perform other actions.

FIG. 1 illustrates operation of a robotic apparatus of the disclosure in an environment comprising objects and/or humans in accordance with one implementation. The layout 100 may correspond to a floor plan or a retail store, layout of a shopping mall, an exhibit hall and/or other premises. In some implementations, rectangles 112, 112, 116, 118 may denote one or more of a shelf, a rack, a cabinet, a pallet, a display, a stack, a bin, a container, a box, a pail, and/or other implements for displaying product in a store. One or more shelves (e.g., 112, 114) may be spaced by one or more aisles (e.g., aisle width denoted by arrow 110 in FIG. 1). The premises layout 100 may comprise one or more humans denoted by icons 122, 134 and corresponding to e.g., store personnel, vendors, shoppers, and/or other categories.

One or more autonomous robotic devices 102, 106, 108 may be operable within the premises 100. The autonomously operating robotic device may be used for a variety of tasks, e.g., floor cleaning (e.g., vacuuming, dusting, scrubbing, polishing, waxing, and/or other cleaning operation), survey (e.g., product count), and/or other operations. Dimensions of the robotic device (e.g., 102) may be configured in accordance with operational environment of the device (e.g., minimum aisle width, available cleaning time, and/or another task parameter).

In some implementations, the autonomously operating robotic device may be used for assisting customers by e.g., identifying a customer in need of assistance and offering the customer assistance via a machine-human interface. In one or more implementations, the human-machine interface may be based on sound, light, display, gesture, and/or other interface component. Customer detection may comprise analysis of customer posture, movement, gestures, facial expression, speech, sounds, and/or other behavior characteristics provided via camera and/or audio sensor.

One or more autonomously operating robotic devices (e.g., 102, 106, 108) may be configured to navigate the premises 100 along a trajectory. In some implementations, the trajectory may comprise a pre-configured trajectory (e.g., pre-programmed, pre-trained) and/or adaptively learned trajectory). In some implementations, the trajectory configuration may be effectuated using a methodology of combining programming and training e.g., such as described in co-owned and co-pending U.S. patent application Ser. No. 14/613,237, entitled "APPARATUS AND METHODS FOR PROGRAMMING AND TRAINING OF ROBOTIC DEVICES", filed Feb. 3, 2015, incorporated supra.

In some implementations, training of the trajectory may be accomplished using a plurality of training trials. An individual trial may comprise an instance of the trajectory navigation. Training may be effectuated using supervised learning methodology, e.g., such as described in co-owned and co-pending U.S. patent application Ser. No. 14/070,239 entitled "REDUCED DEGREE OF FREEDOM ROBOTIC CONTROLLER APPARATUS AND METHODS", filed Nov. 1, 2013, U.S. patent application Ser. No. 14/070,269, entitled "APPARATUS AND METHODS FOR OPERATING ROBOTIC DEVICES USING SELECTIVE STATE SPACE TRAINING", filed Nov. 1, 2013, and/or U.S. patent application Ser. No. 14/542,391 entitled "FEATURE DETECTION APPARATUS AND METHODS FOR TRAINING OF ROBOTIC NAVIGATION" filed Nov. 14, 2014, each of the foregoing being incorporated, supra.

The premises environment (e.g., illustrated by layout 100) may comprise a given number of objects (e.g., shelves, product displays, furniture, building elements (e.g., partitions, walls, doorways, doors, pillars e.g., 132 in FIG. 1, and/or other elements) infrastructure components (point of sale) and/or other components. During a premises familiarization phase, the robotic apparatus may be configured to explore the premises environment in order to, e.g., to produce a map of the premises (e.g., such as shown in FIG. 1). The map of the environment may be stored in the non-transitory memory of the robot.

In one exemplary embodiment, premises exploration may be effectuated using a training approach, a pre-configured approach, and/or a combination thereof. In some implementations given a map of the environment, the robotic apparatus may cover/navigate traversable areas within the map along an optimal path, e.g. for vacuuming, scrubbing, dust-mopping, inspection, and/or other purposes. In some cases, the robotic apparatus may further optimize the exploration phase for various conditions and/or parameters e.g., transit time, energy use, area coverage, and/or other parameters.

In some implementations a map of the environment may be used by the robotic apparatus in order to localize itself within the premises (e.g., determining globally and/or locally referenced coordinates). In some implementations where the robot is capable of localizing itself, the robot may be able to perform certain additional functionalities including but not limited to: path following, area coverage, and/or other tasks.

In some implementations of premises exploration, an existing premises layout (e.g., an architectural floor plan), may be utilized by the robotic apparatus to navigate the premises.

In one or more implementations, the robot may be configured to explore the premises area. Premises exploration may comprise determination of locations of objects within the premises and construction of the premises map using location of the robot and data provided by one or more sensors. Various sensor methodologies may be utilized, e.g., camera, LiDAR, acoustic ranging, radio frequency ranging, proximity beacons, and/or other methodologies. In some implementations, the robotic may incorporate software analysis tools such as grid-based simultaneous localization and mapping (SLAM) e.g., such as GMapping library (https://www.openslam.org/gmapping.html) which implements an existing highly efficient Rao-Blackwellized particle filter SLAM algorithm to learn grid maps from laser range data. In some implementations, sensors such as red, green, blue, depth (RGBD) cameras (e.g. structured light-based, time-of-flight sensors (e.g., epc600 produced by ESPROS Photonics AG), and/or other sensors) may be utilized with the GMapping library. Beacon based solutions may be utilized to enable a robotic device to localize itself relative to the beacons placed within the environment. In some implementations, beacons may enable location triangulation based on e.g., light waves, radio waves (e.g., ultra-wideband, Bluetooth) and/or other location estimation schemes.

In some implementations, a combination of pre-existing map and sensor-based exploration may be utilized in order to obtain an up-to-date premises map. By way of an illustration, an imperfect store layout may be improved (more details added and/or errors corrected) with GMapping. Such approach may shorten the time needed for mapping.

In one or more implementations of premises exploration, the map of the premises may be pre-loaded into non-transitory memory of the robotic apparatus.

During operation, the layout map may be recalled and utilized for navigating the premises. In some implementations, e.g., of nighttime cleanup operations, the layout map may provide an adequate amount of detail for successful navigation of the premises. In one or more implementations, the navigation success may be characterized by one or more of an absence of collisions with objects within the premises, area coverage, energy use, traverse time, and/or other performance characteristics associated with a given task.

In some implementations, e.g., daytime operations and/or nighttime cleanup during restocking), the layout map may become out of date as additional objects (e.g., a product display 118 may added, displaced (e.g., product display 120)

and/or some objects missing (removed). One or more humans (122, 134) may be present on the premises. The robotic device may be configured for dynamic autonomous detection of objects within the elements. As used herein the term "object" may be used to describe a shelf, a doorway, a pillar, a wall, a human, a display, and/or another physical entity that may protrude above a surface (e.g., floor) being navigated by the robotic device and that may potentially interfere with the task being executed by the robotic device.

In some implementations, object detection by the robotic device may be effectuated using a bistatic sensor apparatus, e.g., such as described below with respect to FIGS. 2-15. The bistatic sensor apparatus may illuminate a sensing volume proximate the robotic device using one or more wave carriers. In one or more implementations, the wave carrier may comprise visible light, audible waves, and/or other wave modality. In FIG. 1, the sensing volume is denoted by lines 124 and comprises illuminated volume in front of the robotic device 106 that may be moving along direction indicated by the solid arrow 126. The sensing volume may be characterized by a horizontal extent (e.g., denoted by arc 138, 128 in FIG. 1) and/or vertical extent (e.g. denoted by arc 218 in FIG. 2A).

The bistatic sensor apparatus may project a given pattern into sensing volume. The reflected pattern may be sampled by the bistatic sensor. An object being present within the sensing volume (e.g., human 122, product display 120, 118) may alter the sensed (reflected) pattern. Analysis of the sensed pattern may enable detection in real time of one or more objects being present in pathway of the robotic device thereby enabling autonomous operation of the robotic device in presence of potential obstructions.

In some implementations, the sensor apparatus of the disclosure may be configured to communicate information related to an action being presently executed by the robotic device. By way of an illustration, the transmitter component of the sensor may be used to project a pattern comprising an arrow 138 indicating direction of motion and/or velocity of the robotic device 102. A human 134 strolling through the aisle 110 may observe the arrow 138 and refrain from entering the aisle in front of the moving robotic device 102. In one or more implementations, the pattern projected by the transmitter may comprise one or more of a static image, a pattern, and/or an animation configured to communicate information related to trajectory of the robot into, product information and/or advertisements, and/or and other store related information (e.g., safe exit route) into the environment. In one exemplary embodiment, the projected pattern is a human-readable indicia; such human-readable indicia are not limited to readable text, but may incorporate symbols, color, signage, and/or other indicia and/or audio/visual elements which may be understood by a human observer. For example, an arrow may have a length which is modulated in accordance with a speed of a moving robotic device. In another example, an arrow may flash at a frequency proportional to the speed of the moving robotic device.

Figure 2A:
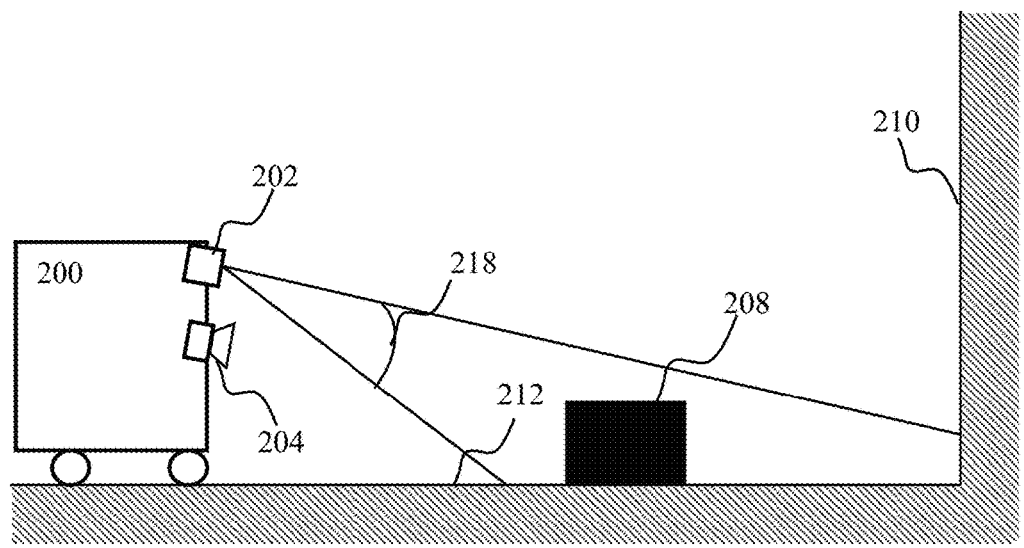
FIG. 2A is a graphical illustration depicting a robotic vehicle comprising bistatic sensor apparatus of the present disclosure, in accordance with one or more implementations.

FIG. 2A illustrates operation of a robotic vehicle comprising a bistatic sensor apparatus, in accordance with one or more implementations. The robotic vehicle 200 may comprise one of the autonomous robotic devices 102, 106, 108 described above with respect to FIG. 1. The autonomously operating robotic device 200 of FIG. 2A may be used for a variety of tasks, e.g., floor cleaning (e.g., vacuuming, dusting, scrubbing, polishing, waxing, and/or other cleaning operation), survey (e.g., product count), and/or other operations. In some implementations, the autonomously operating robotic device may be used for assisting customers by e.g., identifying a customer in need of assistance and offering the customer assistance via a machine-human interface. In one or more implementations, the human-machine interface may be based on sound, light, display, gesture, and/or other interface component. Customer detection may comprise analysis of customer posture, movement, gestures, facial expression, speech, sounds, and/or other behavior characteristics provided via camera and/or audio sensor.

Dimensions of the robotic device may be selected sufficient to support the sensor components 202, 204, e.g., greater than 0.1 m in height in some implementations. The robotic device may be configured to traverse the environment at a speed selected from the range between 0.05 m/s and 10 m/s. In some implementations, the device 200 may comprise a robotic floor cleaning device with the following dimensions: width of 0.8 m, length of 1.6 m and height of 1.14 m. The floor cleaning device may be configured to move during operation at a speed between 0.01 m/s and 3 m/s. The robotic device with above dimensions may be configured to operate within a premises characterized by aisle dimensions (e.g., 110) between 1.2 m and 2.7 m.

The device 200 may comprise a sensor apparatus configured to detect presence of objects in the environment and/or communicate information into the environment. The sensor apparatus may comprise a transmitter component 202 and a receiver component 204. The transmitter and the receiver components may be disposed spaced from one from one another in a bistatic configuration. In one or more implementations, the transmitter may comprise a visible light source, an infrared source, an audible wavelength source, an ultrasonic wave source, a radio wave source, and/or other carrier type source. In some implementations of visible light transmissions, the source may comprise a light emitting diode, a laser beam source and a pattern shaping mask, and/or other implementations configured to project a two dimensional pattern of light. The transmitter may be characterized by a field of view denoted by arcs 218 in FIG. 2A and 128, 138 in FIG. 1. Center axis of the transmitter 202 field of view 218 may be inclined with respect to the plane of operation of the apparatus 200 (e.g., the plane 212 in FIG. 2A). The transmitter may transmit a two dimensional pattern comprised of a given pattern (e.g., grid, checkered, and/or other) via a carrier signal (e.g., light).

The receiver component 204 of the sensor apparatus may comprise a light capturing sensor (e.g., a camera), an infrared detector, an acoustic transducer (e.g., a microphone), a radio wave antenna, and/or other sensor configured to detect reflected carrier waves corresponding to the modality of the transmitter 202. The carrier waves transmitted by the component 202 may be reflected by one or more elements within the environment, e.g., floor 212, wall 210, and/or object 208. In some implementations, the object 208 may comprise product display 120 of FIG. 1. Reflected carrier waves may be detected by the receiver 204 to produce received pattern. The received pattern may be analyzed in order to determine presence of objects (e.g., the wall 210, the object 208) in the path of the apparatus 200. The received pattern may be analyzed. Discrepancies between an expected pattern (e.g., corresponding to reflections of the carrier in absence of obstacles) and the received pattern may be used to determine presence of an object within the sensing volume of the bistatic sensor. In some implementations, the analysis of the received pattern may be used to determine deviations of one or more pattern elements relative to a reference (e.g., vertical deviations with respect to the floor).

Figure 2B:
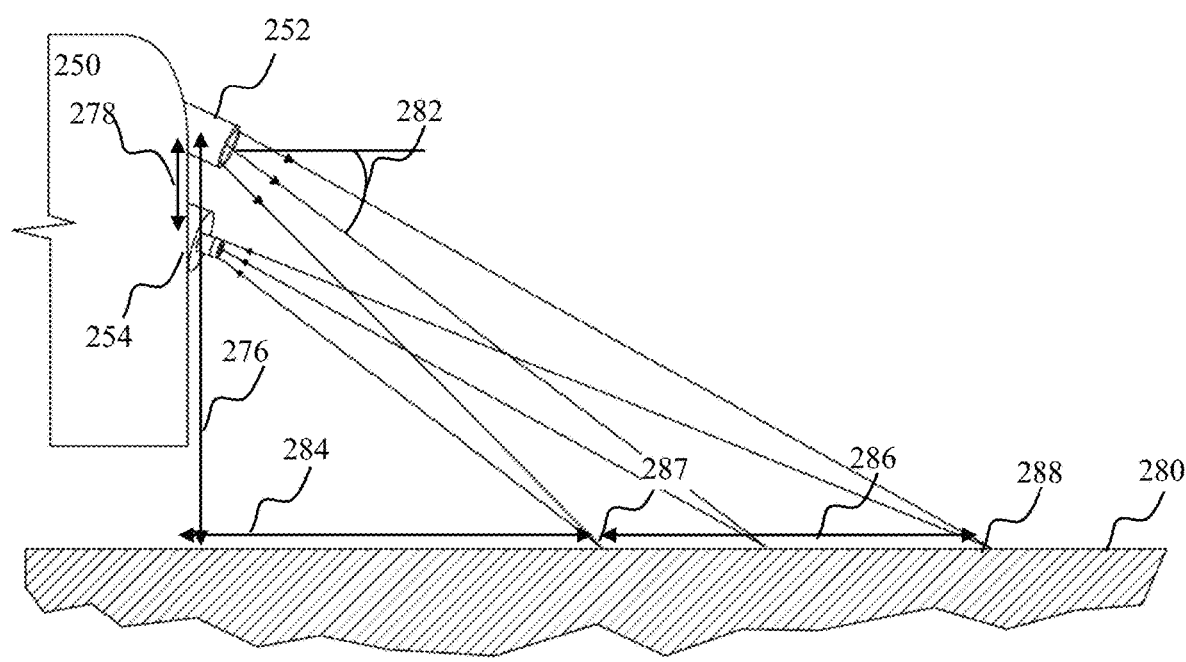
FIG. 2B is a graphical illustration depicting a configuration of the bistatic sensor apparatus of the present disclosure disposed on a robotic device and configured for obstacle detection and information communication/projection, in accordance with one or more implementations.

FIG. 2B illustrates one configuration of the bistatic sensor apparatus of the present disclosure disposed on a robotic device and configured for obstacle detection and information communication/projection, in accordance with one or more implementations.

The robotic device 250 may comprise a sensor apparatus comprising a light projector component 252 and a camera component 254 configured to detect presence of objects in front of the device 250. In some implementations, the projector component may be configured to emit light of wavelength of within visible and/or infrared portion of the electromagnetic spectrum over field of view characterized by horizontal angular dimension selected between 5° and 40° and vertical angular dimension selected between 5° and 40°; in one such implementation, the vertical angular dimension is 20°. The projector component may be elevated above the floor surface by a distance 276. In some implementations, the distance 276 may be selected between 0.1× and 2× height of the robotic device (e.g., 1 m in one implementation). Center axis of the transmitter field of view vertical angular dimension may be depressed with respect to the surface 280 level by an angle 282. Depressing the transmitter field of view center axis may enable control of the dead dimension 284 zone (that also may be referred to as the blanking distance). Dimension 284 may be configured based on one or more parameters of a task being executed (e.g., robot speed of movement, object size, and/or other parameters). In some implementations, the dimension 284 may be dynamically adjusted based on the current speed of the robot (e.g., increased with the increase in the speed). By way of an illustration, when the robotic device 250 is configured to move at a speed of 1 m/s, the dimension 284 may be selected from the range between 0.2 m and 5 m, preferably 2 m in one implementation. The angle 282 may be configured and/or selected from the range between 10° and 80°, in some implementations.

Dimension of the projected pattern (e.g., dimension 286) may be configured based on height of the projector component (dimension 276), depression angle 282, and/or vertical angle of view (e.g., 218 in FIG. 2A). By way of an illustration, a projector disposed 1 m above the floor level (e.g., distance 276) may be configured to project a pattern of 2 m in length (e.g., the dimension 286). In some implementations, the dimension 286 may correspond to dimension 338, 334 in FIG. 3B. In one or more implementations, dimension of the projected pattern (e.g., pattern 300 in FIG. 3A) may be configured in accordance with dimensions of a robotic device. Dimension of the projected pattern (e.g., pattern 300 in FIG. 3A) may be configured to compensate for perspective distortion in accordance with a counter-distortion process. As farther extents of the projected pattern (e.g., location 288 in FIG. 2B) correspond to longer travel distance from the projector component 252 and the camera component 254 as compared to closer extents of the pattern (e.g., location 287), lateral dimension (e.g., 336) of the reflected pattern may increase (scale up) relative the projected dimension (306) by a greater amount as compared to increase of the dimension 346 relative the dimension 316. Pattern 300 in FIG. 3A illustrates one example of the perspective distortion compensation wherein farther (from the transmitter) dimension 306 may be selected smaller compared to the dimension that is closer to the transmitter (310).

By way of an illustration, dimensions of the portion 332 may be selected approximately equal to dimensions of the robotic device (e.g., dimension 336 may equal about 1 m and dimension 334 may approximately equal 2 m for a robotic device of width 0.8 m and length of 1.6 m. It will be recognized by those skilled in the arts, that modifying projector height, depression angle, and/or angle of view may be used to adjust one or more dimensions of the projected pattern (e.g., dimensions 286 in FIG. 2B, 334, 336, 338 in FIG. 3B).

The projector component 252 may transmit a two dimensional pattern of light comprising a given pattern (e.g., grid, checkered board, and/or other patterns including such as described with respect to FIGS. 3A and 15A-15D). A variety of projector wavelength may be utilized e.g., corresponding to red (e.g., wavelength between 620 nm and 750 nm), green (e.g., wavelength between 495 nm and 570 nm) light, and/or other wavelength range.

The camera component 254 may be spaced from the projector component in vertical plane by distance 278. In some implementations, the distance 278 may be selected between 0.1× and 0.2× height of the robotic device (e.g., 0.5 m). The camera component may comprise an imaging sensor array comprising one or more of artificial retinal ganglion cells (RGCs), a charge coupled device (CCD), an active-pixel sensor (APS), and/or other sensors configured to detect light. The camera component 254 may produce a sequence of images for, inter alia, subsequent analysis. Individual images may comprise, e.g., a two-dimensional matrix of red/green/blue (RGB) pixel values refreshed at a suitable frame rate (e.g., selected between 10 frames per second (fps) and 100 frames per second. In some implementations the frame rate may be selected based on processing, memory, and/or energy resources available to the object detection sensor apparatus. Greater available energy and/or computational resources may afford use of greater frame rate. In one or more implementations, the frame rate may be selected based on operational speed of the robotic device and a target safety margin, e.g., minimal gap (in time and/or travelled distance) between successive frames. By way of an illustration, for a robot moving at a speed of 2 m/s frame rate of 10 fps may cause a 0.1 s time gap. This may correspond to a 0.2 m 'blind spot' between frames in front of the robot.

In some implementations of HSV and/or RGB images, image color (chromaticity channels channels) and illumination (luminance channel) information of the reflected pattern may be used to detect objects. In one or more implementations of grayscale images the illumination/light intensity of the pattern being projected may be configured different than the pattern of the surface (e.g., the floor) the pattern is being projected upon.

In some implementations individual images may comprise a rectangular array of pixels with dimensions selected between 100 pixels and 10000 pixels (in a given dimension). Pixel array configuration may be attained using receiver resolution configuration methodology described with respect to FIGS. 4C-4E, below. It will be appreciated by those skilled in the arts that the above image parameters are merely exemplary, and many other image representations (e.g., bitmap, CMYK, HSV, HSL, grayscale, and/or other representations) and/or frame rates are equally useful with the present disclosure.

Components 252, 254 may be coupled to a processing component disposed in the device 250 (e.g., processing component 716 in FIG. 7) configured to operate, e.g., object detection process. During configuration of the sensor apparatus, the object detection process may be initialized (e.g., calibrated) in absence of objects other than the floor in the sensing field of view. As illustrated in FIG. 2B, the projector may irradiate portion of the floor surface 280 in front of the apparatus 250 along the emitted rays. Floor reflections at locations denoted 287, 288 may propagate towards the robotic device along the returning rays. The reflected signal may be captured by the camera component 254 thereby producing received image of the reflected pattern. The processing component may be configured to analyze the received image in order to determine parameters of the reflected pattern.

In one or more implementations, the received image analysis may comprise one or more of contrast enhancement, background removal, edge detection, thresholding (e.g., removing elements which exceed a maximum threshold and/or fall below a minimum threshold), spatial (e.g., pixel block) averaging, temporal averaging (e.g., multiple images) and/or other operations. By way of an illustration, the received image may be compared to the projected pattern using e.g. correlation-based analysis for the pixels where a pattern is expected (if the pattern does not cover the whole image); in such cases, a high correlation would indicate a match. In other cases, a pattern comparison may be performed for the whole image and/or a portion of the image using, e.g., a sliding window mask of the image/pattern.

In some implementations, the projected pattern may be characterized by a non-uniform structure of the projected pattern (e.g., the pattern 300 comprising the center portion 302 and the perimeter portion 304 or other portions (also referred to as subsets or sub-patterns). In one such case, the received pattern may be analyzed in order to determine individual subset(s) of the pattern; thereby identifying the location of one or more subsets in the image. The location of the subset may be used to determine the distance of the robot and the object (in front of the robot) as described in FIGS. 10 and 11.

In some implementations, a subset of the pattern may be configured to include a given color (or combination of color patterns); in such cases, the color filtering of the image and/or thresholding of the filtered image may be used to localize a sub-pattern. In some implementations, thresholding operation may comprise a comparison of image elements (individual pixels and/or block of pixels) to one or more reference values (thresholds). Based on the comparison, values of the image elements may be assigned a given value (e.g., a given constant (e.g., 0), or a value based on one or more of the image elements (e.g., maximum element value, mean value, minimum value, and/or value obtained using other statistical operation on the elements being. By way of an illustration, the thresholding operation may be used to assign pixel values below a given threshold to a minimum (e.g., zero), assign pixel values above a given threshold to a maximum (e.g., 255); convert grayscale images into a multitoned (e.g., black and white, 4-tone and/or other number of intensity bins). In some implementations, portions of the image may be evaluated and assigned a probability associated with an object being present in a given image portion (e.g., using color saliency methodology described in U.S. Provisional Patent Application Ser. No. 62/053,004 entitled "SYSTEMS AND METHODS FOR TRACKING OBJECTS USING SALIENCY", filed Sep. 19, 2014, and/or U.S. patent application Ser. No. 14/637,164 entitled "APPARATUS AND METHODS FOR TRACKING SALIENT FEATURES", and Ser. No. 14/637,191 entitled "APPARATUS AND METHODS FOR SALIENCY DETECTION BASED ON COLOR OCCURRENCE ANALYSIS", each of the foregoing being incorporated herein by reference in its entirety. Object presence probability may be utilized in a thresholding operation (e.g., via a comparison to a minimum probability level) in order to identify one or more areas wherein an object may be present. It will be recognized by those skilled in the arts that various other implementations of thresholding operation may be utilized for analyzing images and/or object detection methodology of the disclosure.

In one or more implementations, the sub-pattern may comprise a bar-code and/or QR-code; in such cases, existing algorithms may be used for pattern localization (e.g. such as described in "QR Code Recognition Based on Image Processing" to Gu, et al. as presented Mar. 26, 2011, incorporated by reference herein in its entirety).

FIGS. 3A-3B illustrate exemplary projected and received patterns useful for determining presence of objects during navigation of a robotic device in accordance with one or more implementations.

The projected pattern 300 shown in FIG. 3A may comprise a polygon of lateral dimensions 316, 306 and a transverse dimension 308. The lateral dimensions 306, 316 may comprise horizontal dimensions. The dimension 306 may be configured different (e.g., smaller) than the dimension 316 as shown in FIG. 3A. The ratio of the dimension 306 and the dimension 316 of the projected pattern 300 may be selected such as to produce a reflected pattern of rectangular shape when the reflections are caused by a flat horizontal surface (e.g., the surface 280 of FIG. 2B) in absence of obstacles.

The lateral dimensions 306, 316 of the pattern 300 may be configured based on one or more of dimensions, turn footprint of the robotic device, and/or aisle dimensions (e.g., between 0.5 m and 4 m in some implementations). The transverse dimension 308 may be configured based on expected travel speed of the robot (e.g., between 0.5 m/s to 2 m/s in some implementations).

In some implementations, e.g., such as shown and described with respect to FIGS. 10A-11, projected pattern may be produced using a single projection element (e.g., pixel, LED). The smallest physical representation of the projected pattern element may be configured in accordance with, e.g., smallest target that is to be detected. By way of an illustration, a projected pattern element of 5 mm in size may enable detection of a target with dimension of 10 mm in accordance with the commonly accepted Nyquist sampling criterion. It will be understood by those skilled in the arts that the above description merely serves to illustrate principles of the present disclosure and actual pattern parameters may be adjusted in accordance with a given application. In some exemplary implementations, the size of the projected pattern (e.g., 330) may be configured based on dimensions of a robot, e.g., between 0.1× and 2× the lateral dimension (e.g., 435 in FIG. 4A) of the robot. Those of ordinary skill in the related arts will readily appreciate that patterns that are larger than 2× of the robot size pattern are also feasible.

The reflected pattern 330 of FIG. 3B may be characterized by the lateral dimension 336 that is configured approximately (e.g., within +/−10%) equal to the dimension 346. In some implementations, the transverse (e.g., vertical) dimension 338 may be configured approximately (e.g., within +/−10%) equal to the dimensions 336, 346. In one or more implementations, the dimensions of the projected pattern (330 in FIG. 3A) may be selected such that dimension 336 may be approximately (e.g., within +/−10%) equal to the dimension 346 of the received pattern; and the dimension 334 may be approximately (e.g., within +/−10%) equal to the dimension 338; and where the ratio of dimension 336 to dimension 338 may be configured to be approximately equal to the ratio of width to length of the robotic apparatus (e.g., 102 in FIG. 1A). In some implementations, the dimension 336 may be selected to be approximately (e.g., within +/−10%) equal to the width of the robot; and the dimension 338 may be selected to be approximately (e.g., within +/−10%) equal to the length of the robot.

Values and/or ratios between one or both of the lateral dimensions 336, 346 and/or the transverse dimension 338 may be analyzed in order to determine a presence of an object (e.g., a wall 210 in FIG. 2A) in front of the sensor. By way of an illustration, during setup and/or calibration of a robotic device 200 and/or 250, a reflected pattern 330 may be obtained when the robot is placed on a flat horizontal surface free from obstructions. Parameters of the reflected pattern (e.g., a ratio of dimension 336 to the dimension 346, a ratio of dimension 336 and/or 346 to the dimension 338, absolute values of the dimensions 336, 338, 346, values and/or ratios of diagonal dimensions of the shape of the reflected pattern 330, an area of the reflected pattern, and/or other parameters may be determined and stored in non-volatile medium (e.g., memory 714 in FIG. 7). Object detection process operable by the robotic device may utilize these parameters during navigation in order to detect objects. The perimeter portion 334 may comprise a plurality of elements 340 that may correspond to the elements 310 described with respect to FIG. 3A. Dimensions of individual elements within the portion 334 may be approximately equal (e.g. within 10%) to one another.

In some implementations, whole received images may be analyzed. In one or more implementations, portions of the received image or sub-images may be analyzed using e.g., a sliding window. For a given image (or sub-image) being analyzed, a determination may be made as to whether an expected pattern may be present within the image/sub-image. An absence of the expected pattern may indicate a presence of an object within the sampling area.

Various methodologies may be used in order to determine the presence of the expected pattern. For example, an image comparison method may be used for pixels where a pattern is expected. In one such case, correlation-based analysis can be used to determine the presence of an expected pattern; for instance, a high correlation (e.g., exceeding a given threshold) may indicate a match.

In one or more implementations, training-based classification methods may be employed in order to determine the presence or absence of the expected pattern in the image. Such methods may include a hierarchical neural network trained to classify the pattern. One such training algorithm is described in "ImageNet Classification with Deep Convolutional Neural Networks" to Krizhevsky et al., incorporated by reference herein in its entirety.

The projected pattern may comprise a spatial structure. In some implementations, e.g., such as illustrated in FIG. 3A, the pattern may comprise an information advertising portion depicted by open polygon 302 and object detection portion 304. The object detection portion may comprise a grid like pattern disposes along perimeter of the pattern 300. The grid-like pattern may comprise one or more of columns of grid elements (e.g., the element 310 characterized by dimensions 314, 312). Dimensions (e.g., 312, 314) of individual elements (e.g., 310) within the pattern portion 304 may be configured to vary along e.g. dimension 308 in order to produce reflected elements of approximately the same dimensions (e.g., dimensions of the element 340 being approximately (e.g., within 10%) equal dimensions of the element 342 in FIG. 3B). The grid element dimensions 312, 314 may comprise a fraction of the respective pattern dimensions 308, 316, e.g., between 0.1% and 5% in some implementations. Various structures of the pattern portion 304 may be utilized, e.g., such as illustrated in FIGS. 15A-15D.

Figure 16:
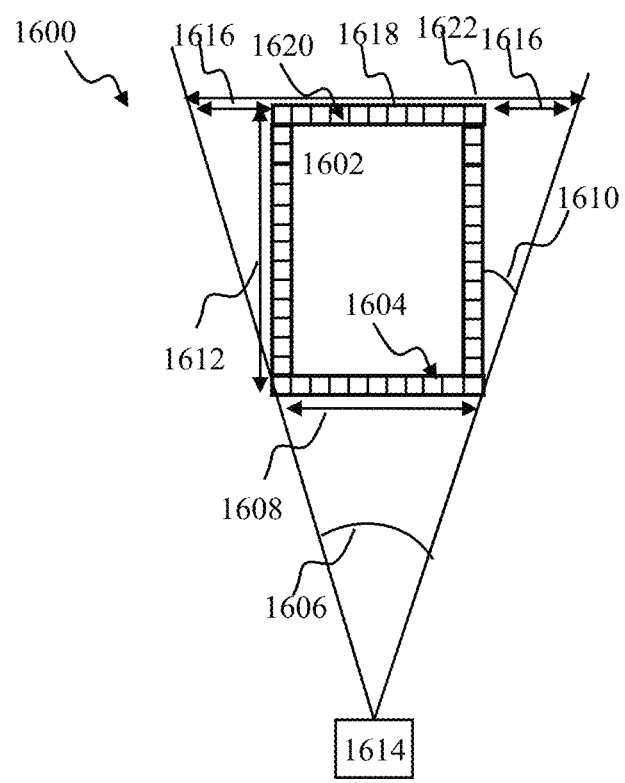
FIG. 16 is a graphical illustration depicting a pattern projected onto a flat surface by the sensor apparatus of the disclosure, in accordance with one implementation.

In some implementations, grid element dimensions may be configured in accordance with methodology described below with respect to FIG. 16. FIG. 16 depicts a pattern 1600 projected onto a flat surface by the sensor apparatus 1614 of the disclosure. A transmitter of the sensor apparatus 1614 may be characterized by field of view angle 1606 of 20° in some implementations. The projected pattern 1600 as it appears on the flat surface to an observer may be characterized by transverse dimension 1608 (width) and longitudinal dimension 1612 (length). The dimensions 1608, 1612 may be configured to be substantially equal to 0.83 m, and 1.59 m in one implementation. The pattern 1600 may comprise a center portion 1602 and a perimeter portion 1604. The perimeter portion 1604 may comprise a pattern of elements 1620. In one such case, the minimum dimensions of the pattern elements 1630 may be configured to comprise 5×5 pixels.

In some implementations, a transverse resolution of the receiver component of the sensor 1614 (e.g., a camera) may comprise 1920 pixels along dimension 1608. Due to perspective distortion, the dimension 1622 (corresponding to horizontal extent coverable by the camera component with 20° field of view) may correspond to 1920 pixels. Dimension 1622 may be configured as a sum of twice the length of dimension 1616 and the length of dimension 1618. In one such exemplary embodiment, the dimension 1622 may comprise 1.39 m. Accordingly, dimension 1618 (equal to 0.83 m) may proportionally correspond to 1146 pixels in the acquired image. The minimum dimensions of the element 1620 (corresponding to 5 pixels) may be selected at about 3.6 mm, whereas the maximum size of the element 1620 may correspond to the whole width of the pattern 1600. Accordingly, dimensions of the element 1620 may be selected from the range between 3.6 mm and 830 mm. In one such embodiment, the dimensions of the element 1620 are preferably 10 mm in one or more implementations.

In some implementations of robot navigation, the projected pattern may be regarded as being projected onto a flat floor. Those of ordinary skill in the related arts will readily appreciate that the methodology of the disclosure may be used to determine deviations from a flat floor.

In some implementations, the projected pattern may comprise a fully illuminated polygon (e.g., a solid fill trapezoid without the pattern). In such cases, the reflected pattern (e.g., 330 in FIG. 3B) may be thresholded (e.g., at 80% brightness). A best fit bounding box analysis may be applied to the thresholded image in order to determine as to whether the reflected pattern may correspond to the projected trapezoid. If one or more "holes" are detected within the trapezoid in the reflected pattern, such holes may be regarded as obstacles within the path of the robot or even an actual hole in the floor (which for the purposes of many tasks, is an obstacle).

In one or more implementations, wherein the projected pattern may comprise a pattern (e.g., projected trapezoid and a pattern along its edge as illustrated in FIG. 3A) a block matching algorithm may be used to analyze the reflected pattern. Specifically, given a small patch of the projected pattern (e.g., selected from any subset of the pixels up to the full resolution of the projected pattern), the block matching algorithm may find the best match in the recorded image. The horizontal displacement (or vertical displacement depending on physical placement of projector and camera) of the patch from where it originated in the pattern to where it was found in the recorded image is then measured; in some cases, if no match is found then an appropriate "failure to match" is also recorded. The process may be applied to a plurality of individual patches within the image. These individual patches or "displacement images" may be used to detect objects and their relative distance to the robotic device; larger displacements correspond to closer objects. Regions with patches not found in the recorded image may correspond to obstacles.

As shown in FIG. 15A, the pattern 1500 may comprise two (or more) columns of rectangular elements 1502, and/or squares (e.g., pattern 1510). In some implementations, e.g., such as shown in FIG. 15B, the pattern 304 may comprise a plurality of elements of varying widths and/or height as illustrated by patterns 1530, 1540 of FIG. 15B. Height of elements 1534, 1536, 1538 may be encoded using any applicable methodology such as, e.g., exponential, logarithmic, and/or other. Width and/or height of elements 1542, 1544, 1546, 1550 may be encoded using any applicable methodology such as, e.g., exponential, logarithmic, and/or other encoding method.

In some implementations, one or more elements may be encoded using color, brightness, reflectivity, polarization, and/or other parameter of the carrier signal. By way of an illustration, the pattern may comprise checkerboard-like patterns shown in FIGS. 15C-15D. The pattern 1520 of FIG. 15C may comprise a plurality of rectangular elements encoded using brightness (e.g., grayscale) comprising white elements 1522 and black elements 1524. Patterns shown in FIG. 15D may comprise one or more column of black and white triangular elements (e.g., 1560, 1564, 1566), rectangular elements (e.g., 1568, 1570, 1572), a combination thereof and/or other element shape and/or encoding method. Dimensions of individual elements (e.g., 1502, 1512, 1534, 1536, etc.) within the pattern may be configured to vary in order to produce reflected elements of approximately (e.g., within 10%) equal dimensions.

Figure 12:
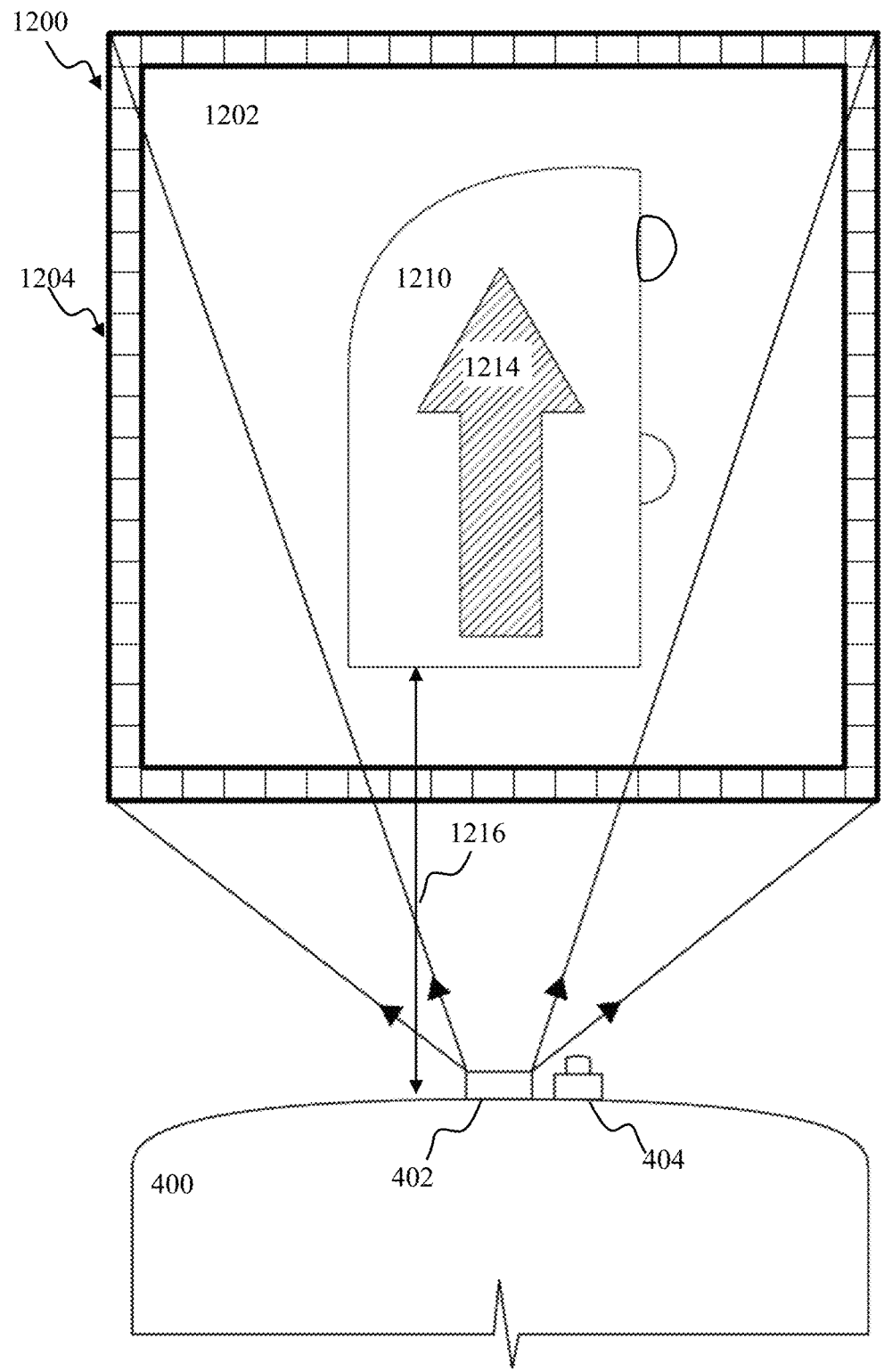
FIG. 12 is a graphical illustration depicting advertising into the environment information related to trajectory of a robot via a projected image, in accordance with one or more implementations.

Returning now to FIG. 3A, the pattern portion 302 may utilized for communication information (e.g., related to robot movements during trajectory navigation) into the environment, e.g., as shown in described below with respect to FIG. 12.

In some implementations, the pattern 300 may be projected using a light source (e.g., LED, light bulb, laser, and/or other source) and a light shaping mask. The light shaping mask may comprise an array comprising a plurality of elements. Individual elements within the array may be configured to, e.g., effectuate light intensity (brightness) modulation within the projected pattern. A portion of the elements within the array (e.g., corresponding to edges of the pattern 304 in FIG. 3A and/or elements 1524 in FIG. 15C and/or 1532, 1554 in FIG. 15B, may be characterized by reduced transmittance (e.g., increased opaqueness). A portion of the elements within the array (e.g., corresponding to central area 302 of the pattern 300 in FIG. 3A and/or elements 1502, 1512, 1522 of FIGS. 15A, 15C may be characterized by an increased transmittance (e.g., reduced opaqueness).

In one or more implementations, the pattern 300 may be projected using a digital light projection (DLP) MEMS technology, e.g., such as digital micromirror device (DMD) array produced by Texas Instruments, e.g., device dlp3000 (described in datasheet http://www.ti.com/lit/ds/symlink/dlp3000.pdf, the foregoing being incorporated herein by reference in its entirety. DMD arrays may enable dynamic configuration and/or control of projected patterns and may allow a given projection component (e.g., 202 in FIG. 2A) to produce a plurality of patterns with parameters (e.g., size, encoding configuration, pattern shape, and/or other parameters) of an individual pattern tailored for a given task. By way of an illustration of a cleaning operation, dimensions of the pattern 300 may be dynamically adjusted based on one or more of aisle width and/or speed of the cleaning robot. Content of the center area 302 in FIG. 3A may be adjusted based on movement parameter (e.g., direction of motion) of the robot. Pattern encoding (e.g., patterns described with respect to FIGS. 15A-15D) may be selected based on ambient light conditions in order to obtain greater contrast. It will be recognized by those skilled in the arts that various other pattern projection and/or pattern selection implementations may be employed with the methodology of the disclosure.

In one or more implementations, wherein the projected pattern may not be used for information communication, the pattern portion 302 of FIG. 3A may comprise the grid pattern (e.g., pattern 304 extended to envelop the area 302).

Figure 4A:
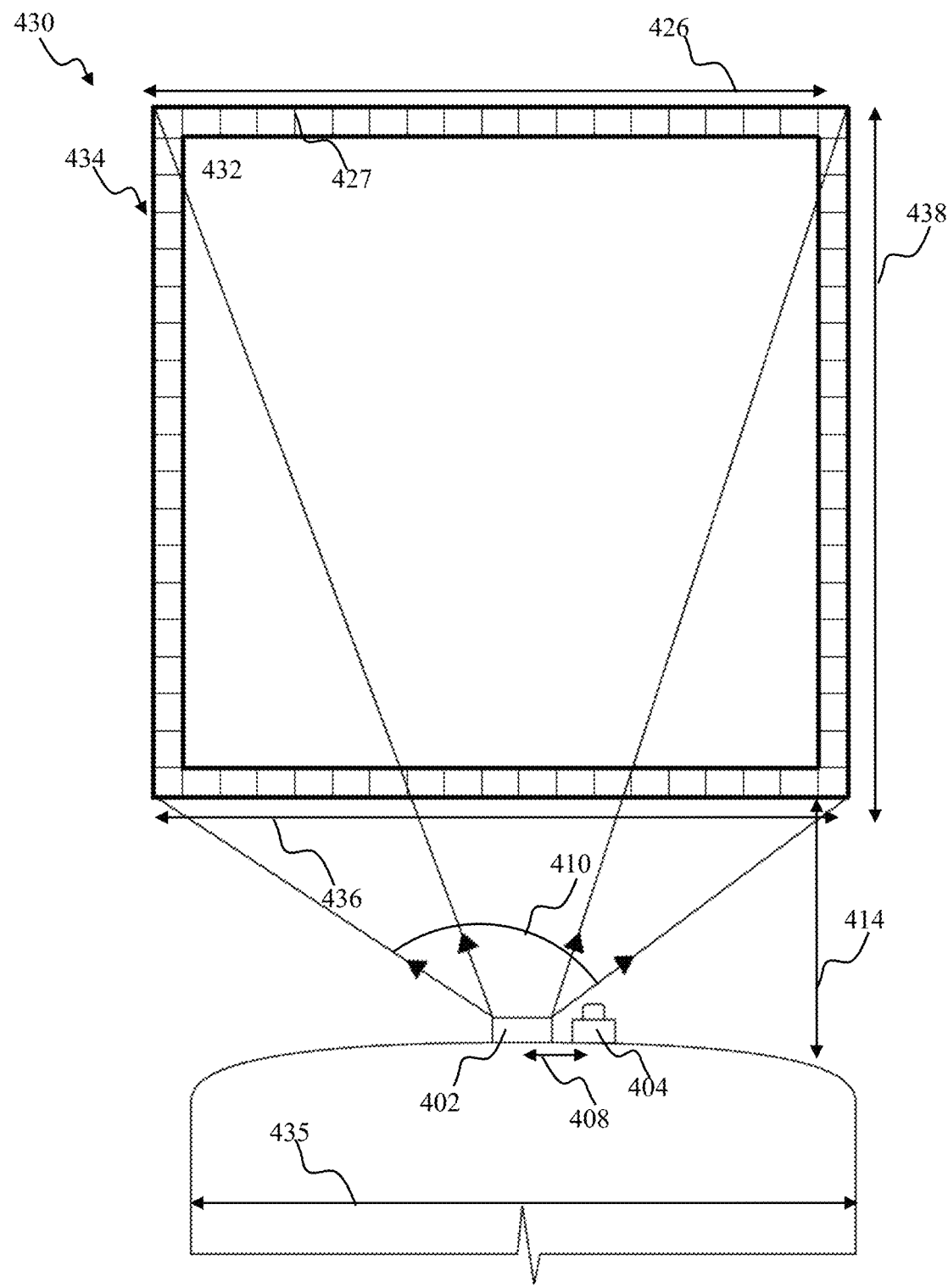
FIG. 4A presents top view of a pattern projected by the bistatic sensor apparatus of the present disclosure disposed on a robotic device in accordance with one implementation.

FIG. 4A illustrates a top view of a pattern projected by the bistatic sensor apparatus of the disclosure disposed on a robotic device in accordance with one implementation.

The pattern 430 may represent a footprint of a pattern (e.g., 300) projected by the projector component 402 disposed on the robotic device 400. The pattern 430 may be also referred to as the reflected pattern, e.g., such as the pattern 330 described above with respect to FIG. 3B. The pattern 430 may comprise a perimeter portion 434 and a center portion 432. In some implementations, the perimeter portion 434 may comprise a pattern encoded using brightness, color, and/or other property, e.g., as described above with respect to FIGS. 3A-3B. The portion 432 may be used to project information related to task being executed by the robot 400.

The pattern 430 may be characterized by the lateral dimension 426 that is configured approximately (e.g., within +/−10%) equal to the lateral dimension 436. In some implementations, the transverse (e.g., vertical) dimension 438 may be configured approximately (e.g., within +/−10%) equal to the dimensions 436, 426. Values and/or ratios between one or both of the lateral dimensions 436, 426 and/or the transverse dimension 438 may be analyzed in order to determine a presence of an object (e.g., a wall 210 in FIG. 2A) in front of the sensor. The pattern 430 shown in FIG. 4A, may correspond to a pattern obtained in absence of objects and/or obstructions in the field of view of the projector 402. The pattern 430 may be sensed by the camera 404 disposed on the robotic device. The camera component 404 may be spaced from the projector component by a distance 408. In some implementations, the distance 408 may be selected between 0 and 1× width of the robotic device e.g., 0.83 m). Dimension 438 in FIG. 4A and/or 338 in FIG. 3B may be configured based on one or more parameters of a task being executed (e.g., robot speed of movement, object size, and/or other parameters). In some implementations, dimension 438/338 may be dynamically adjusted based on the current speed of the robot (e.g., increased with the increase in the speed). Curve 410 denotes angle of view of the transmitter component. In some implementations, an overlapping sensor placement (co-located transmitter/receiver) may be employed.

Figure 7:
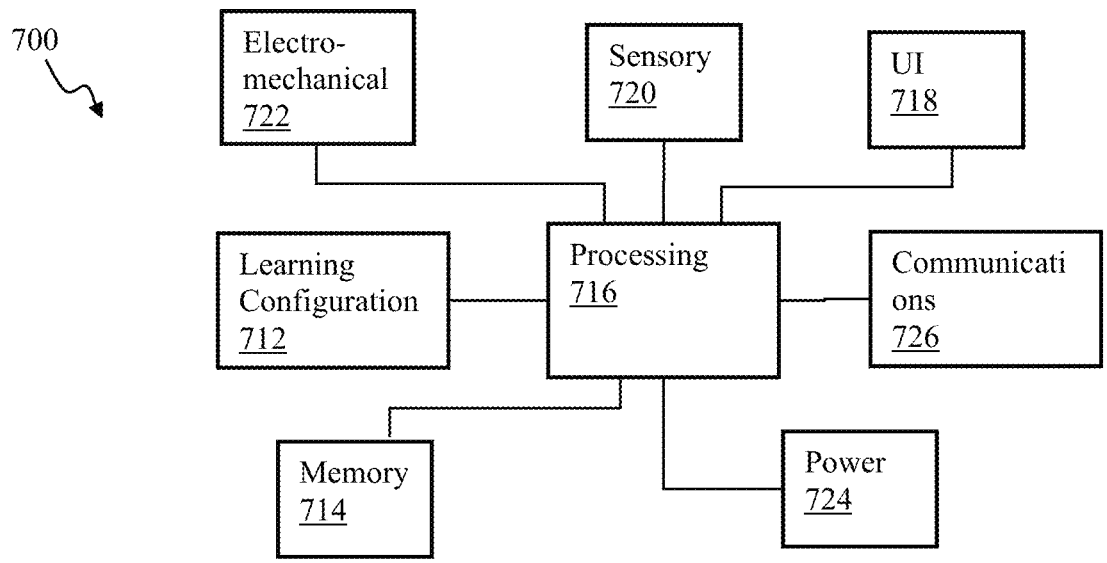
FIG. 7 is a functional block diagram illustrating a computerized system configured to implement the bistatic sensing methodology of the present disclosure, an adaptive predictor and/or a combiner components configured for operating, e.g., the robotic apparatus of FIG. 2A, according to one or more implementations.

Parameters of the reflected pattern (e.g., a ratio of dimension 436 to the dimension 426, a ratio of dimension 436 and/or 426 to the dimension 438, absolute values of the dimensions 436, 438, 426, values and/or ratios of diagonal dimensions of the shape of the reflected pattern 430, an area of the reflected pattern, and/or other parameters may be determined and stored in non-volatile medium (e.g., memory 714 in FIG. 7). Object detection process operable by the robotic device may utilize these parameters during navigation in order to detect objects.

Figure 4B:
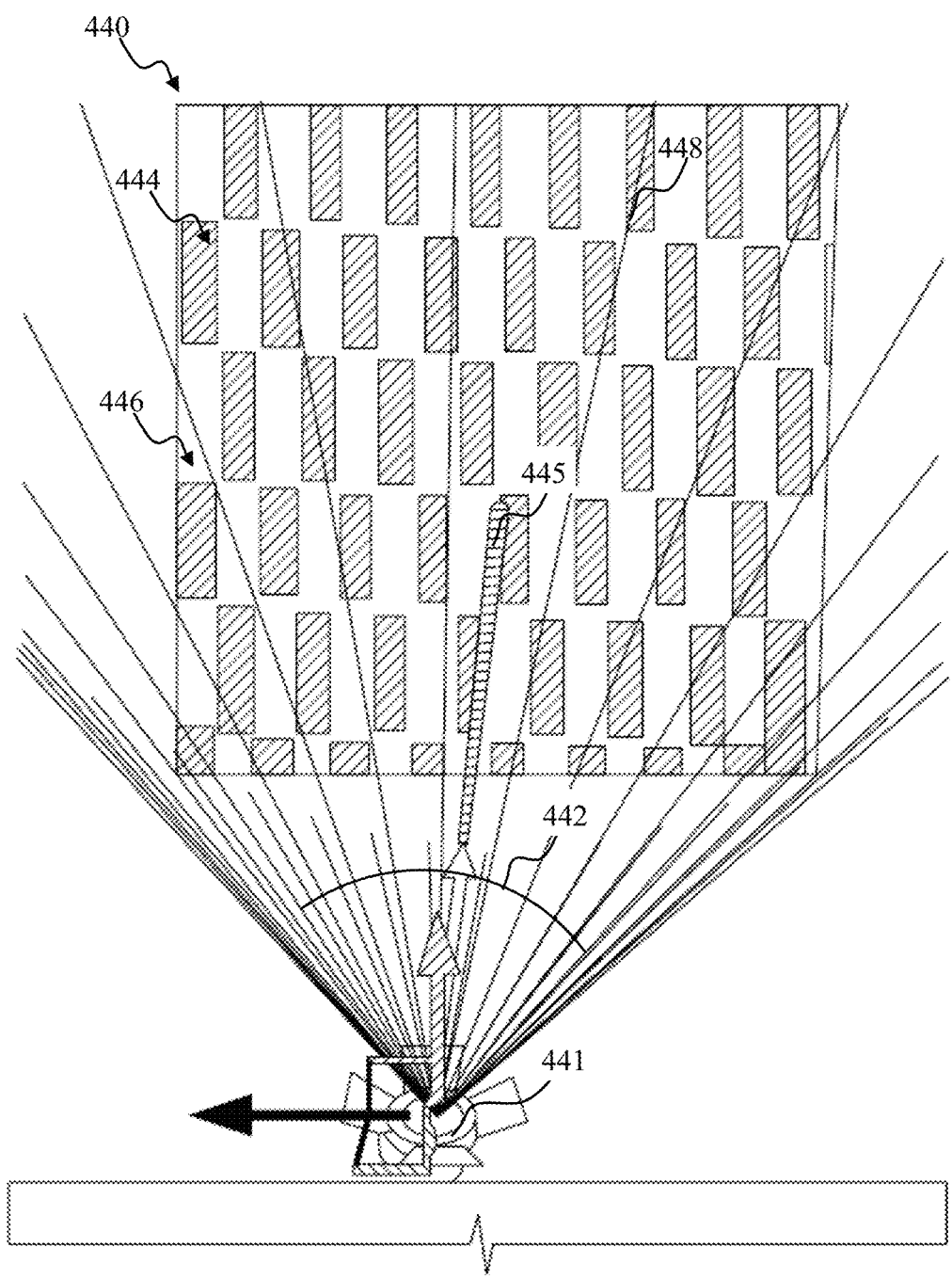
FIG. 4B is virtual world computer simulation illustrating a pattern projected by the bistatic sensor apparatus of the present disclosure in accordance with one implementation.

FIG. 4B is virtual world computer simulation illustrating a pattern projected by the bistatic sensor apparatus of the disclosure in accordance with one implementation. The arrow 445 denotes center axis of the field of view of the camera component (e.g., 404 in FIG. 4A). Lines denoted 448 illustrate projected rays. Curve 442 denotes angle of view of the camera component. In some implementations, the view angle (field of view) of the projector and/or camera may be adapted in accordance with a given task using, e.g., a lens assembly and/or other method.

The pattern shown in FIG. 4B may comprise a checkered pattern comprised of brighter (e.g., 444) and darker (e.g., 446) elements. Dimensions of the elements 444, 446 may be selected from the range between 1% and 50% of the overall dimensions of the pattern.

In some implementations, the pixel resolution of the camera used to capture (and then process) the image 330 may comprise 1920 pixels in the horizontal dimension (e.g., 336 in FIG. 3B), dimensions of the sub-pattern (e.g, 314, 312) may be selected to cover at least 5 pixel width (the more the easier) in the captured image.

It is noteworthy that in order to obtain an approximately uniform grid structure visible on a flat surface (such as shown by the perimeter portion 334 in FIG. 3B), the dimensions of the projected grid (312, 314 in FIG. 3A) may be configured to changing (e.g., decrease) along the length dimension (308) of the projected pattern 300. In other words, the dimensions of the grid projected closer to the robot (316) may be configured greater than the dimensions of the pattern projected further away from the robot (306). The above references minimum grid pattern dimensions (e.g., 5 pixels) may be satisfied at farther extend of the projected pattern (e.g., towards the edge 306).

Figure 4C:
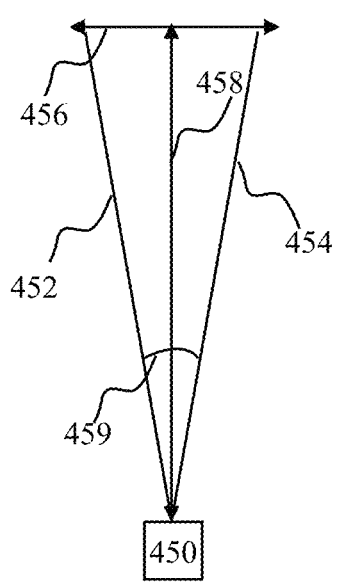
FIG. 4C is a graphical illustration depicting configuration of the field of view of bistatic sensor apparatus of the present disclosure, in accordance with one or more implementations.

FIG. 4C illustrates one configuration of the field of view of bistatic sensor apparatus of the present disclosure, in accordance with one or more implementations. The bistatic sensor may comprise a projection component 450 of the bistatic sensor apparatus that may be mounted to a robotic device (e.g., such as described above with respect to FIGS. 2A-2B and/or 4A. In some implementations of premises cleaning, the robotic device may be configured to detect objects that may be present in its path. The bistatic sensor may be configured to illuminate an area in front of the robotic device characterized by a width dimension 456 (426, 436 in FIG. 4A).

The projector component 450 may be configured to project the pattern at a distance 458 (414 in FIG. 4A) in front of the robotic device. In some implementations, wherein the robotic device may move at a speed of 1 m/s the distance 458 may be selected between 0.2 m and 5 m, e.g., 2 m in the implementation illustrated in FIG. 4C. It will be recognized by those skilled in the arts that the above speed and/or distance values are exemplary and serve to illustrate principles of the present disclosure.

In some implementations the dimension 456 may be configured equal to the width of the robotic device (e.g., dimension 435 of the device 400 in FIG. 4A). The projector component 450 may be characterized by a horizontal field of view (FOV) 459 (410 in FIG. 4A) comprising a portion of the area between rays 452, 454. The FOV 459 may be configured in accordance with a target value of the pattern width (e.g., the dimension 456). By way of an illustration, for a projector mounted at 1 m height above a surface on a robot with width of 0.8 m, a pattern width 456 may be equal to 0.8 m. In order to project the pattern with the dimension 456 equal to 0.8 m at a distance of 2 m away (e.g., the distance 458) the FOV of the component 450 may be selected equal approximately 20°.

Projected pattern may be characterized by pattern resolution. As used herein, the term resolution as applied to the pattern being projected may be used to describe a smallest feature in the pattern that may be resolved by a receiving component (e.g., the camera 404 in FIG. 4A). In some implementations wherein the projected pattern may comprise a rectangle with dimensions 0.8 m by 2 m (e.g., the pattern 430 in FIG. 4A) the pattern resolution may correspond to width of dark lines (e.g., 427 in FIG. 4A) that may be configured equal about 0.01 m. In some implementations, wherein the projected pattern may comprise a pattern of elements (pattern 440 comprised of elements 444, 446 in FIG. 4B) the pattern resolution may correspond to dimensions of the elements 444, 446. In some implementations, the dimensions of elements 444, 446 may be selected between 0.01 m and 0.1 m.

In some implementations wherein the projected pattern may comprise a sub-pattern (e.g., such as described with respect to FIGS. 10A-11) pattern resolution may correspond to dimensions of the sub pattern (e.g., 1012, 1022 in FIGS. 10B-11) that may be selected between 0.01 m and 0.1 m.

Receiving component of the bistatic sensor (e.g., the camera component 404 in FIG. 4A) may be characterized by receiving resolution. In some implementations, wherein the receiving component may comprise a camera (e.g., the camera component 404 in FIG. 4A) the receiving resolution may comprise camera resolution. Camera component may comprise a sensing element (e.g., CCD, APS, and/or other technology) characterized by sensor dimensions (e.g., 22.2× 14.8 mm, 23.5×15.6 mm, 36 mm×24 mm, and/or other dimension values). The camera sensor may comprise an array of pixels and be characterized by pixel resolution (e.g., 320 pixels by 640 pixels, 3000 pixels by 4000 pixels, and/or other arrays).

Figure 4D:
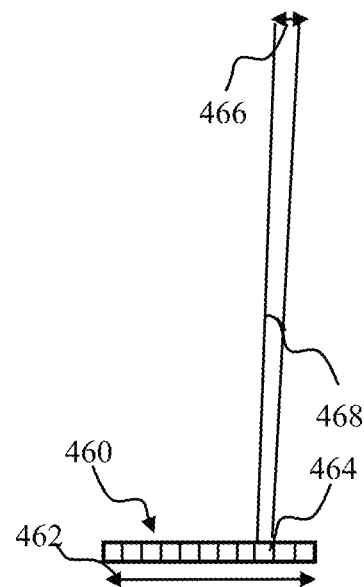
FIG. 4D is a graphical illustration depicting resolution of a receiving component of the bistatic sensor apparatus of the present disclosure, in accordance with one or more implementations.

FIG. 4D illustrates a methodology for selecting resolution of the receiving component of the bistatic sensor apparatus of the disclosure, in accordance with one or more implementations. The sensor 460 may comprise a plurality of pixels, e.g., 464. Size of individual pixel may be selected based on the pixel density (e.g., determined by dividing sensor linear dimension 462 by number of pixels in the array). In some implementations wherein the receiving component may comprise an off-the-shelf component and/or the sensor size may be fixed, effective pixel size may be selected by adjusting number of pixels in the image (e.g., image resolution). By way of an illustration, when sampling a pattern of width W (e.g., 456 in FIG. 4C) with a sensor of linear dimension L (e.g., dimension 460 in FIG. 4D) in order to resolve a feature of width w denoted by arrow 466 in FIG. 4D (e.g., line 427 in FIG. 4A) in the pattern, target minimum size of pixel (ps) 464 in FIG. 4D may be determined as $$ps = 0.5L\ w/W. \quad \text{(Eqn. 1)}$$

For a pattern width W of 0.8 m (i.e., 800 mm), feature width w of 10 mm, and sensor width L of 15 mm, a minimum pixel size may be selected at ps=0.09 mm. Methodology of Eqn. 1 may be utilized in order to determine lowest image resolution (in pixels) for detecting a given feature. For example, for a pattern width W=0.8 m, feature width w=10 mm and native camera sensor resolution of 3000 pixels×4000 pixels (width×height), minimum sampled image resolution better than 160 pixels in width.

Figure 4E:
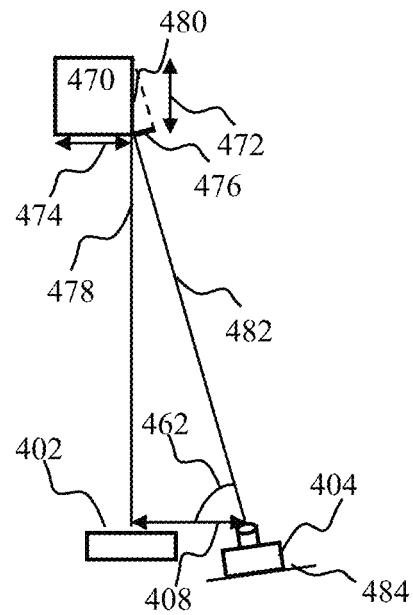
FIG. 4E is a graphical illustration depicting configuration of the transmitter and receiver components of the bistatic sensor apparatus of the present disclosure, in accordance with one or more implementations.

FIG. 4E illustration configuration of the transmitter and receiver components of the bistatic sensor apparatus of the present disclosure, in accordance with one or more implementations. Sensor configuration methodology shown and described with respect to FIG. 4D, may be applied to a variety of sensing technologies e.g., video camera, sound waves, radio waves, and/or other types of sensors. The bistatic sensor apparatus of FIG. 4D may comprise a projector component 402 and a receiver component 404, e.g., such as described above with respect to FIG. 4A. The sensor apparatus of FIG. 4D may be configured to detect an object 470. The object 470 may be characterized by a width dimension 474 and a depth dimension 472. For mutual orientation of the object 470 and the projector center axis 478 (e.g., the axis 458 of FIG. 4C and/or 445 of FIG. 4B) the surface of the object 470 that faces the projector component 402 may be illuminated by the projected pattern (e.g., 440 in FIG. 4B). One or more surfaces of the object 470 (e.g., the surface denoted 480) may not be illuminated by the projected pattern. If the receiving component 404 is displaced from the projection component 402 by distance 408, the bistatic sensor may be configured to detect an unilluminated portion (hole) within the received pattern (e.g., such as described with respect to FIGS. 8A-8B, below).

In some implementations, the sensor may be configured to detect features and/or objects with dimensions of 10 mm×10 mm. In order to detect such features, sensor component separation 408 and/or receiver resolution may be configured as follows. Dimension 476 of unilluminated portion of the object 470 may be expressed as follows:

$$d = l * \cos(\alpha)$$

where:
l denotes a linear dimension (e.g., 472) of the object unilluminated side 480;
d denotes a projection of the unilluminated side 480 of the object 470 on a direction parallel to the plane of the receiver array (e.g., denoted by line 484);
α denotes an angle between the receiver axis 482 and the unilluminated side 480 (e.g., angle 462 in FIG. 4E);
Given object distance D (478 in FIG. 4E) from the projector 402 and the receiver-projector separation 408, in order to detect feature of dimension w in a pattern of a dimension W, the receiver resolution may be determined as follows $$rs = W/[w \cos(a \tan(D/PR))] \quad \text{(Eqn. 2)}$$

where:
rs denotes receiver resolution (minimum number of pixels per linear dimension of the receiving sensor, e.g., 462 in FIG. 4D);
w denotes minimum detectable feature dimension (e.g., 476 in FIG. 4E);
D denotes distance from the projector to the feature/object;
PR distance between projector and receiver;
W is the dimension of the projected pattern (e.g., 456 in FIG. 4C).

As described above with respect to FIG. 4C, a pattern projected at a distance 2.24 m from the projector may comprise dimension 456 of 0.8 m. In order to detect an object comprising a cube of dimensions 10 mm disposed at 2.24 m from the projector and for a projector-receiver distance of 0.2 m, dimension 476 of the unilluminated side may be about 0.9 mm. In order to detect a feature of 0.9 mm in size, camera resolution of at least 934 pixels along dimension 484 (pixels per width of the receiver array) may be used.

In some implementations, wherein maximum camera and/or image resolution may be given (e.g., 3000 pixels per width), receiver-projector separation 408 may be determined using the formulation of Eqn. 2. By way of an illustration, a camera with resolution of 3000 pixels per width may be used to reduce the dimension 408 from 0.2 m to about 0.07 m thereby reducing dimensions of the bistatic sensor, e.g., such as illustrated in FIG. 4E.

Figure 5:
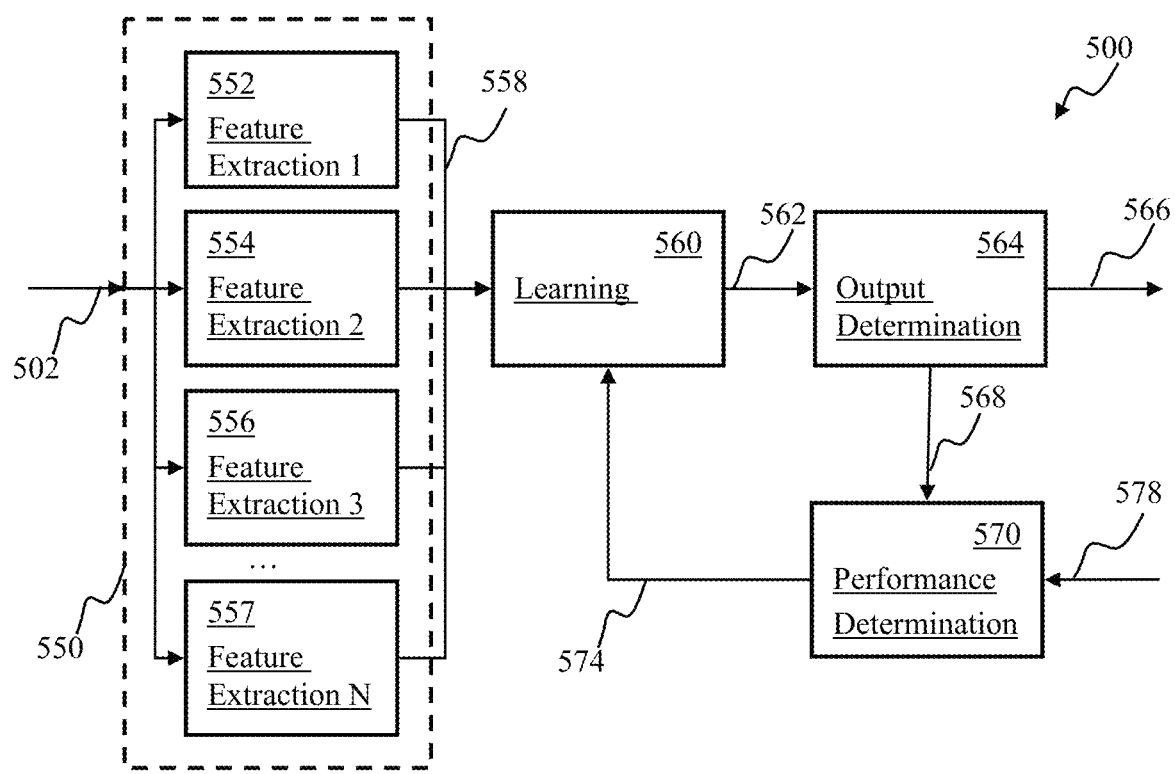
FIG. 5 is a block diagram illustrating an adaptive control system for operating, e.g., the robotic apparatus of FIG. 2A, according to one or more implementations.

FIG. 5 illustrates an adaptive control apparatus for operating, e.g., the robotic apparatus of FIG. 2A, according to one or more implementations. The apparatus 500 may be configured for operation with a robotic control system (e.g., the predictor component 640 described with respect to FIG. 6). The predictor apparatus 500 may comprise a feature detection (FD) component 500 comprised of one or more feature detectors. Individual feature detectors 557, 552, 554, 556 may be configured to process sensory input 502 in order to determine presence of one or more features in the input 502. In some implementations, the sensory input 502 may comprise data from one or more sensors (e.g., video, audio, IR, RF, ultrasonic, weather, and/or other sensors) characterizing environment of the robot, robotic platform feedback (e.g., motor torque, battery status, current draw, and/or other parameter). In one or more implementations of visual data processing, the features that may be detected in the sensory input may comprise representations of objects, corner, edges, patches of texture, color, brightness, and/or other patterns that may be present in visual input 502; audio patterns (e.g., speech elements), and/or other persistent signal patterns that may be relevant to a given task. It is noteworthy, that a given pattern and/or data item (e.g., representation of an orange fruit on a tree and/or time of day) may comprise a relevant feature for one task (e.g., harvesting of oranges) and may be ignored by other tasks (e.g., navigation around trees). The input 502 may comprise the input 602 described with respect to FIG. 6.

Two or more of individual feature detectors 557, 552, 554, 556 may be operable contemporaneous with one another to produce the feature output 558. In one or more implementations, e.g., such as described in co-owned and co-pending U.S. patent application Ser. No. 14/542,391 entitled "FEATURE DETECTION APPARATUS AND METHODS FOR TRAINING OF ROBOTIC NAVIGATION" filed Nov. 14, 2014, the output 558 may comprise 8 texture (based on e.g., Laws masks) features, 15 edge (based on e.g., Radon transforms) features, 15 edge/corner (based on e.g., Harris operators) features, and 10 motion features. In some implementations, the output 558 may comprise output of a given feature detector (e.g., one of FD 557, 552, 554, 556).

Various feature detection methodologies may be applied to processing of the input 502. In some implementations, the feature detectors 557, 552, 554, 556 may be configured to implement a filter operation (e.g., orange mask to detect orange objects); a Radon transform edge detection; corner detection (e.g., using Harris operator), texture detection (e.g., using Laws masks); patterns of motion (e.g., using optical flow); and/or other methodologies.

Output 558 of the feature detection component 550 may be provided to learning component 560. In some implementations of visual input processing the output of the feature detection process may comprise information related to one or more of edges being present in an image (e.g., orientation and/or location); structure of brightness on scales that are smaller than the image (e.g., texture determined based on brightness variability on scale between 1 and 10 pixels for an image comprised of 800×600 pixels). In some implementations, feature representation may comprise motion information associated with pixels in the image, patches of color, shape type (e.g., rectangle, triangle, car, human, and/or shapes of other objects), shape orientation, size, and/or other characteristics. In one or more implementation wherein the input 502 may comprise frames provided by two or more cameras (e.g., such as described in co-pending and co-owned U.S. patent application Ser. No. 14/326,374 entitled "APPARATUS AND METHODS FOR DISTANCE ESTIMATION USING STEREO IMAGERY", filed Jul. 8, 2014 and/or co-owned and co-pending Ser. No. 14/285,385 entitled "APPARATUS AND METHODS FOR REAL TIME ESTIMATION OF DIFFERENTIAL MOTION IN LIVE VIDEO", filed May 22, 2014, each of the foregoing being incorporated herein by reference in its entirety) the feature output 558 may comprise depth information (e.g., determined based on analysis of the binocular disparity) related to one or more objects that may be present in the visual scene.

In one or more implementations wherein the feature detection process (e.g., operable by the component 550) may comprise template matching, the output 558 may comprise information related to occurrence and/or characteristics of one or more patterns (e.g., landing pattern for an aircraft, parking stall marking for an autonomous vehicle, audio signature, and/or other patterns) being present in the input 502. In some implementations wherein the input 502 may comprise audio and/or other bands of mechanical waves of pressure and displacement, the output 558 may comprise one or more wave characteristic such as pitch, tone, amplitude, time envelope, duration, spectral energy distribution, spectral envelope, information about rate of change in the individual spectrum bands (e.g., cepstrum), pulse and/or tone code, speech pattern, and/or other characteristics.

In one or more implementations wherein the feature detection process may comprise processing of olfactory signals, the output 558 may comprise indication of presence of one or more smells, chemical compounds, and/or other olfactory indications.

Figure 6:
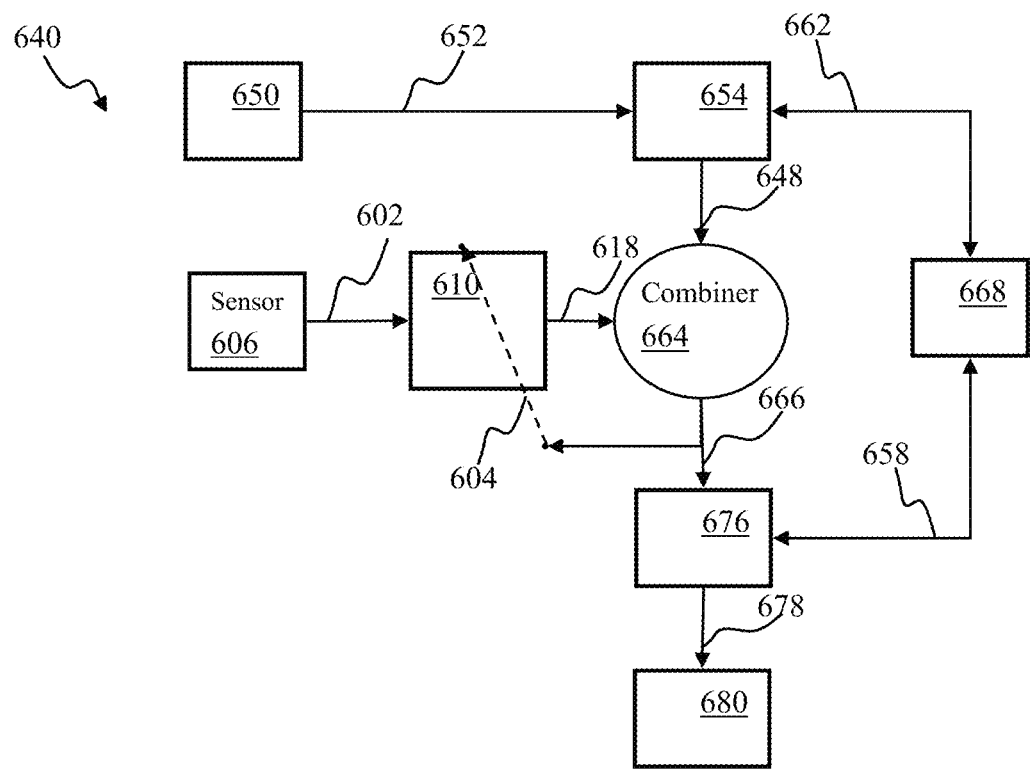
FIG. 6 is a block diagram illustrating an adaptive control system comprising a predictor and a combiner components configured for operating, e.g., the robotic apparatus of FIG. 2A, according to one or more implementations.

The learning component 560 may be configured to minimize a discrepancy between predicted output 564 and output 578 of the combiner (e.g., the output 666 of the combiner 664 in FIG. 6). In one or more implementations, the learning component may be configured to operate a supervised learning process comprising one or more of a neural network perceptron, support vector machine (SVM), a Gaussian process, a random forest, a k-nearest neighbor (kNN) mapper (e.g., a classifier/regression) process comprising, e.g., a look up table, and/or other approach. In one or more implementations of ANN predictor, the component 560 learning process may comprise a full connection matrix described in, e.g., co-owned and co-pending U.S. patent application Ser. No. 14/265,113 entitled "TRAINABLE CONVOLUTIONAL NETWORK APPARATUS AND METHODS FOR OPERATING A ROBOTIC VEHICLE", filed Apr. 29, 2014, incorporated herein by reference in its entirety. By way of an illustration of the learning component comprising an ANN, the full connection matrix may comprised a plurality of connections between the plurality of features in the input 558 and one or more neurons of the output determination component (the output layer) 564 described below.

In some implementations, a random KNN approach, e.g., such as described in co-owned and co-pending U.S. patent application Ser. No. 14/588,168 entitled "APPARATUS AND METHODS FOR TRAINING OF ROBOTS", filed Dec. 31, 2014, the foregoing being incorporated herein by reference in its entirety, may be used.

In one or more implementations of online KNN learning process, memory buffer size may be configured to store between 500 sample pairs (input/output) and 50000 sample pairs. In some implementations, the memory size may be configured based on a size (e.g. number of bytes) configured to store an input/output pair. By way of an illustration, input features comprising a larger pixel patches and/or patches with higher pixel count (e.g., 200×200) may require greater memory buffer size and/or cause fewer samples to be stored in a given buffer size compared to input features comprising smaller patches (e.g., 20×20 pixels).

In some implementations of online KNN, input storage policy may be configured as follows: given a new sample, if the buffer is not full (e.g., there may exist at least one available memory location) the sample may be stored in an available location; if the buffer is full, the sample may be stored at a random (occupied) memory location with a probability p determined as:

$$p\_insert = memory\_size/total\_number\_of\_samples\_processed; \quad (Eqn.\ 3)$$

Accordingly, the probability of the sample being discarded may be determined as $1-p\_insert$.

In one more implementations of online KNN, the storing policy may be configured based on the average distance between neighboring samples, i.e., average distance between any given sample in the input memory buffer and the plurality of N samples (N=5 in some implementations) with the smallest distance measure to it; given a new sample, N closest neighbor samples in the memory buffer may be determined; the new sample may be stored at a random buffer location with a probability p_insert that may be configured depending on the ratio of the distance of the sample to its nearest neighbors relative to the average distance between nearest neighbors in the memory buffer, e.g., as follows:

$$p\_insert = 1-[1-p\_uniform\_insert]^{(s1/s2)}, \quad (Eqn.\ 4)$$

where:
p_uniform_insert is the uniform policy described before;
s1 denotes average distance of new sample to neighbors; and
s2 denotes distance of all samples in buffer to their neighbors.

In some implementations, the policy configured in accordance with Eqn. 4 may be configured to reduce probability of storing samples that may be already well represented in the memory.

Output 562 of the learning component 560 may be provided to output determination component 564. In some implementations wherein the learning component may operate an ANN comprising a connectivity matrix, the output determination component may comprise one or more neurons configured to produce the output 566. By way of an illustration, the output component 564 may comprise neurons NR, NL operable to produce control output for right/left wheel of the robotic vehicle (e.g., 200 in FIG. 2A). In one or more implementations of KNN mapper, the output component may comprise a table relating occurrence of a given input feature to a respective output. The output 566 may comprise the output 648 described above with respect to FIG. 6. The predicted output 566 may be provided to a combiner component (e.g., 664 in FIG. 6).

The predictor apparatus 500 may comprise a performance determination component 570. The component 570 may be configured to determine performance of the predictor operation based on the predicted output of the component 564 provided via pathway 568 and input 578. The input 578 may comprise, e.g., the training signal 604 comprising the combiner output 664 described with respect to FIG. 6B. The component 570 may be configured to operate a performance determination process. In some implementations of continuous state space control wherein the output 566 may comprise a continuously valued parameter (e.g., velocity) the performance process may be configured based on a mean squared error determination operation. In some implementations of discrete state space control wherein the output 566 may comprise one or a plurality of discrete states, the performance process may comprise a cross entropy determination operation. Various other performance determination operations may be employed including, e.g., methodologies described in co-owned and co-pending U.S. patent application Ser. No. 13/487,499 entitled STOCHASTIC APPARATUS AND METHODS FOR IMPLEMENTING GENERALIZED LEARNING RULES", filed Jun. 4, 2012, the foregoing being incorporated herein by reference in its entirety.

Output 574 of the performance evaluation component 570 may be provided to the learning component 560. The output 574 may comprise a performance measure configured to be used to update the learning process of the component 560. In one or more implementations of ANN, the learning process adaptation may comprise modification of weights between units of the network. In some implementations of random forest classification, the learning process adaptation may comprise increment/decrement of entries associated with a given feature-output pair.

In some implementation, the feature detection component 550 may be configured to detect features based on a predetermined configuration (e.g., fixed state feature detection). In one or more implementations, the feature detection component 550 may be configured to operate a learning process, comprising e.g., an ANN. The learning FD may be operated to predict occurrence of one or more features in the input 502 based on occurrence of the respective features in one or more prior images. By way of an illustration of a robotic vehicle approaching a doorway along a straight trajectory, the learning FD may predicted occurrence of the doorway in a subsequent image based on detecting the doorway in one or more preceding images. The trained learning FD may be capable of approximating the features in a more computationally efficient manner (compared to programmed approach) by, e.g., taking advantage of the limited range of inputs the vehicle is going to find during operation.

In some existing approaches to offline learning, sensory input may be available for the duration of the training (training set). The availability of the whole set of sensor data may enable determination of one or more statistical parameters (e.g., mean brightness, variance, and/or other) that may be used for feature detection (e.g., input whitening, normalization, and/or other). Online learning methodologies described herein may access sensory data for present and/or prior trials but not for one or more subsequent trials.

Limited availability of sensor data may obfuscate actual statistics of the sensor input. Additional operations (e.g., input manipulations, feature detection adaptation) may be required to improve accuracy of feature detection when processing sensor data during online training.

In some implementations of input processing during online training, online estimates of the input statistics may be obtained using methodologies described herein. Input processing may comprise background removal, scaling to a given range, clipping to a given range, outlier removal, and/or other operations. By way of an illustration, pixels of an image may be normalized by removing mean value and dividing the result by a standard deviation. The mean value for a given image may be obtained using an online running mean operation wherein pixel values of a plurality of preceding images and of the given image may be accumulated. In some implementations, the mean may be obtained using an exponential mean, a box cart average, and/or other averaging operations. Online input adaptation may improve accuracy of the feature detection process particularly in varying environments (e.g., changes in brightness, and/or other parameters).

In some implementations, output of the feature detection process (e.g., output 558 of the component 550 in FIG. 5, comprising a plurality of features) may be normalized online (e.g., in upon availability of another version of features determined based on another version of the sensory input). In some implementations, input into the predictor may comprise features obtained using two or more FD (e.g., 552, 554, 556, 557 in FIG. 5). Values provided by individual FD process may be characterized by different range and/or mean values. In some implementations of a learning process configured based on a gradient approach, a zero mean unit variance input may provide more robust operation compared to inputs that have different mean and/or variance values. The feature normalization processing may comprise level adjustment (e.g., mean removal), range scaling (e.g., variance normalization), and/or other operations. The mean value for a given population of features may be obtained using an online running mean determination operation as follows. For a given feature of the plurality of features of the input 558 two accumulators may be provided. In some implementations, the accumulators may comprise memory locations configured to store a floating point value (e.g., 32 bit, 64 bit, and/or other bit length). One accumulator may be configured to accumulate a sum of values of the feature; another accumulator may be configured to accumulate square of the feature values. If a feature is updated (e.g., based on processing another input frame) the accumulator may be updated. A counter may be used to store information related to the number of accumulated feature values (frames). Running mean feature M value may be determined based on dividing contents of the value accumulator by the number of accumulated values; an estimate of the feature variance value may be determined based on dividing contents of the square value accumulator by the number of accumulated values and subtracting square of the running mean value M.

Online training methodology of the disclosure may enable adaptation of responses by a robotic device during training and/or operation. In some implementations, training and operation may occur contemporaneously with one another. During initial portion of learning, a trainer may provide training input more frequently to the learning process of the robotic device. Upon observing performance that may match target performance (e.g., lack of collisions with objects) the trainer may refrain from (and/or altogether cease) providing training input. Computations related to input processing and/or learning process adaptation may be performed by a computational apparatus disposed onboard of the robotic device. In some implementations, the computational apparatus may comprise a specialized computerized apparatus e.g., bStem™ integrated platform, described in, http://www.braincorporation.com/specs/ BStem_SpecSheet_Rev_Nov11_2013.pdf, the foregoing being incorporated herein by reference in its entirety, and/or the apparatus 700 shown and described with respect to FIG. 7 below) configured to operate a learning process. The bStem integrated platform may be characterized by energy efficiency that may be sufficiently high in order to enable autonomous operation of a robotic device using an onboard electrical power source. In some implementations, the energy efficiency may be characterized by power consumption between 1.5 W and 2.5 W while providing general purpose (e.g., central processing unit (CPU)) processing capacity equivalent to about $2.1 \times 10^8$ floating point operations per second (FLOPS) and contemporaneous parallelized (e.g., graphical processing unit (GPU)) processing capacity of equivalent to about $5 \times 10^{11}$ FLOPS to $6 \times 10^{11}$ FLOPS. In some implementations, a robotic device comprising sensor components and a processing component capable of performing input processing, learning process operation, communications and/or other operations configured to enable the robotic device to learn navigation tasks.

In one or more implementations, the learning process operation may be effectuated by a BrainOS™ software platform (developed by the Assignee hereof) that may include software configured to instantiate modules and/or robotic brain images, and containing learning algorithms not limited to artificial neural networks and other machine learning algorithms. The BrainOS software platform may provide functionality for a software module that may be typical of an operating system including but not limited to: saving, loading, executing, duplicating, restoring, reverting, check pointing, analyzing, debugging, and uploading/downloading operations to/from remote cloud storage. In some implementations, the BrainOS modules or robotic brain images may be used with the intent to control a robotic device and be broadly construed to include actuators and switches as may be present in a home automation system. Performing of input processing and/or adaptation operations onboard in real time may reduce delays that may be associated with transmission of data off the robotic device, improve learning performance and/or reduce training time.

FIG. 6 illustrates an adaptive control system 640 comprising a predictor and a combiner components configured for operating, e.g., the robotic apparatus of FIG. 2A, according to one or more implementations. The system 640 of FIG. 6 may be configured to operate a robotic platform 680 (e.g., the vehicle 200 of FIG. 2A) based on analysis of sensor information.

The system 640 may comprise an adaptive predictor 610 configured to produce predicted control output 618. The predictor 610 may be trained using a corrector component 650 using online training methodology described herein. The training may be performed by a trainer performing a target task (e.g., following a trajectory within the premises 100 of FIG. 1) by the robotic device 680. In some implementations, the corrector component 650 may comprise a computerized agent (e.g., comprising a trained adaptive controller) configured to operate the robotic device 680 in accordance with a target trajectory. In some implementations, the corrector component 650 may comprise a remote control handset comprising a wireless signal transmitter (e.g., IR, RF, light) such as, e.g., described in co-owned and co-pending U.S. patent application Ser. No. 14/244,892 entitled "SPOOFING REMOTE CONTROL APPARATUS AND METHODS", filed on Apr. 3, 2014, the foregoing being incorporated herein by reference in its entirety. The output 652 of the component 650 may comprise one or more instructions and/or signaling (corrector instructions and/or signals) configured to cause the robotic device 680 to perform an action (e.g., execute a turn).

The corrector 650 operation may be characterized by a control state space. In some implementations of analog state space control wherein the corrector output may comprise a target control parameter, the instructions 652 may comprise the target velocity V and/or the target steering angle ω, e.g., shown in Table 2. An "override" indication may be utilized in order to convey to the combiner 664 that the correction instructions 652 may take precedence (override) the prediction 618 in FIG. 6.

In some implementations of analog state space correction, wherein the corrector output may comprise a target correction (adjustment) to the current value of velocity V and/or current steering angle ω. If the corrector output comprises zero (null) signal, the robotic platform may continue its operation in accordance with the current velocity V and/or current steering angle ω.

In one or more implementations of discrete state space correction, actions of the robot may be encoded into a plurality of discrete states (e.g., 9 states as shown in Table 2, states, wherein 8 states may indicate 8 possible directions of motion shown in Table 2, one state for "stay-still" and one for "neutral", and/or other state representations). In some discrete state implementations, a default state value may be assigned to the neutral state so that if the corrector may output a neutral signal, the predictor may be able to control the robot directly.

In some implementations of a probabilistic state space control, actions of the robot may be represented by a 9-element vector indicating probabilities associated with a respective state. The combiner 664 may be configured to apply a multiplicative operation to the predicted output and the corrector output in order to determine a distribution associated with a target control state.

In some implementations the combiner component 664 of FIG. 6 may be configured to implement an override functionality wherein a non-zero corrector output 652 may be provided as the combiner output 666; the predicted component 618 may be ignored. In one or more implementation of override combiner for analog control (e.g., continuous state space), an override indication may be used to convey to the combiner that the correction component (e.g., 650 in FIG. 6) may override (take precedence) over the predicted component (e.g., 618 in FIG. 6).

In some implementations the combiner component 664 of FIG. 6 may be configured to implement an additive combiner process wherein the combiner output 666 of FIG. 6 may comprise a sum of the predictor output and the corrector output.

In some implementations the combiner component 664 of FIG. 6 may be configured to implement a probabilistic combiner process. The probabilistic combiner may be employed with the probabilistic control space. The probabilistic combiner process may be used to produce combined output 666 of FIG. 6 configured based on a multiplication operation of the predicted distributions and the corrector distribution to determine an output distribution over possible states.

The system 640 may further comprise a sensor component 606 configured to provide information related to task execution by the robotic device 680. In some implementations, such as navigation, classification, object recognition, and/or obstacle avoidance, the sensor 606 may comprise a receiver component (e.g., the camera 204 in FIG. 2A) configured to detect a pattern transmitted by a transmitter component (e.g., 202 in FIG. 2A). The information the information 602 provided by the camera component 606 may comprise one or more digital images (e.g., the image 330 in FIG. 3B).

The system 640 may comprise an interface component 654 (also referred to as an adapter) configured to detect instructions 652. In some implementations, the interface component 654 may provide one or more output channels 648 wherein individual output channels 648 may be configured to convey information associated with individual control actions, e.g., such as illustrated in Table 1, below:

TABLE 1

| Action | Channel 1 | Channel 2 | Channel 3 | Channel 4 |
|---|---|---|---|---|
| Forward | 1 | 0 | 0 | 0 |
| Backward | 0 | 1 | 0 | 0 |
| Left | 0 | 0 | 1 | 0 |
| Right | 0 | 0 | 0 | 1 |

The adapter component 654 may be configured to adapt the format of the instructions 652 to a specific format of the combiner 664 and/or the learning process of the predictor 610. By way of an illustration, the predictor 610 learning process may be configured to operate using three discrete states wherein a state value "1" may denote activation of a given signal (e.g., motor on); a state value of "0" may denote signal de-activation (e.g., motor off); and a high impedance value (e.g., "0.5") may be configured to leave the signal as is (i.e., in an active or inactive state).

In some implementations of binary control, the adapter component 654 may convert binary control 652 into the above discrete states, in some implementations. By way of an illustration, a "FORWARD" instruction may be expressed as {1, 0, 0, 0} while output 648 of the adapter component 654 may be configured as {1, Z, Z, Z}. In some implementations, the adapter 654 may receive such information (e.g., shown in Table 6) from a translation component 668 via pathway 662. The translation component 668 may comprise a bi-directional look up table comprising transcoding information (e.g., information in Table 2).

The adaptive predictor 610 may operate a learning process configured to produce the output 618. In some implementations of robotic operation and/or control, the output 618 may comprise signals and/or instructions corresponding to a respective channel 648 (e.g., commands forward, backward, left, right illustrated in Table 2). The predictor 610 learning process may be configured based on teaching input 604, comprising output of the combiner 664. In some implementations of robotic operation and/or control, the teaching input 604 may comprise a control signal associated with the target action (target output).

In some implementations, the predictor 610 learning process may be effectuated using a feature learning framework such as described in, e.g., co-owned and co-pending U.S. patent application Ser. No. 14/265,113 entitled "TRAINABLE CONVOLUTIONAL NETWORK APPARATUS AND METHODS FOR OPERATING A ROBOTIC VEHICLE", filed Apr. 29, 2014, incorporated supra.

The adaptive predictor 610 and the combiner 664 may cooperate to produce a control output 666 useful for operating the robotic device 680. In one or more implementations, the output 666 may comprise one or more motor commands configured to cause one or more actions (e.g., pan camera to the right, turn right wheel forward, and/or other actions), configure sensor acquisition parameters (e.g., use higher resolution camera mode, and/or other parameters), and/or other commands. In some implementations, the output 666 of the combiner 664 may be coupled to an adapter component 676. The adapter component 676 may be configured to transform the combiner output 666 to format 678 that may be compatible with the device 680. The adapter component 676 may be provided with information for transcoding predictor signal format into robot-platform specific format 678. In some implementations, the adapter component 676 may receive such information from a component 668 via pathway 658. In some implementations, the adapter component 654 and/or adapter component 676 may be operable to implement transformations illustrated in, e.g., Table 2.

In some implementations of analog control and/or analog correction modes of operation of the apparatus 640, the adapter component 676 may be configured to rescale the drive and/or steering signals to an appropriate range for the motors of the robotic platform 680.

In some implementations of discrete state space control mode of operation of the apparatus 640, the adapter component 676 may be configured to convert an integer control output 666 into a steering/drive command for the motors of the robotic platform 680.

In some implementations of stochastic control mode of operation of the apparatus 640, the adapter component 676 may be configured to perform an argmax of the control vector, in order to obtain, e.g., a steering/drive command. In some implementations, the adapter component 676 may be configured to perform a weighted average operation, using output values 666 that may be associated with one or more control states (e.g., shown in Table 1) in order to determine a most appropriate control output (e.g., average probability) that may correspond to a value between these states.

In some implementations, the predictor 610 and the combiner 664 components may be configured to operate one or more of a plurality of robotic platforms. The combiner output signal 666 may be adapted by the adapter component 676 in accordance with a specific implementation of a given platform 680. In one or more implementations of robotic vehicle control, the adaptation by the component 676 may comprise translating binary signal representation 620 into one or more formats (e.g., pulse code modulation) that may be utilized by given robotic vehicle. Co-owned and co-pending U.S. patent application Ser. No. 14/244,890 entitled "APPARATUS AND METHODS FOR REMOTELY CONTROLLING ROBOTIC DEVICES", filed Apr. 3, 2014, incorporated supra, describes some implementations of control signal conversion.

In some implementations of the component 676 corresponding to the analog control and/or analog corrector implementations, the adapter may be further configured to rescale the drive and/or steering signals to a range appropriate for the motors and/or actuators of the platform 680.

In some implementations of the discrete state space control implementation of the corrector 650, the component 676 may be configured to convert an integer control index into a corresponding steering/drive command using, e.g. a look up table, shown in Table 2. The control state space transformation illustrated in Table 2 may be employed by a controller apparatus, e.g., described with respect to FIG. 6. In some implementations of robotic vehicle navigation (e.g., 200 in FIG. 2A) the control state space transformation shown in Table 2 may be characterized by a drive component (e.g., linear velocity v) and a turn component (e.g., angular velocity ω). The component values (v,ω) that may be applied to motors of the robotic device 102 of FIG. 1 may be selected from a range between 0 and 1, as shown Table 2. In some implementations, the predictor 610 may be configured to operate using one or more discrete states. A mapping may be employed in order to transfer control commands from a platform space (e.g., continuous range)

into discrete states. Rectangular areas of the continuous state space may correspond to the following discrete actions listed in Table 2:

TABLE 2

| V value | ω value | Action |
|---|---|---|
| [⅔ ÷ 1] | [0 ÷ ⅓] | FORWARD-LEFT |
| [⅔ ÷ 1] | [⅓ ÷ ⅔] | FORWARD |
| [⅔ ÷ 1] | [⅔ ÷ 1] | FORWARD RIGHT |
| [⅓ ÷ ⅔] | [0 ÷ ⅓] | LEFT |
| [⅓ ÷ ⅔] | [⅓ ÷ ⅔] | STILL |
| [⅓ ÷ ⅔] | [⅔ ÷ 1] | RIGHT |
| [0 ÷ ⅓] | [0 ÷ ⅓] | BACK-LEFT |
| [0 ÷ ⅓] | [⅓ ÷ ⅔] | BACK |
| [0 ÷ ⅓] | [⅔ ÷ 1] | BACK-RIGHT |

A value (v,ω) falling within one of the platform space portions is translated to the associated respective discrete control command. For example, a combination of the value of linear velocity V falling within the range [2/3÷1] and the value of angular velocity ω falling within the range [2/3÷1] may produce a FORWARD RIGHT action.

In some implementations of the adapters 654, 676 corresponding to a continuous control space corrector 650 implementations, the adapter 654 may be configured to apply an argmax operation (i.e., the set of values for which a corresponding function attains its largest resultant value) to the control vector so as to transform the continuous control data into discrete steering/drive commands corresponding to actions shown Table 2. In one or more continuous signal adapter implementations, the adapter may be configured to apply an interpolation operation between two or more activation control states to determine a control command corresponding to an intermediate value between these states.

In some implementations the adapter 654 and/or 676 may be configured to map the user's control signal in (velocity v, rate of rotation w) space (v,w) into a vector of dimension N; and the adapter may be configured to map a vector of dimension N into a control signal in the space (v,w). By way of an illustration of a continuous signal adapter implementation, a control vector C may be configured in a range [[0, 1]^2] (where R^n is used to define an n-dimensional range (i.e., a square area in this case)). The individual element of the control vector C may contain individual control commands (for example a pair of analog signals for turning a remote-controlled vehicle, and a drive signal for driving the remote-controlled vehicle forward).

In some implementations of encoding a control signal comprising a bi-polar velocity v signal and rate of rotation w, an encoder (e.g., the adapter 654 in FIG. 6) may be configured to rectify one or both continuous components (e.g., v and/or w) into a range [−1, 1]. Discretizing the continuous components (e.g., v and/or w) into a discrete range of values (e.g., (−1, −0.5, 0, 0.5, 1) facilitate control signal determination by the predictor (e.g., 610 in FIG. 6).

In some implementations of state space for vehicle navigation, the actions of the platform 680 may be encoded using, e.g., a 1-of-10 integer signal, where eight (8) states indicate 8 possible directions of motion (e.g., forward-left, forward, forward-right, left, right, back-left, back, back-right), one state indicates "stay-still", and one state indicates "neutral". The neutral state may comprise a default state. When the corrector outputs a neutral state, the predictor may control the robot directly. It will be appreciated by those skilled in the arts that various other encoding approaches may be utilized in accordance with controlled configuration of the platform (e.g., controllable degrees of freedom).

In some implementations of control for a vehicle navigation, the action space of the platform 680 may be represented as a 9-element state vector, e.g., as described with respect to Table 2. Individual elements of the state vector may indicate the probability of the platform being subjected to (i.e., controlled within) a given control state. In one such implementation, output 618 of the predictor 610 in FIG. 6 may be multiplied with the output 648 of the corrector 650 in order to determine probability of a given control state.

Training illustrated and described with respect to FIGS. 2-3 may be implemented using an online training approach. As used herein, the term "online training" or "training at runtime" may be used to refer to training implementations where training time intervals and operation time intervals overlap and/or coincide with one another. During online learning, a robot may navigate a trajectory based on control commands generated by a learning process of the robot. At a given time instance, the robot may receive a teaching input, modify the learning process based on the teaching input and the learning process configuration (e.g., an artificial neuron network (ANN) a look-up table (LUT), and/or other configuration), and subsequently navigate the trajectory based on the modified process thus timely incorporating the teaching input. In some implementations, in a given online learning trial, the configuration of the adaptive controller may be adjusted based on teaching input determined during the trial so as to determine controller output for that trial. By way of an illustration, the actions 206, 216 may be executed during a single trial (or a portion thereof) wherein the action 216 may be performed based on an online adjustment of the learning parameters associated with the action 206 execution.

In one or more implementations, e.g., such as described in co-pending and co-owned U.S. patent application Ser. No. 14/265,113 entitled "TRAINABLE CONVOLUTIONAL NETWORK APPARATUS AND METHODS FOR OPERATING A ROBOTIC VEHICLE", filed Apr. 29, 2014, incorporated supra, the learning process may comprise an ANN comprising an input layer of nodes (e.g., configured to receive sensory input) and an output layer of nodes (e.g., configured to produce output actions (motor command)).

The network may be configured to receive one or more images from a camera and learn to predict the motor output signal from these images in real-time. This learning may be configured based on error back-propagation algorithm, which consists of computing a "cost"—a scalar value quantifying the discrepancy between the predicted motor signal and the actual motor signal, and minimizing the trainable parameters of the convolutional network with respect to this cost using gradient-descent.

Nodes of the input layer may be coupled to nodes of the output layer via a plurality (array) of connections. Layer-to-layer connectivity may be characterized by a matrix containing information related to which nodes of one layer connected to nodes of the other layer. In some ANN implementations, a given node of the input layer may be connected to every node of the output layer so that a given node of the output layer may be connected to every node of the input layer. Such connectivity may be referred to as all-to-all and/or fully connected. Various other connectivity techniques may utilized such as, e.g., all to some, some to some, random connectivity, and/or other methods.

In some implementations, the ANN may comprise additional (hidden) layers of nodes. Pair of layers may be connected by a convolutional kernel and/or a fully connected weight matrix (e.g., implementing all-to-all connectivity).

FIG. 7 illustrates a computerized system configured to implement the bistatic sensing methodology of the disclosure, according to one or more implementations.

The system 700 may comprise a learning configuration (robotic brain) component 712 for controlling the robotic apparatus. The learning configuration component may be logically implemented within a processor that executes a computer program embodied as instructions stored in non-transitory computer readable media, and configured for execution by the processor. In other embodiments, the robotic brain may be implemented as dedicated hardware, programmable logic (e.g., field programmable gate arrays (FPGAs), and/or other logical components), application specific integrated circuits (ASICs), and/or other machine implementations. Additional memory 714 and processing components 716 may be available for other hardware/firmware/software needs of the robotic device.

The sensor components 720 may enable the robotic device to accept stimulus from external entities. Input stimulus types may include, without limitation: video, audio, haptic, capacitive, radio, accelerometer, ultrasonic, infrared, thermal, radar, lidar, sonar, and/or other sensed inputs. In some implementations, the sensor component 720 may comprise a projector and a receiver components, e.g., such as described above with respect to FIGS. 2A-2B and/or 4A. The sensor component may comprise a camera configured to provide one or more digital image frames to the processing component 716.

The processing component 716 may operate an object detection process of the disclosure.

The processing component 716 may interface with the user interface (UI) components 718, sensory components 720, electro-mechanical components 722, power components 724, and communications (comms) component 726 via one or more driver interfaces and/or software abstraction layers. In one or more implementations, the power components 724 may comprise one or more of a direct current, an alternating current source, a mechanical coupling, an energy accumulator (and/or a mechanical energy means (e.g., a flywheel, a wind-up apparatus), a wireless charger, a radio-isotope thermoelectric generator, a piezo-generator, a dynamo generator, a fuel cell, an internal or external combustion engine, a pneumatic power source, a hydraulic power source, and/or other power sources.

Additional processing and memory capacity (not shown) may be used to support these processes. However, it will be appreciated that the aforementioned components (e.g., user interface components 718, sensor components 720, electro-mechanical components 722) may be fully controlled based on the operation of the learning configuration 712. Supplemental memory and processing capacity may also aid in management of the controller apparatus (e.g. loading executable code (e.g., a computational brain image), replacing the executable code, executing operations during startup, and/or other operations). As used herein, a "computational brain image" may comprise executable code (e.g., binary image files), object code, bytecode, an array of weights for an artificial neuron network (ANN), and/or other computer formats.

Consistent with the present disclosure, the various components of the device may be remotely disposed from one another, and/or aggregated within one of more discrete components. For example, learning configuration software may be executed on a server apparatus, and control the mechanical components of a robot via a network or a radio connection. In another such example, multiple mechanical, sensory, and/or electrical units may be controlled by a single robotic brain via network/radio connectivity.

The electro-mechanical components 722 include virtually any electrical, mechanical, and/or electro-mechanical component for sensing, interaction with, and/or manipulation of the external environment. These may include, without limitation: light/radiation generating components (e.g. light emitting diodes (LEDs), infrared (IR) sources, incandescent light sources, etc.), audio components, monitors/displays, switches, heating elements, cooling elements, ultrasound transducers, lasers, camera lenses, antenna arrays, and/or other components.

The electro-mechanical components 722 may further include virtually any type of component capable of motion (e.g., to move the robotic apparatus 700, manipulate objects external to the robotic apparatus 700 and/or perform other actions) and/or configured to perform a desired function or task. These may include, without limitation: motors, servos, pumps, hydraulics, pneumatics, stepper motors, rotational plates, micro-electro-mechanical devices (MEMS), electro-active polymers, and/or other motive components. The components interface with the learning configuration and enable physical interaction and manipulation of the device. In some implementations of robotic cleaning devices, the electro-mechanical components 722 may comprise one or more of a vacuum component, brush, pump, scrubbing/polishing wheel, and/or other components configured for cleaning/maintaining of premises. Such components enable a wide array of potential applications in industry, personal hobbyist, building management, medicine, military/intelligence, and other fields (as discussed below).

The communications component 726 may include one or more connections configured to interact with external computerized devices to allow for, inter alia, management and/or control of the robotic device. The connections may include any of the wireless or wireline interfaces discussed above, and further may include customized or proprietary connections for specific applications.

The power system 724 may be configured to support various use scenarios of the device. For example, for a mobile robot, a wireless power solution (e.g. battery, solar cell, inductive (contactless) power source, rectification, and/or other mobile power source) may be appropriate. However, for fixed location applications which consume significant power (e.g., to move heavy loads, and/or other power intensive tasks), a wall power supply (or similar high capacity solution) may be a better fit. In addition, in some implementations, the power system and or power consumption may be configured with the training of the robotic apparatus 700. Thus, the robot may improve its efficiency (e.g., to consider power consumption efficiency) through learned management techniques specifically tailored to the tasks performed by the robotic apparatus.

Figure 8A:
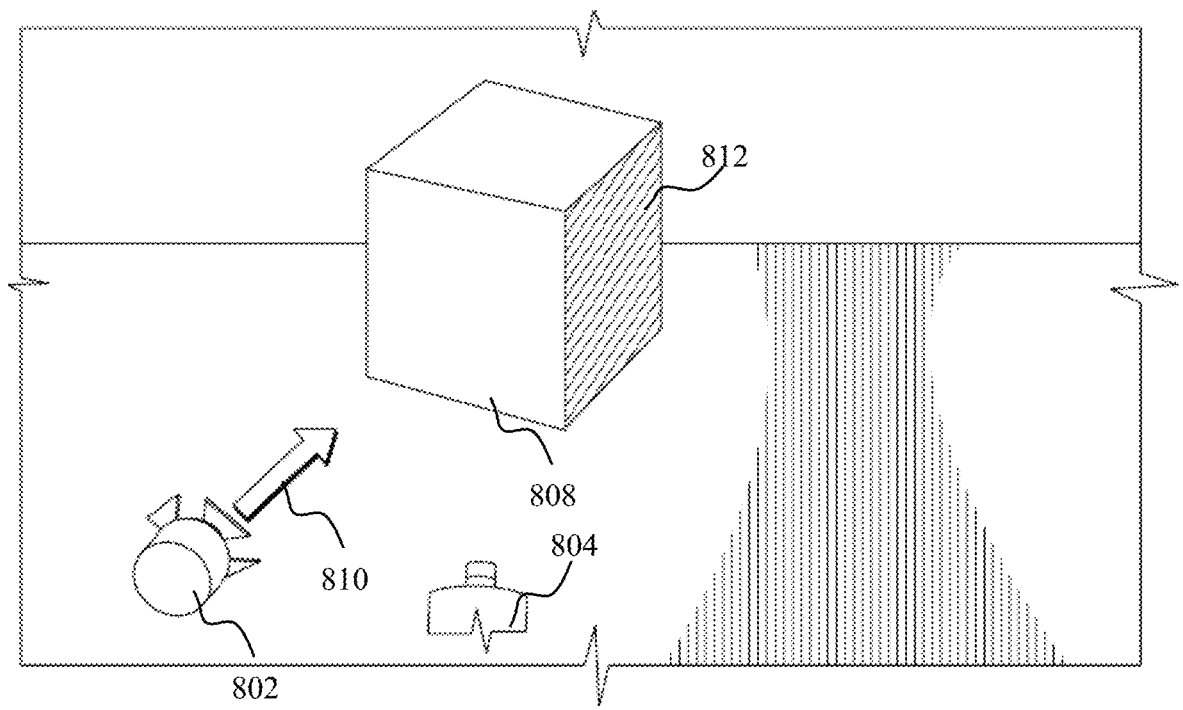
FIGS. 8A-8B illustrate a pattern projected by the bistatic sensor in presence of an object within the sensor field of view, in accordance with one implementation.
Figure 8B:
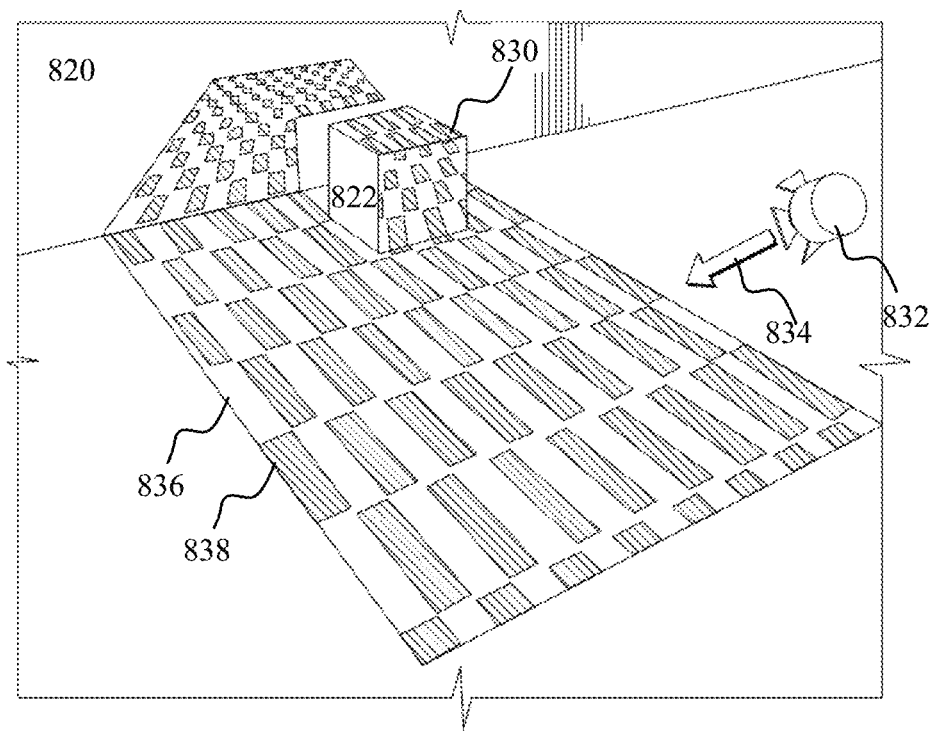

FIGS. 8A-8B illustrate a pattern projected by the bistatic sensor in presence of an depicting an object within the sensor field of view, in accordance with one implementation.

A projector component 802 (e.g., the component 202 described above with respect to FIG. 2A) may be used to project a pattern. Axis of the projector field of view may be denoted by arrow 810. An object 808 may be present in the field of view of the transmitter 802. A cube is selected to illustrate the object 808 for clarity. As shown in FIG. 8A, one or more sides of the object (e.g., side denotes 812) may not be irradiated (illuminated) by the projected pattern. Although the side 812 may be visible in the field of view of the receiver component (e.g., the camera 804) absence of the irradiation signal from the projector may cause the side 812 to appear in the received image as unilluminated area (also referred to as a hole).

FIG. 8B illustrates a virtual world simulation depicting an unilluminated portion (a hole) 822 in the received pattern 820 due to presence of the object 830 in the field of view of the projector, in accordance with one or more implementations. Icon 832 denotes location of the bistatic sensor apparatus, arrow 834 denotes orientation of the view field of the sensor. The projected pattern may comprise a checkered pattern comprised of elements 838, 836. The object 820 protruding above the ground level may cause the unilluminated area (hole) 822 to appear within the received image. The received pattern (e.g., 820 in FIG. 8B) may be analyzed using any applicable methodologies including these described herein, in order to determine presence of unilluminated area (hole). Occurrence of the hole 822 in the received pattern may indicate an obstacle being present in front of the robotic device.

Figure 9A:
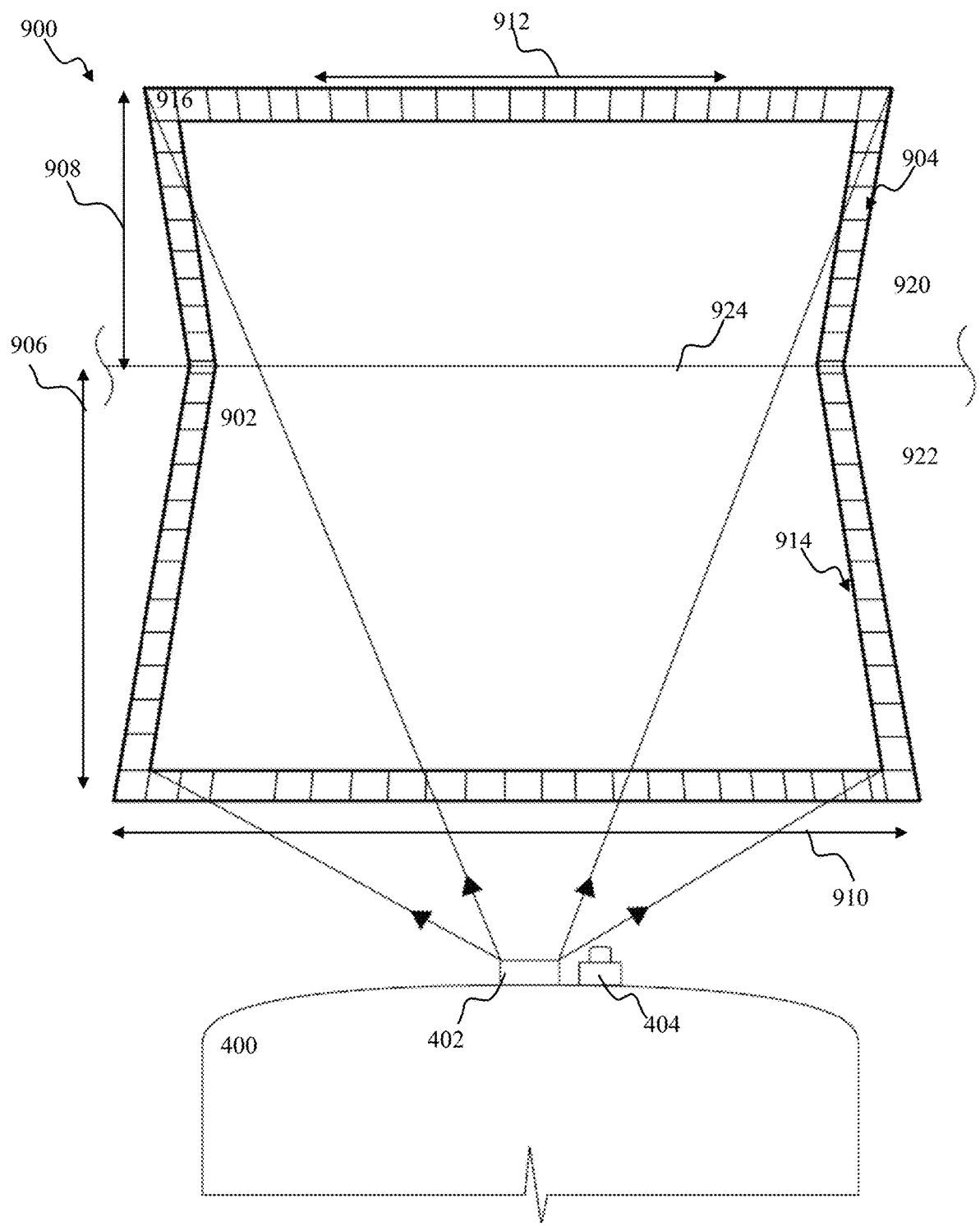
FIG. 9A illustrates distortion of the projected pattern due to presence of a wall in front of the sensor, in accordance with one implementation.

In some implementations, analysis of the received pattern may be used to determine presence of a wall and/or another object that may extend beyond (in width/height) an area covered by the bistatic sensor field of view. FIG. 9A illustrates distortion of a pattern projected by the component 402 and due to presence of a wall in front of the projector, in accordance with one implementation. The reflected pattern 900 may be configured based on a projected pattern (e.g., 300 in FIG. 3) that has been reflected partially by the floor 922 and partially by a wall 920 in front of the robotic device 400. Line 924 denotes boundary between the floor 922 and the wall 920. The pattern portion 902 reflected by the floor may comprise a rectangular shape of dimensions 906, 910. The pattern portion 902 may comprise a perimeter portion 914 comprised of a plurality of elements (e.g., such as described above with respect to FIGS. 3B and/or 15A-15D).

The pattern portion 904 reflected by the wall may comprise a non-rectangular shape (e.g., a trapezoid) of height 908, and widths 910, 912. The pattern portion 904 may comprise a perimeter portion 916 comprised of a plurality of elements (e.g., such as described above with respect to FIGS. 3A-3B and/or 15A-15D).

The received pattern 900 may be analyzed (e.g., by component 716 described with respect to FIG. 7) in order to determine presence of an object in front of the robotic device 400. Analysis of the pattern 900 may comprise operations such as, e.g., thresholding (e.g., at 80% brightness). A best fit bounding box analysis may be applied to the thresholded image in order to determine whether the reflected pattern corresponds to the projected trapezoid. If one or more "holes" are detected within the trapezoid in the reflected pattern, then the detected holes may be regarded as obstacles within the path of the robot or even an actual hole in the floor (which for the purposes of many tasks, is an obstacle).

In one or more implementations, when the projected pattern includes a pattern (e.g., projected trapezoid and a pattern along its edge as illustrated in FIG. 3A) a block matching algorithm may be used to analyze reflected pattern. Specifically, given a small patch of the projected pattern (e.g., from 2×2 pixels up to the full resolution of the projected pattern), the block matching algorithm finds the best match in the recorded image. The horizontal displacement (or vertical displacement, depending on physical placement of projector and camera) of the patch from where it originated in the pattern to where it was found in the recorded image is then measured. In some variants, if no match is found that is also recorded. The process may be applied to a plurality of individual patches within the image. In this manner, such "displacement image" processing may be used to detect objects and their relative distance; larger displacements correspond to closer objects. Regions with patches not found in the recorded image may correspond to obstacles.

FIG. 9B illustrates a virtual world simulation of a wall-induced pattern distortion as sensed by the sensor apparatus of the present disclosure. The pattern 950 may comprise a checkered pattern comprised of elements 952, 954. The reflected pattern may be configured based on a projected pattern (e.g., 300 in FIG. 3) that has been reflected partially by the floor (pattern portion 956) and partially by a wall (pattern portion 958) in front of the robotic device 940.

FIGS. 10A-11 illustrate use of a sub-component within a projected pattern for detecting presence of an object in accordance with one or more implementations. Images 1000, 1010, 1020 depicted in FIGS. 10A-11 may be obtained by a camera component of a bistatic sensor disposed on a robotic device (e.g., component 204 disposed on the device 200 of FIG. 2A). The projected pattern may be configured in a variety of ways, e.g., comprise a perimeter portion 304 and a body (center) portion 302 of FIG. 3A, pattern 440 of FIG. 4B, patterns shown in FIGS. 15A-5D, and/or other patterns. The projected pattern may further comprise a sub-pattern element. In some implementations, e.g., such as shown and described with respect to FIGS. 10A-11, the sub-component may comprise a crosshatch 1012. The sub-component 1012 may be projected by the projector component (e.g., 202 in FIG. 2A). The component 202 may comprise an adjustable/switchable filter and/or mask configured to enable generation of, e.g., the pattern 300 and/or the sub-pattern element 1012. In some implementations the sub-component 1012 may projected by another component (e.g., a red-dot LED, and/or a laser component.

An object (e.g., ball) may be present in the field of view of the bistatic sensor. FIG. 10A illustrates received image 1000 wherein the ball 1006 may obscure the sub-pattern. The received image 1000 may comprise floor reflections 1008 and/or wall reflections (not shown). FIG. 10B illustrates received image 1010 wherein the sub-pattern 1012 may be projected onto the ball (denoted by the circle 1016). The ball representation 1016 in FIG. 10B may be shifted vertically compared to the representation 1006 in FIG. 10A. Presence of a feature (e.g., 1016) and/or detection of the sub-pattern 1012 in the received image (e.g., as shown in FIG. 10A) may indicate that an object may be present in front and at a distance of the robot (e.g., 200 in FIG. 2A). Presence of a feature and/or absence of the sub-pattern (e.g., as shown in FIG. 10B) may indicate that an object may be present in close proximity to the robot (e.g., device 200 in FIG. 2A). In some implementations, the image 1000 may be obtained when the object is closer than the height of the projector (e.g., 1 m from the robot when the projector 202 may be mounted 1 m above the floor).

In some embodiments, the bistatic sensor may be configured to detect the presence of an object in the range of the projection (e.g., along the extent denoted by arrow 286 in FIG. 2B). In some implementations, the detection range may be configured to span from 0.2 m to 5 m, with an optimal acuity range between 2 m and 4 m from the robotic device. In one such variant, the optimal acuity range refers to the range of distance suitable for typically expected operation. Those of ordinary skill in the related arts will readily appreciate that still other implementations may have greater or shorter ranges, the foregoing being purely illustrative.

The received image 1020 shown in FIG. 11 may comprise floor reflections 1028, sub-pattern 1022, and/or wall reflections (not shown). The configuration shown in FIG. 11 may correspond to sub-pattern reflections in absence of objects. Comparing image 1020 and 1010 of FIGS. 11 and 10B, respectively, it may be concluded that presence of an object (e.g., 1016) in FIG. 10B may cause reflection of the sub-pattern 1012 to occur at a greater height (e.g., 1014) when compared to height 1024 of the sub-pattern 1022 reflection in FIG. 11 occurring in absence of objects. In some implementations, the difference of heights 1024 and 1014 may be configured based on a distance to the object and a distance to the flat surface (e.g., floor), e.g., as described in detail with respect to FIG. 2C. FIG. 2C depicts a signal reflected by an object disposed in field of view of the bistatic sensor of the disclosure disposed on a robotic apparatus. The robotic device 251 may comprise a sensor apparatus comprising a light projector component 252 (e.g., such as described above with respect to FIG. 2B) and a camera component comprising imaging sensor 255. The projector component may be configured to emit a signal along a path 275. When an object may be present in front of the projector, the signal may reflect from the object 291. The signal reflected from the object may arrive at the sensor 255 along path 277 at a location 271. If no object may be present in front of the projector, the signal transmitted by the projector may propagate along path (shown by broken line 295). The projected signal may be reflected by the surface at a location 289. The signal reflected at the location 289 may propagate back to the sensor 255 along path 293. The signal reflected at the location 289 may arrive at the sensor 255 at a location 273. Location 273 may be spaced vertically from the location 271 by distance 285. Distance 285 may correspond to difference between distance 1014 and 1024 in FIGS. 10B, 11. The magnitude of the distance 285 may be calculated based on distance 267 between the robot 251 and the object 291 and distance 281 between the object and the location 289.

In some implementations, the pattern projection methodology of the disclosure may be used to communicate (also referred to as advertise) information related to operation of a robotic device into environment of the robotic device. FIG. 12 illustrates advertising into the environment information related to trajectory of a robot via a projected image, in accordance with one or more implementations. A robotic device may comprise the device 200 of FIG. 2A and/or 400 of FIG. 4A. The robotic device may comprise a projector component (e.g., 202 in FIG. 2A and/or 402 in FIG. 4A). The projector component may be use to project a pattern, e.g., the pattern 1200 shown in FIG. 12. The pattern 1200 may comprise a center portion 1202 and a perimeter portion. The perimeter portion may comprise a pattern, e.g., the pattern 304, 334 described above with respect to FIGS. 3A-3B. The center portion 1202 may be used to project a static or an animated image indicating action being performed by the robot. By way of an illustration, the portion 1202 may comprise an image of a robot 1210 with an arrow 1214 superimposed thereupon. The arrow 1214 may indicate forward motion of the robot. The length of the arrow 1214 may be configured based on the speed (e.g., proportional) of the robot. In some implementations, the indication of FIG. 12 may comprise a "running" animation wherein the image 1210 may be displayed at different distances (e.g., progressively farther away cycled through a loop) from the robot and/or a flashing image. By way of an illustration, the animation may comprise two or more images (e.g., 1210) displayed at two or more locations characterized by progressively larger distances (e.g., distance shown by arrow 1216 in FIG. 12) from the robot (400 in FIG. 12). In some implementations, the image 1210 and/or the arrow 1214 may be projected by a digital light projection component (e.g., such as described above with respect to FIG. 3A). The DLP component may be operably coupled to a processing component (e.g., component 716). The processing component may communicate to the DLP component information related to robot trajectory, size of the robot, current parameter values of the robot movement (e.g., speed/direction) and or subsequent parameter value of the robot movement.

A customer (e.g., 134 in FIG. 1) may observe the image 1210 in advance of (or without) seeing the robotic device (e.g., 102 in FIG. 1) and refrain from entering the aisle in front of the device 102. Such functionality may be used to improve safety of operation of robotic devices in presence of humans.

It will be appreciated by those skilled in the arts that the above application descriptions and/or image content and/or parameters (e.g., size, orientation, pattern) merely exemplary and merely serve to illustrate principles of the disclosure, and many other pattern projection representations and/or applications may be utilized with the present disclosure. In some implementations of aircraft landing safety, a ground vehicle may utilize projection methodology of the disclosure to indicate to an aircraft direction and/or speed of its motion by projecting an arrow onto the tarmac. Dimensions of the projected pattern (e.g., 1200 in FIG. 12) may be scaled (e.g., increased) commensurate with detection capabilities of sensors on the aircraft. In one or more implementations of drone navigation and/or landing, a robotic device may project landing indication for an aerial drone aircraft (e.g., quadcopter), and/or other apparatus. By way of an illustration, for an airplane at 1000 m height above tarmac, dimensions of the arrow 1214 may be selected between 1 m and 10 m, preferably 4 m.

Figure 13A:
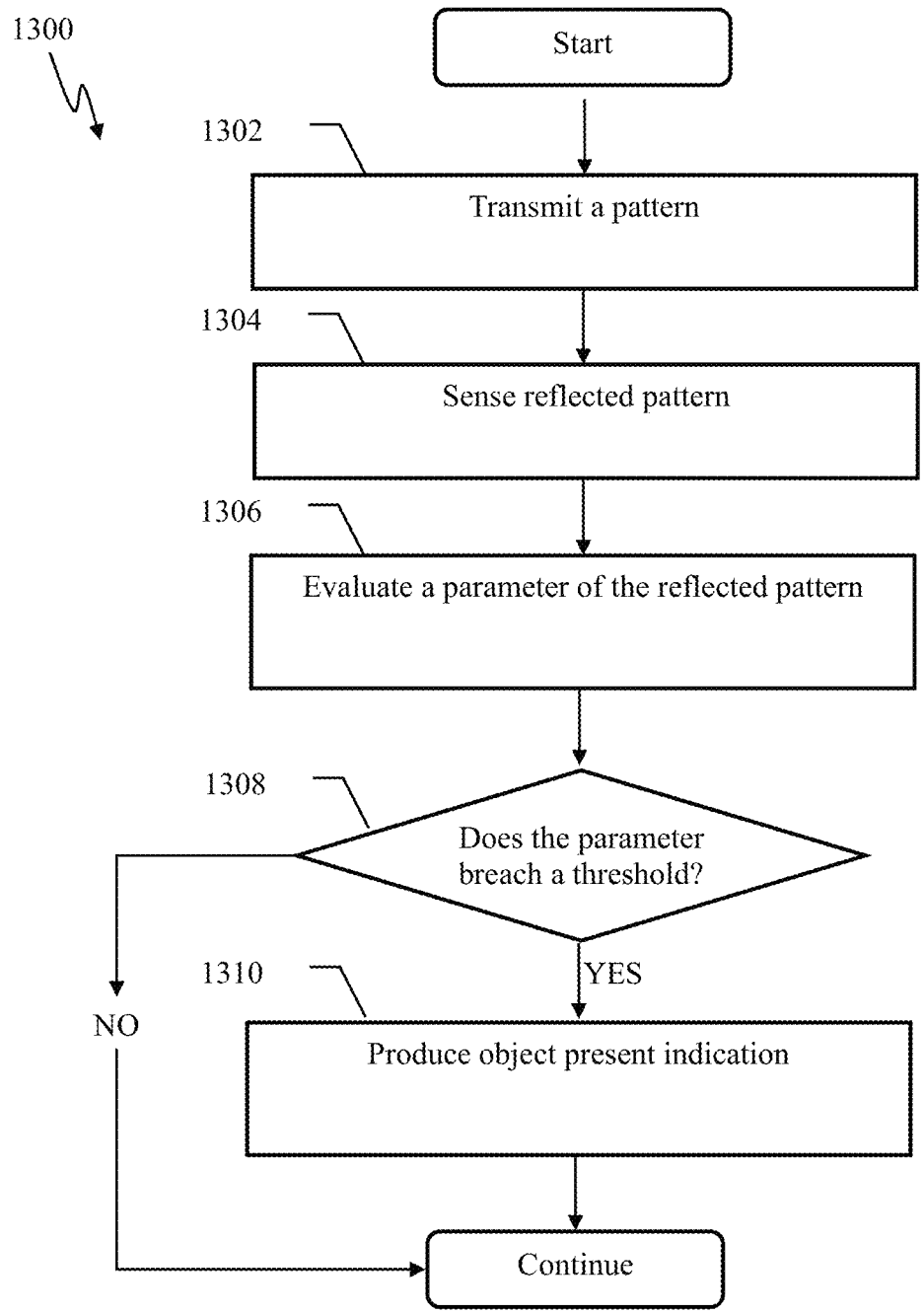
FIG. 13A is a logical flow diagram illustrating method of object detection using of the bistatic sensor apparatus of the present disclosure, in accordance with one or more implementations.
Figure 13B:
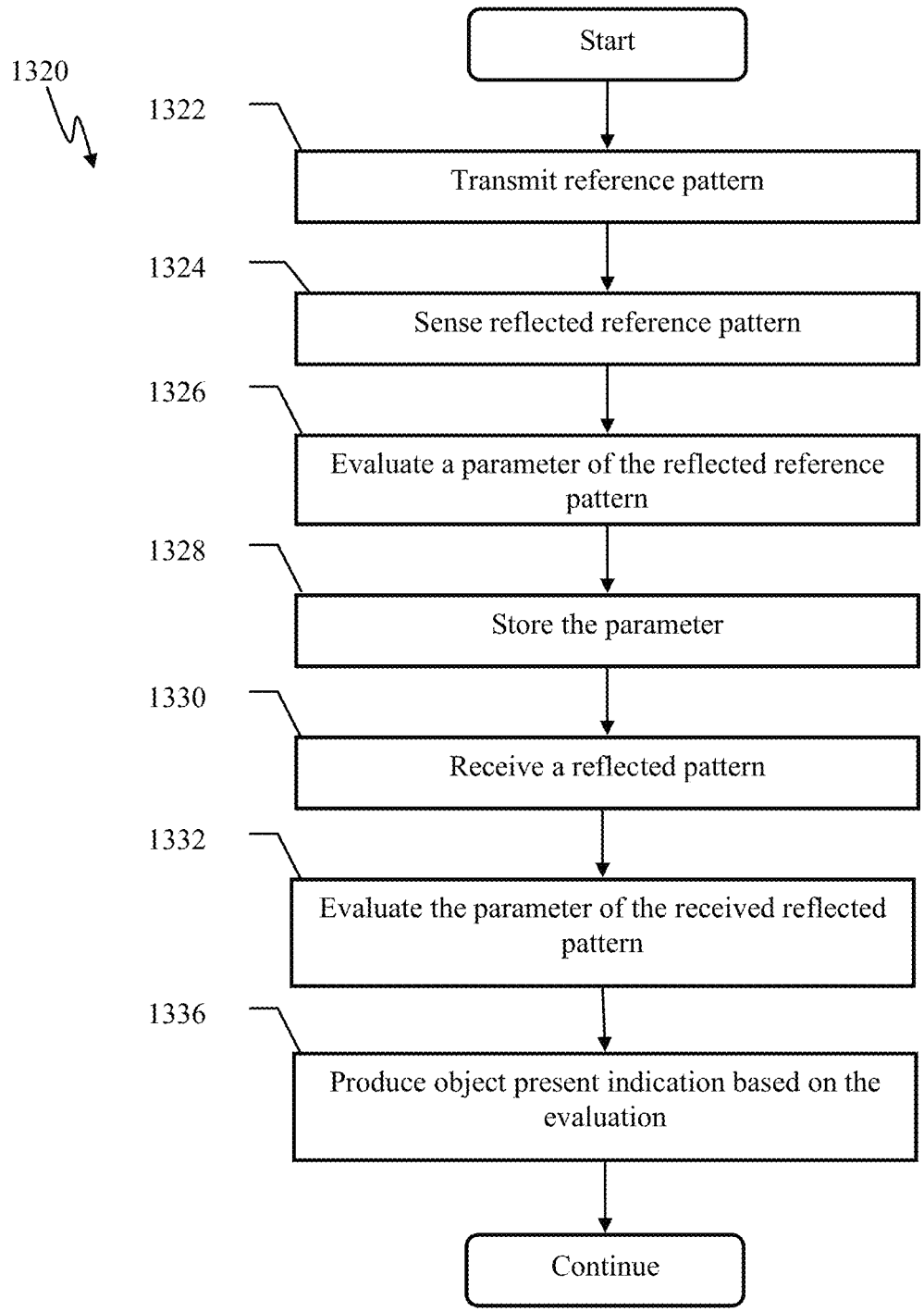
FIG. 13B is a logical flow diagram illustrating object detection method comprising use of a reference pattern information, in accordance with one or more implementations.
Figure 14:
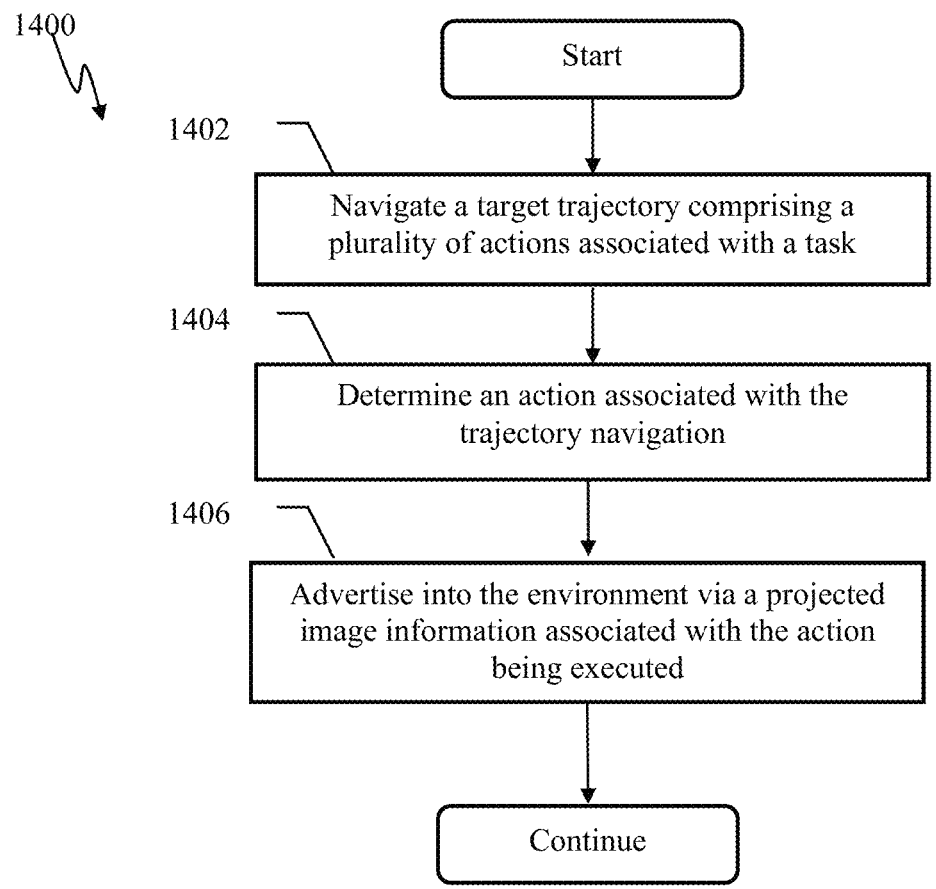
FIG. 14 is a logical flow diagram illustrating method for trajectory information advertisement using the pattern projection methodology of the present disclosure, in accordance with one or more implementations.

FIGS. 13A-14 illustrate methods for using the methodology of the disclosure for detection of objects during operation of robotic devices and/or communicating/advertising information related to operation of robotic devices into environment, in accordance with one or more implementations. The operations of methods 1300, 1320, 1400 presented below are intended to be illustrative. In some implementations, methods 1300, 1320, 1400 may be accomplished with one or more additional operations not described, and/or without one or more of the operations discussed. Additionally, the order in which the operations of methods 1300, 1320, 1400 are illustrated in FIGS. 13A-14 described below is not intended to be limiting.

In some implementations, methods 1300, 1320, 1400 may be implemented in one or more processing devices (e.g., a digital processor, an analog processor, a digital circuit designed to process information, an analog circuit designed to process information, a state machine, and/or other mechanisms for electronically processing information and/or execute computer program modules). The one or more processing devices may include one or more devices executing some or all of the operations of methods 1300, 1320, 1400 in response to instructions stored electronically on an electronic storage medium. The one or more processing devices may include one or more devices configured through hardware, firmware, and/or software to be specifically designed for execution of one or more of the operations of methods 1300, 1320, 1400. The operations of methods 1300, 1320, 1400 may be implemented by a bistatic sensor apparatus disposed on a robotic device (e.g., the device 200 in FIG. 2A). In some implementations, the robotic device may comprise a cleaning device (e.g., 102 in FIG. 1) operating within a premises (e.g., 100 in FIG. 1)

At operation 1302 of method 1300, a pattern may be transmitted. In some implementations, the pattern transmission may be effectuated by a transmitter component of the bistatic sensor apparatus (e.g., the component 202 of FIG. 2A, and/or 402 of FIG. 4A). The pattern may comprise one or more pattern configurations, e.g., such as described above with respect to FIGS. 3A, 15A-15D. In some implementations, the transmitted pattern may comprise an encoded portion (e.g., perimeter portion 1204 in FIG. 12) and a central portion (e.g., 1202 in FIG. 12). In one or more implementations, the pattern may be projected using a visible light source, an infrared light source, an audible wavelength source, an ultrasonic wave source, a radio wave source, and/or other carrier type source. In some implementations of visible light transmissions, the source may comprise a light emitting diode, a laser beam source and a pattern shaping mask, and/or other implementations configured to project a two dimensional pattern of light. The transmitter may transmit a two dimensional pattern comprised of a given pattern (e.g., grid, checkerboard, and/or other) via a carrier signal (e.g., light). In one or more implementations, the pattern may be projected using a digital light projection (DLP) MEMS technology, e.g., such as digital micromirror device (DMD) array produced by Texas Instruments. It will be recognized by those skilled in the arts that various other pattern projection and/or pattern selection implementations may be employed with the methodology of the disclosure.

The pattern projected at operation 1302 may be reflected from one or more objects within the environment (e.g., floor 212, box 208, wall 210 in FIG. 2A). At operation 1304 reflected pattern may be sensed. In some implementations the pattern may be sensed by a receiving component of the bistatic sensor apparatus (e.g., the component 204 of FIG. 2A, and/or 404 of FIG. 4A). The receiving component may comprise a light capturing sensor, an infrared detector, an acoustic transducer (e.g., a microphone), a radio wave antenna, and/or other sensor configured to detect reflected carrier waves corresponding to the modality of the transmitter component. In some implementations of pattern transmission using a light source, the receiving component may comprise a camera. The sensed pattern may comprise a digital image (e.g., image 1200 in FIG. 12 and/or 330 in FIG. 3B).

At operation 1306 a parameter of the reflected pattern may be evaluated. In some implementations, the sensed pattern evaluation may comprise one or more of contrast edge detection, color analysis, brightness analysis, determination of length and/or orientation of line segments and/or other operations configured to provide information related to structure of the received pattern. In some implementations, the pattern evaluation may be configured to produce a parameter of the reflected pattern. The parameter may comprise one or more of pattern perimeter, dimensions, area, orientation, skewness and/or other parameters. In some implementations, the parameter may be configured to characterize a deviation of one or more pattern elements relative to a reference (e.g., vertical deviation of a sub-pattern with respect to the floor such as described with respect to FIGS. 10A-11). In some implementations, the parameter may be configured to characterize a uniformity of the sensed pattern in order to determine, e.g., presence of a wall, e.g., such as shown by patterns 900, 950 in FIGS. 9A-9B.

Discrepancies between an expected pattern (e.g., corresponding to reflections of the carrier in absence of obstacles) and the received pattern may be used to determine presence of an object within the sensing volume of the bistatic sensor. The parameter determined at operation 1306 may be utilized in order to quantify the discrepancy. At operation 1308 a determination may be made as to whether the parameter determined operation 1306 breaches a threshold. In one or more implementations, the threshold may comprise one or more of pattern similarity level (e.g., in a range between 50% and 95%), a reference dimension (e.g., width, length of the pattern 330), and/or other quantity.

Given the location, field of view (FOV), and other parameters of the transmitter and the receiver and characteristics of the transmitted pattern (e.g., 300 in FIG. 3A) the location of the projected pattern on the received image can be calculated. In some implementations, the location of the received image may be calibrated by transmitting a known pattern to a flat surface and registering the perceived image/pattern.

Responsive to determination at operation 1308 that the parameter breaches the threshold the method 1300 may proceed to operation 1310 wherein object present indication may be produced. The object present indication may comprise one or more of a software or a hardware indications, e.g., a memory register value, a logic line level, a message or a flag in a software application, and/or other indication mechanism. In some implementations, the object present indication may be communicated to a navigation process of the robotic device. The navigation process may be configured to modify (e.g., execute a turn, reduce speed and/or altogether stop) current trajectory of the robotic device responsive do receipt of the object present indication.

FIG. 13B illustrates object detection method comprising use of a reference pattern information, in accordance with one or more implementations.

At operation 1322 a reference pattern may be transmitted. In one or more implementations the reference pattern may comprise pattern 300 shown and described with respect to FIG. 3A. For purpose of improved object detection, the reference pattern may be transmitted into environment free of objects (e.g., obstacles), e.g., as illustrated in FIGS. 2B and/or 4A.

The pattern projected at operation 1322 may be reflected e.g., floor 212 and/or other surface. At operation 1324 reflected pattern may be sensed. In some implementations the pattern may be sensed by a receiving component of the bistatic sensor apparatus (e.g., the component 204 of FIG. 2A, and/or 404 of FIG. 4A). The receiving component may comprise a light capturing sensor, an infrared detector, an acoustic transducer (e.g., a microphone), a radio wave antenna, and/or other sensor configured to detect reflected carrier waves corresponding to the modality of the transmitter component. In some implementations of pattern transmission using a light source, the receiving component may comprise a camera. The sensed pattern may comprise a digital image (e.g., image 1200 in FIG. 12 and/or 330 in FIG. 3B).

At operation 1326 a parameter of the sensed pattern may be evaluated. In some implementations, the sensed pattern evaluation may comprise one or more of contrast edge detection, color analysis, brightness analysis, determination of length and/or orientation of line segments and/or other operations configured to provide information related to structure of the received pattern. In some implementations, the pattern evaluation may be configured to produce a parameter of the reflected pattern. The parameter may comprise one or more of pattern perimeter, dimensions, area, orientation, skewness and/or other parameters. In some implementations, the parameter may be configured to characterize a deviation of one or more pattern elements relative to a reference (e.g., vertical deviation of a sub-pattern with respect to the floor such as described with respect to FIGS. 10A-11). In some implementations, the parameter may be configured to characterize a uniformity of the sensed pattern in order to determine, e.g., presence of a wall, e.g., such as shown by patterns 900, 950 in FIGS. 9A-9B. In one or more implementations wherein the projected pattern may comprise a quadrilateral, the parameter may comprise a ratio characterizing shape of the pattern (e.g., ratio of diagonals, a ratio of two of dimensions 336, 346, 334, 338), and/or other parameters.

At operation 1328 the parameter determined at operation 1326 may be stored. In some implementations, the parameter may be stored in non-volatile memory of the pattern processing component (e.g., memory 714 shown and described with respect to FIG. 7). The parameter stored at operation 1328 may be subsequently used as a reference (e.g., threshold) for detecting objects during operation of a robotic device.

At operation 1330 a reflected pattern may be sensed. In some implementations, the reflected pattern may comprise a transmitted pattern (e.g., 300 in FIG. 3A) that may have been reflected from one or more objects (e.g., 208, 210 in FIG. 2A) during operation of a robotic device (e.g., the device 102 in FIG. 1).

At operation 1332 parameter of the received reflected pattern sensed at operation 1330 may be evaluated. In some implementations, the parameter may comprise a ratio characterizing shape of the sensed pattern (e.g., ratio of diagonals, a ratio of two of dimensions 336, 346, 334, 338), and/or other parameters. The evaluation may comprise a comparison operation versus the reference parameter, e.g., such as stored at operation 1328. Responsive to determination at operation 1332 that the parameter differs from the reference parameter by a given amount (e.g., breaches an object present threshold) object present indication may be produced. The object present indication may comprise one or more of software or hardware indications, e.g., a memory register value, a logic level, a message and/or a flag in a software application, and/or other indication mechanism. In some implementations, the object present indication may be communicated to a navigation process of the robotic device. The navigation process may be configured to modify (e.g., execute a turn, reduce speed and/or altogether stop) current trajectory of the robotic device responsive do receipt of the object present indication.

FIG. 14 illustrates a method for trajectory information advertisement using the pattern projection methodology of the disclosure, in accordance with one or more implementations. Operations of method 1400 may be effectuated by a robotic device operating in a store, e.g., the device 102 in FIG. 1.

At operation 1402 a target trajectory may be navigated. The trajectory navigation may comprise execution of a plurality of actions associated with a task. By way of an illustration, the trajectory navigation may comprise traversing of premises 100 by a robotic cleaning device 102 while performing cleaning operations (e.g., floor sweeping and/or scrubbing).

At operation 1404 an action characteristic associated with the trajectory being navigated may be determined. In some implementations, the action characteristic may comprise velocity and/or direction of motion of the robotic device. In one or more implementations of robotic manipulation, the action characteristic may comprise robotic arm motion, joint angle change, arm segment length change (e.g., extend, contract), and/or other parameters.

At operation 1406 the information associated with the action being executed may be advertised into the environment via a projected image. In some implementations, the information advertisement may comprise projecting a graphics image (e.g., arrow 138 of FIG. 1 and/or 1214 in FIG. 12) characterizing direction and/or speed of motion of the robotic device. The projection of motion of the robotic device ahead of the device (e.g., the arrow 138 being placed ahead of the device 102 in FIG. 1) may improve operational safety of the robotic device. In some implementations, the operational safety improvement may be characterized by one or more (i) an increased time margin between detecting an obstacle (e.g., human 134) and an action by the robot 102, an increase in distance between the human and the robot, a refraining by the human of entering the aisle 132 in front of the robotic device 102 responsive to detection of the arrow 138 in FIG. 1.

Methodology of the disclosure may enable autonomous navigation by robotic devices in a variety of applications. The object detection approach disclosed herein a robotic device to a variety of objects without object pre-selection and/or pre-of wiring and/or without requiring a trainer to record training dataset and analyze data offline. These improvements may be leveraged for constructing autonomous robotic vehicles characterized by a lower cost and/or increased autonomy and/or enable robotic devices to operate in more complex requirements (e.g., tracking multiple targets), navigate at higher speeds, and/or achieve higher performance (e.g., as characterized by a fewer collisions, shorter task execution time, increased runtime without recharging, greater spatial coverage, and/or other parameter).

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed implementations, or the order of performance of two or more steps permuted. All such variations are considered to be encompassed within the disclosure disclosed and claimed herein.

While the above detailed description has shown, described, and pointed out novel features of the disclosure as applied to various implementations, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

What is claimed is:

1. A system for sensing objects in an environment of a robot, comprising:
 a memory having computer readable instructions stored thereon; and
 one or more processors configured to execute the computer readable instructions to:
 transmit one or more first output signals from a projector coupled to the robot, the one or more first output signals comprising a first pattern, the first pattern comprising at least in part a visual light indication based on a trajectory of the robot;

receive one or more input signals, the one or more input signals comprising a second pattern, the one or more input signals being received by a sensor coupled to the robot, the sensor being spatially separated from the projector;

evaluate a difference between the one or more first output signals and the one or more input signals; and transmit one or more second output signals upon the difference breaching a threshold the one or more second output signals comprising an object present indication.

2. The system of claim 1, wherein the first pattern includes a reference pattern.

3. The system of claim 2, wherein the evaluation of the difference comprises an extraction of information related to the structure of the reference pattern and the one or more input signals.

4. The system of claim 3, wherein the evaluation of the difference comprises an extraction of information related to structure of the reflected pattern.

5. The system of claim 1, wherein the second pattern includes a reflected pattern.

6. The system of claim 2, wherein the reference pattern is projected a distance away from the robot in accordance with the speed of the robot.

7. The system of claim 2, wherein the reference pattern comprises the visible light indication portion and an invisible light portion, the invisible light portion includes one or more of infrared, radio, ultrasonic, or audible modality.

8. The system of claim 1, wherein the visual light indication is configured to graphically represent the speed and direction of the robot along the trajectory in a readable format.

9. The system of claim 1, wherein the one or more processors are configured to execute the computer readable instructions to change the trajectory of the robot to a different second trajectory or stopping the robot in response to the object present indication.

10. The system of claim 1, wherein the one or more processors are further configured to execute computer readable instructions for adaptive operation of the robot in the environment.

11. The system of claim 10, wherein the object present indication is communicated to a navigation process of the robotic apparatus, the navigation process is configured to modify the trajectory of the robot responsive to receipt of the object presence indication.

12. The system of claim 11, wherein the trajectory of the robotic apparatus corresponds to a task executed by the robot.

13. A non-transitory computer readable medium having computer readable instructions stored thereon that, when executed by at least one processor cause the at least one processor to:

transmit one or more first output signals from a projector coupled to a robot, the one or more first output signals comprising a first pattern, the first pattern comprises at least in part a visual light indication based on a trajectory of the robot;

receive one or more input signals, the one or more input signals comprising a second pattern, the one or more input signals being received by a sensor coupled to the robot, the sensor being spatially separated from the projector;

evaluate a difference between the one or more first output signals and the one or more input signals;

and output one or more second output signals upon the difference breaching a threshold the one or more second output signals comprising an object present indication.

14. The non-transitory computer readable medium of claim 13, wherein the first pattern includes a reference pattern.

15. The non-transitory computer readable medium of claim 13, wherein the second pattern includes a reflected pattern.

16. A method for sensing objects in an environment comprising:

transmitting one or more first output signals from a projector coupled to a robot, the one or more first output signals comprising a first pattern, the first pattern includes at least in part a visual light indication based on a trajectory of the robot;

receiving one or more input signals, the one or more input signals comprising a second pattern, the one or more input signals being received by a sensor coupled to the robot, the sensor being spatially separated from the projector;

evaluating a difference between the one or more first output signals and the one or more input signals;

and outputting one or more second output signals upon the difference breaching a threshold the one or more second output signals including comprising an object present indication.

17. The method of claim 16, wherein the first pattern includes a reference pattern and the second pattern includes a reflected pattern.

18. The method of claim 17, wherein the evaluation of the difference comprises an extraction of information related to structure of the reflected pattern.

19. The method of claim 16, further comprising:

changing the trajectory of the robot to a different second trajectory upon receiving the object present indication.

* * * * *